US009221177B2

(12) United States Patent
Herr et al.

(10) Patent No.: US 9,221,177 B2
(45) Date of Patent: Dec. 29, 2015

(54) NEUROMUSCULAR MODEL-BASED SENSING AND CONTROL PARADIGM FOR A ROBOTIC LEG

(71) Applicant: Massachusetts Institute of Technology, Cambridge, MA (US)

(72) Inventors: Hugh M. Herr, Somerville, MA (US); Ken Endo, Tokyo (JP); Pavitra Krishnaswamy, Cambridge, MA (US); Jared Markowitz, Cambridge, MA (US); Michael Frederick Eilenberg, Cambridge, MA (US); Jing Wang, Natick, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 117 days.

(21) Appl. No.: 13/865,840

(22) Filed: Apr. 18, 2013

(65) Prior Publication Data

US 2013/0310979 A1 Nov. 21, 2013

Related U.S. Application Data

(60) Provisional application No. 61/635,223, filed on Apr. 18, 2012.

(51) Int. Cl.
*B25J 9/16* (2006.01)
*B62D 57/032* (2006.01)

(52) U.S. Cl.
CPC ............. *B25J 9/1694* (2013.01); *B62D 57/032* (2013.01); *G05B 2219/40324* (2013.01)

(58) Field of Classification Search
CPC ........ A61F 2/24–2/588; B25J 9/1628–9/1653; B25J 9/1694; B62D 57/00–57/04; G05B 2219/40324

See application file for complete search history.

(56) References Cited

U.S. PATENT DOCUMENTS 2,489,291 A 11/1949 Henschke et al.
2,529,968 A 11/1950 Sartin
(Continued)

FOREIGN PATENT DOCUMENTS

CN 101061984 A 10/2007
CN 101111211 A 1/2008
(Continued)

OTHER PUBLICATIONS

Af Klint, R., et al., "Sudden Drop in Ground Support Produces Force-Related Unload Response in Human Overground Walking," *J. Neurophysiol.*, 101:1705-1712 (2009).
(Continued)

*Primary Examiner* — Spencer Patton
*Assistant Examiner* — Adam Mott
(74) *Attorney, Agent, or Firm* — Hamilton, Brook, Smith & Reynolds, P.C.

(57) ABSTRACT

A neuromuscular model-based controller for a robotic limb having at least one joint includes a neuromuscular model having a muscle model, muscle geometry and reflex feedback loop to determine at least one torque or impedance command to be sent to the robotic limb. One or more parameters that determine relation between feedback data and activation of the muscle model are adjusted consequent to sensory data from at least one of an intrinsic sensor and an extrinsic sensor. A controller in communication with the neuromuscular model is configured to receive the at least one torque or impedance command and controls at least one of position, torque and impedance of the robotic limb joint.

71 Claims, 28 Drawing Sheets
(10 of 28 Drawing Sheet(s) Filed in Color)

(56) References Cited

U.S. PATENT DOCUMENTS

| | | |
|---|---|---|
| 3,016,760 A | 1/1962 | Wrighton et al. |
| 3,098,645 A | 7/1963 | Owens |
| 3,207,497 A | 9/1965 | Schoonover |
| 3,844,279 A | 10/1974 | Konvalin |
| 3,871,032 A | 3/1975 | Karas |
| 3,916,450 A | 11/1975 | Minor |
| 4,442,390 A | 4/1984 | Davis |
| 4,463,291 A | 7/1984 | Usry |
| 4,518,307 A | 5/1985 | Bloch |
| 4,532,462 A | 7/1985 | Washbourn et al. |
| 4,546,295 A | 10/1985 | Wickham et al. |
| 4,546,296 A | 10/1985 | Washbourn et al. |
| 4,546,297 A | 10/1985 | Washbourn et al. |
| 4,546,298 A | 10/1985 | Wickham et al. |
| 4,569,352 A | 2/1986 | Petrofsky et al. |
| 4,600,357 A | 7/1986 | Coules |
| 4,657,470 A | 4/1987 | Clarke et al. |
| 4,843,921 A | 7/1989 | Kremer |
| 4,865,376 A | 9/1989 | Leaver et al. |
| 4,872,803 A | 10/1989 | Asakawa |
| 4,909,535 A | 3/1990 | Clark et al. |
| 4,921,293 A | 5/1990 | Ruoff et al. |
| 4,921,393 A | 5/1990 | Andeen et al. |
| 4,923,474 A | 5/1990 | Klasson et al. |
| 4,923,475 A | 5/1990 | Gosthnian et al. |
| 4,936,295 A | 6/1990 | Crane |
| 4,964,402 A | 10/1990 | Grim et al. |
| 4,989,161 A | 1/1991 | Oaki |
| 5,012,591 A | 5/1991 | Asakawa |
| 5,049,797 A | 9/1991 | Phillips |
| 5,062,673 A | 11/1991 | Mimura |
| 5,088,478 A | 2/1992 | Grim |
| 5,092,902 A | 3/1992 | Adams et al. |
| 5,112,296 A | 5/1992 | Beard et al. |
| 5,174,168 A | 12/1992 | Takagi et al. |
| 5,181,933 A | 1/1993 | Phillips |
| 5,252,102 A | 10/1993 | Singer et al. |
| 5,294,873 A | 3/1994 | Seraji |
| RE34,661 E | 7/1994 | Grim |
| 5,327,790 A | 7/1994 | Levin et al. |
| 5,367,790 A | 11/1994 | Gamow et al. |
| 5,383,939 A | 1/1995 | James |
| 5,405,409 A | 4/1995 | Knoth |
| 5,442,270 A | 8/1995 | Tetsuaki |
| 5,443,521 A | 8/1995 | Knoth et al. |
| 5,456,341 A | 10/1995 | Garnjost et al. |
| 5,458,143 A | 10/1995 | Herr |
| 5,476,441 A | 12/1995 | Durfee et al. |
| 5,502,363 A | 3/1996 | Tasch et al. |
| 5,514,185 A | 5/1996 | Phillips |
| 5,556,422 A | 9/1996 | Powell, III et al. |
| 5,571,205 A | 11/1996 | James |
| 5,643,332 A | 7/1997 | Stein |
| 5,650,704 A | 7/1997 | Pratt et al. |
| 5,662,693 A | 9/1997 | Johnson et al. |
| 5,701,686 A | 12/1997 | Herr et al. |
| 5,718,925 A | 2/1998 | Kristinsson et al. |
| 5,748,845 A | 5/1998 | Labun et al. |
| 5,776,205 A | 7/1998 | Phillips |
| 5,865,770 A | 2/1999 | Schectman |
| 5,885,809 A | 3/1999 | Effenberger et al. |
| 5,888,212 A | 3/1999 | Petrofsky et al. |
| 5,888,213 A | 3/1999 | Sears et al. |
| 5,898,948 A | 5/1999 | Kelly et al. |
| 5,910,720 A | 6/1999 | Williamson et al. |
| 5,932,230 A | 8/1999 | DeGrate |
| 5,944,760 A | 8/1999 | Christensen |
| 5,971,729 A | 10/1999 | Kristinsson et al. |
| 5,972,036 A | 10/1999 | Kristinsson et al. |
| 5,980,435 A | 11/1999 | Joutras et al. |
| 6,029,374 A | 2/2000 | Herr et al. |
| 6,056,712 A | 5/2000 | Grim |
| 6,067,892 A | 5/2000 | Erickson |
| 6,071,313 A | 6/2000 | Phillips |
| 6,136,039 A | 10/2000 | Kristinsson et al. |
| 6,144,385 A | 11/2000 | Girard |
| 6,202,806 B1 | 3/2001 | Sandrin et al. |
| 6,223,648 B1 | 5/2001 | Erickson |
| 6,240,797 B1 | 6/2001 | Morishima et al. |
| 6,267,742 B1 | 7/2001 | Krivosha et al. |
| 6,416,703 B1 | 7/2002 | Kristinsson et al. |
| 6,443,993 B1 | 9/2002 | Koniuk |
| 6,456,884 B1 | 9/2002 | Kenney |
| 6,478,826 B1 | 11/2002 | Phillips et al. |
| 6,485,776 B2 | 11/2002 | Janusson et al. |
| 6,507,757 B1 | 1/2003 | Swain et al. |
| 6,511,512 B2 | 1/2003 | Phillips et al. |
| 6,517,503 B1 | 2/2003 | Naft et al. |
| 6,532,400 B1 | 3/2003 | Jacobs |
| 6,585,774 B2 | 7/2003 | Dean, Jr. et al. |
| 6,589,289 B2 | 7/2003 | Ingimarsson |
| 6,592,539 B1 | 7/2003 | Einarsson et al. |
| 6,610,101 B2 | 8/2003 | Herr et al. |
| 6,626,952 B2 | 9/2003 | Janusson et al. |
| 6,660,042 B1 | 12/2003 | Curcie et al. |
| 6,666,796 B1 | 12/2003 | MacCready, Jr. |
| 6,706,364 B2 | 3/2004 | Janusson et al. |
| 6,752,774 B2 | 6/2004 | Townsend et al. |
| 6,764,520 B2 | 7/2004 | Deffenbaugh et al. |
| 6,811,571 B1 | 11/2004 | Phillips |
| D503,480 S | 3/2005 | Ingimundarson et al. |
| D503,802 S | 4/2005 | Bjarnason |
| 6,887,279 B2 | 5/2005 | Phillips et al. |
| 6,923,834 B2 | 8/2005 | Karason |
| 6,936,073 B2 | 8/2005 | Karason |
| 6,942,629 B2 | 9/2005 | Hepburn et al. |
| 6,945,947 B2 | 9/2005 | Ingimundarson et al. |
| 6,966,882 B2 | 11/2005 | Horst |
| 6,969,408 B2 | 11/2005 | Lecomte et al. |
| 7,001,563 B2 | 2/2006 | Janusson et al. |
| 7,025,793 B2 | 4/2006 | Egilsson |
| 7,029,500 B2 | 4/2006 | Martin |
| 7,037,283 B2 | 5/2006 | Karason et al. |
| D523,149 S | 6/2006 | Bjarnason |
| 7,063,727 B2 | 6/2006 | Phillips et al. |
| 7,077,818 B2 | 7/2006 | Ingimundarson et al. |
| 7,094,058 B2 | 8/2006 | Einarsson |
| 7,094,212 B2 | 8/2006 | Karason et al. |
| D527,825 S | 9/2006 | Ingimundarson et al. |
| D529,180 S | 9/2006 | Ingimundarson et al. |
| 7,101,487 B2 | 9/2006 | Hsu et al. |
| 7,105,122 B2 | 9/2006 | Karason |
| 7,107,180 B2 | 9/2006 | Karason |
| 7,118,601 B2 | 10/2006 | Yasui et al. |
| 7,118,602 B2 | 10/2006 | Bjarnason |
| 7,136,722 B2 | 11/2006 | Nakamura et al. |
| D533,280 S | 12/2006 | Wyatt et al. |
| 7,144,429 B2 | 12/2006 | Carstens |
| 7,145,305 B2 | 12/2006 | Takenaka et al. |
| 7,154,017 B2 | 12/2006 | Sigurjonsson et al. |
| 7,161,056 B2 | 1/2007 | Gudnason et al. |
| 7,169,188 B2 | 1/2007 | Carstens |
| 7,169,189 B2 | 1/2007 | Bjarnason et al. |
| 7,169,190 B2 | 1/2007 | Phillips et al. |
| 7,198,071 B2 | 4/2007 | Bisbee, III et al. |
| 7,198,610 B2 | 4/2007 | Ingimundarson et al. |
| 7,217,060 B2 | 5/2007 | Ingimarsson |
| 7,220,889 B2 | 5/2007 | Sigurjonsson et al. |
| 7,223,899 B2 | 5/2007 | Sigurjonsson |
| 7,227,050 B2 | 6/2007 | Sigurjonsson et al. |
| 7,230,154 B2 | 6/2007 | Sigurjonsson |
| 7,235,108 B2 | 6/2007 | Carstens |
| 7,240,876 B2 | 7/2007 | Doubleday et al. |
| 7,266,910 B2 | 9/2007 | Ingimundarson |
| 7,270,644 B2 | 9/2007 | Ingimundarson |
| 7,279,009 B2 | 10/2007 | Herr et al. |
| 7,288,076 B2 | 10/2007 | Grim et al. |
| 7,295,892 B2 | 11/2007 | Herr et al. |
| RE39,961 E | 12/2007 | Petrofsky et al. |
| 7,303,538 B2 | 12/2007 | Grim et al. |
| 7,304,202 B2 | 12/2007 | Sigurjonsson et al. |
| 7,311,686 B1 | 12/2007 | Iglesias et al. |
| 7,313,463 B2 | 12/2007 | Herr et al. |
| D558,884 S | 1/2008 | Ingimundarson et al. |

(56) References Cited

U.S. PATENT DOCUMENTS

| | | |
|---|---|---|
| 7,314,490 B2 | 1/2008 | Bédard et al. |
| 7,335,233 B2 | 2/2008 | Hsu et al. |
| 7,347,877 B2 | 3/2008 | Clausen et al. |
| D567,072 S | 4/2008 | Ingimundarson et al. |
| 7,371,262 B2 | 5/2008 | Lecomte et al. |
| 7,377,944 B2 | 5/2008 | Janusson et al. |
| RE40,363 E | 6/2008 | Grim et al. |
| 7,381,860 B2 | 6/2008 | Gudnason et al. |
| 7,393,364 B2 | 7/2008 | Martin |
| 7,396,975 B2 | 7/2008 | Sigurjonsson et al. |
| 7,402,721 B2 | 7/2008 | Sigurjonsson et al. |
| 7,411,109 B2 | 8/2008 | Sigurjonsson et al. |
| D576,781 S | 9/2008 | Chang et al. |
| D577,828 S | 9/2008 | Ingimundarson et al. |
| 7,423,193 B2 | 9/2008 | Sigurjonsson et al. |
| 7,427,297 B2 | 9/2008 | Patterson et al. |
| 7,429,253 B2 | 9/2008 | Shimada et al. |
| 7,431,708 B2 | 10/2008 | Sreeramagiri |
| 7,431,737 B2 | 10/2008 | Ragnarsdottir et al. |
| 7,438,843 B2 | 10/2008 | Asgeirsson |
| 7,449,005 B2 | 11/2008 | Pickering et al. |
| 7,455,696 B2 | 11/2008 | Bisbee, III et al. |
| D583,956 S | 12/2008 | Chang et al. |
| 7,459,598 B2 | 12/2008 | Sigurjonsson et al. |
| 7,465,281 B2 | 12/2008 | Grim et al. |
| 7,465,283 B2 | 12/2008 | Grim et al. |
| 7,468,471 B2 | 12/2008 | Sigurjonsson et al. |
| 7,470,830 B2 | 12/2008 | Sigurjonsson et al. |
| 7,485,152 B2 | 2/2009 | Haynes et al. |
| 7,488,349 B2 | 2/2009 | Einarsson |
| 7,488,864 B2 | 2/2009 | Sigurjonsson et al. |
| D588,753 S | 3/2009 | Ingimundarson et al. |
| 7,503,937 B2 | 3/2009 | Asgeirsson et al. |
| 7,513,880 B2 | 4/2009 | Ingimundarson et al. |
| 7,513,881 B1 | 4/2009 | Grim et al. |
| D592,755 S | 5/2009 | Chang et al. |
| D592,756 S | 5/2009 | Chang et al. |
| 7,527,253 B2 | 5/2009 | Sugar et al. |
| 7,531,006 B2 | 5/2009 | Clausen et al. |
| 7,531,711 B2 | 5/2009 | Sigurjonsson et al. |
| 7,534,220 B2 | 5/2009 | Cormier et al. |
| 7,544,214 B2 | 6/2009 | Gramnas |
| 7,549,970 B2 | 6/2009 | Tweardy |
| D596,301 S | 7/2009 | Campos et al. |
| 7,578,799 B2 | 8/2009 | Thorsteinsson et al. |
| 7,581,454 B2 | 9/2009 | Clausen et al. |
| 7,597,672 B2 | 10/2009 | Kruijsen et al. |
| 7,597,674 B2 | 10/2009 | Hu et al. |
| 7,597,675 B2 | 10/2009 | Ingimundarson et al. |
| 7,618,463 B2 | 11/2009 | Oddsson et al. |
| 7,632,315 B2 | 12/2009 | Egilsson |
| 7,637,957 B2 | 12/2009 | Ragnarsdottir et al. |
| 7,637,959 B2 | 12/2009 | Clausen et al. |
| 7,641,700 B2 | 1/2010 | Yasui |
| 7,650,204 B2 | 1/2010 | Dariush |
| 7,662,191 B2 | 2/2010 | Asgeirsson |
| D611,322 S | 3/2010 | Robertson |
| 7,674,212 B2 | 3/2010 | Kruijsen et al. |
| 7,691,154 B2 | 4/2010 | Asgeirsson et al. |
| 7,696,400 B2 | 4/2010 | Sigurjonsson et al. |
| 7,704,218 B2 | 4/2010 | Einarsson et al. |
| D616,555 S | 5/2010 | Thorgilsdottir et al. |
| D616,556 S | 5/2010 | Hu |
| 7,713,225 B2 | 5/2010 | Ingimundarson et al. |
| D616,996 S | 6/2010 | Thorgilsdottir et al. |
| D616,997 S | 6/2010 | Thorgilsdottir et al. |
| D618,359 S | 6/2010 | Einarsson |
| 7,727,174 B2 | 6/2010 | Chang et al. |
| 7,736,394 B2 | 6/2010 | Bedard et al. |
| 7,745,682 B2 | 6/2010 | Sigurjonsson et al. |
| D620,124 S | 7/2010 | Einarsson |
| 7,749,183 B2 | 7/2010 | Ingimundarson et al. |
| 7,749,281 B2 | 7/2010 | Egilsson |
| 7,762,973 B2 | 7/2010 | Einarsson et al. |
| 7,771,488 B2 | 8/2010 | Asgeirsson et al. |
| 7,780,741 B2 | 8/2010 | Janusson et al. |
| 7,794,418 B2 | 9/2010 | Ingimundarson et al. |
| 7,794,505 B2 | 9/2010 | Clausen et al. |
| 7,811,333 B2 | 10/2010 | Jonsson et al. |
| 7,811,334 B2 | 10/2010 | Ragnarsdottir et al. |
| D627,079 S | 11/2010 | Robertson |
| 7,833,181 B2 | 11/2010 | Cormier et al. |
| 7,842,848 B2 | 11/2010 | Janusson et al. |
| D628,696 S | 12/2010 | Robertson |
| D629,115 S | 12/2010 | Robertson |
| 7,846,213 B2 | 12/2010 | Lecomte et al. |
| 7,862,620 B2 | 1/2011 | Clausen et al. |
| 7,863,797 B2 | 1/2011 | Calley |
| 7,867,182 B2 | 1/2011 | Iglesias et al. |
| 7,867,284 B2 | 1/2011 | Bedard |
| 7,867,285 B2 | 1/2011 | Clausen et al. |
| 7,867,286 B2 | 1/2011 | Einarsson |
| 7,868,511 B2 | 1/2011 | Calley |
| 7,879,110 B2 | 2/2011 | Phillips |
| 7,891,258 B2 | 2/2011 | Clausen et al. |
| 7,892,195 B2 | 2/2011 | Grim et al. |
| D634,438 S | 3/2011 | Hu |
| D634,852 S | 3/2011 | Hu |
| 7,896,826 B2 | 3/2011 | Hu et al. |
| 7,896,827 B2 | 3/2011 | Ingimundarson et al. |
| 7,896,927 B2 | 3/2011 | Clausen et al. |
| 7,909,884 B2 | 3/2011 | Egilsson et al. |
| 7,910,793 B2 | 3/2011 | Sigurjonsson et al. |
| 7,914,475 B2 | 3/2011 | Wyatt et al. |
| 7,918,765 B2 | 4/2011 | Kruijsen et al. |
| D637,942 S | 5/2011 | Lee et al. |
| 7,935,068 B2 | 5/2011 | Einarsson |
| D640,380 S | 6/2011 | Tweardy et al. |
| D640,381 S | 6/2011 | Tweardy et al. |
| 7,955,398 B2 | 6/2011 | Bedard et al. |
| 7,959,589 B2 | 6/2011 | Sreeramagiri et al. |
| D641,482 S | 7/2011 | Robertson et al. |
| D641,483 S | 7/2011 | Robertson et al. |
| 7,981,068 B2 | 7/2011 | Thorgilsdottir et al. |
| 7,985,193 B2 | 7/2011 | Thorsteinsson et al. |
| D643,537 S | 8/2011 | Lee |
| 7,992,849 B2 | 8/2011 | Sugar et al. |
| 7,998,221 B2 | 8/2011 | Lecomte et al. |
| 8,002,724 B2 | 8/2011 | Hu et al. |
| 8,007,544 B2 | 8/2011 | Jonsson et al. |
| 8,016,781 B2 | 9/2011 | Ingimundarson et al. |
| 8,021,317 B2 | 9/2011 | Arnold et al. |
| 8,025,632 B2 | 9/2011 | Einarsson |
| 8,025,699 B2 | 9/2011 | Lecomte et al. |
| 8,026,406 B2 | 9/2011 | Janusson et al. |
| D646,394 S | 10/2011 | Tweardy et al. |
| D647,622 S | 10/2011 | Lee et al. |
| D647,623 S | 10/2011 | Thorgilsdottir et al. |
| D647,624 S | 10/2011 | Thorgilsdottir et al. |
| 8,034,120 B2 | 10/2011 | Egilsson et al. |
| 8,038,636 B2 | 10/2011 | Thorgilsdottir et al. |
| 8,043,244 B2 | 10/2011 | Einarsson et al. |
| 8,043,245 B2 | 10/2011 | Campos et al. |
| RE42,903 E | 11/2011 | Deffenbaugh et al. |
| 8,048,007 B2 | 11/2011 | Roy |
| 8,048,013 B2 | 11/2011 | Ingimundarson et al. |
| 8,048,172 B2 | 11/2011 | Jonsson et al. |
| 8,052,760 B2 | 11/2011 | Egilsson et al. |
| 8,057,550 B2 | 11/2011 | Clausen et al. |
| 8,075,633 B2 | 12/2011 | Herr et al. |
| 8,202,325 B2 | 6/2012 | Albrecht-Laatsch et al. |
| 8,287,477 B1 | 10/2012 | Herr et al. |
| 8,376,971 B1 | 2/2013 | Herr et al. |
| 8,419,804 B2 | 4/2013 | Herr et al. |
| 8,500,823 B2 | 8/2013 | Herr et al. |
| 8,512,415 B2 | 8/2013 | Herr et al. |
| 8,734,528 B2 | 5/2014 | Herr et al. |
| 8,864,846 B2 * | 10/2014 | Herr et al. ............ 623/25 |
| 8,870,967 B2 | 10/2014 | Herr et al. |
| 2001/0029400 A1 | 10/2001 | Deffenbaugh et al. |
| 2002/0052663 A1 | 5/2002 | Herr et al. |
| 2002/0092724 A1 | 7/2002 | Koleda |
| 2002/0138153 A1 | 9/2002 | Koniuk |
| 2003/0093021 A1 | 5/2003 | Goffer |

(56) References Cited

U.S. PATENT DOCUMENTS

| | | |
|---|---|---|
| 2003/0125814 A1 | 7/2003 | Paasivaara et al. |
| 2003/0139783 A1 | 7/2003 | Kilgore et al. |
| 2003/0163206 A1 | 8/2003 | Yasui et al. |
| 2003/0195439 A1 | 10/2003 | Caselnova |
| 2004/0039454 A1 | 2/2004 | Herr et al. |
| 2004/0049290 A1 | 3/2004 | Bedard |
| 2004/0054423 A1 | 3/2004 | Martin |
| 2004/0064195 A1 | 4/2004 | Herr |
| 2004/0088025 A1 | 5/2004 | Gesotti |
| 2004/0181118 A1 | 9/2004 | Kochamba |
| 2004/0181289 A1 | 9/2004 | Bedard et al. |
| 2005/0007834 A1 | 1/2005 | Hidaka |
| 2005/0038525 A1 | 2/2005 | Doddroe et al. |
| 2005/0043614 A1 | 2/2005 | Huizenga et al. |
| 2005/0049652 A1 | 3/2005 | Tong |
| 2005/0059908 A1 | 3/2005 | Bogert |
| 2005/0085948 A1 | 4/2005 | Herr et al. |
| 2005/0155444 A1 | 7/2005 | Otaki et al. |
| 2005/0192677 A1 | 9/2005 | Ragnarsdottir et al. |
| 2005/0209707 A1 | 9/2005 | Phillips et al. |
| 2005/0228515 A1 | 10/2005 | Musallam et al. |
| 2006/0004307 A1 | 1/2006 | Horst |
| 2006/0064047 A1 | 3/2006 | Shimada et al. |
| 2006/0069448 A1 | 3/2006 | Yasui |
| 2006/0094989 A1 | 5/2006 | Scott et al. |
| 2006/0122711 A1 | 6/2006 | Bedard et al. |
| 2006/0213305 A1 | 9/2006 | Sugar et al. |
| 2006/0224246 A1 | 10/2006 | Clausen et al. |
| 2006/0249315 A1 | 11/2006 | Herr et al. |
| 2006/0258967 A1 | 11/2006 | Fujil et al. |
| 2006/0264790 A1 | 11/2006 | Kruijsen et al. |
| 2006/0276728 A1 | 12/2006 | Ashihara et al. |
| 2007/0016329 A1 | 1/2007 | Herr et al. |
| 2007/0043449 A1 | 2/2007 | Herr et al. |
| 2007/0050044 A1 | 3/2007 | Haynes et al. |
| 2007/0123997 A1 | 5/2007 | Herr et al. |
| 2007/0129653 A1 | 6/2007 | Sugar et al. |
| 2007/0145930 A1 | 6/2007 | Zaier |
| 2007/0162152 A1 | 7/2007 | Herr et al. |
| 2007/0267791 A1 | 11/2007 | Hollander et al. |
| 2008/0114272 A1 | 5/2008 | Herr et al. |
| 2008/0155444 A1 | 6/2008 | Pannese et al. |
| 2008/0169729 A1 | 7/2008 | Asai |
| 2009/0030530 A1 | 1/2009 | Martin |
| 2009/0222105 A1 | 9/2009 | Clausen |
| 2009/0265018 A1* | 10/2009 | Goldfarb et al. ................ 623/40 |
| 2010/0113988 A1 | 5/2010 | Matsuoka et al. |
| 2010/0241242 A1 | 9/2010 | Herr et al. |
| 2010/0256537 A1* | 10/2010 | Menga ............................ 601/34 |
| 2010/0280629 A1* | 11/2010 | Jung et al. ...................... 623/53 |
| 2010/0324699 A1* | 12/2010 | Herr et al. ...................... 623/27 |
| 2011/0040216 A1 | 2/2011 | Herr et al. |
| 2011/0224804 A1 | 9/2011 | Clausen et al. |
| 2011/0245931 A1 | 10/2011 | Clausen et al. |
| 2011/0260380 A1 | 10/2011 | Hollander et al. |
| 2011/0264230 A1 | 10/2011 | Herr et al. |
| 2011/0278857 A1 | 11/2011 | Sugar et al. |
| 2012/0136459 A1 | 5/2012 | Herr et al. |
| 2012/0209405 A1 | 8/2012 | Herr et al. |
| 2012/0271433 A1 | 10/2012 | Galea et al. |
| 2013/0110256 A1 | 5/2013 | Herr et al. |
| 2013/0158444 A1 | 6/2013 | Herr et al. |
| 2013/0197318 A1 | 8/2013 | Herr et al. |
| 2013/0310979 A1 | 11/2013 | Herr et al. |
| 2014/0046455 A1 | 2/2014 | Herr et al. |
| 2014/0088729 A1 | 3/2014 | Herr et al. |
| 2014/0257519 A1 | 9/2014 | Herr et al. |
| 2015/0051710 A1 | 2/2015 | Herr et al. |

FOREIGN PATENT DOCUMENTS

| | | |
|---|---|---|
| EP | 1166982 | 1/2002 |
| EP | 1393866 | 3/2004 |
| JP | 2008-87143 A | 4/2008 |
| WO | WO 01/54630 A1 | 8/2001 |
| WO | WO 03/005934 A2 | 1/2003 |
| WO | WO 03068453 | 8/2003 |
| WO | WO 2004/017872 A1 | 3/2004 |
| WO | WO 2004/019832 A1 | 3/2004 |
| WO | WO 2010/027968 A2 | 3/2010 |
| WO | WO 2010/088616 | 8/2010 |
| WO | WO 2010/088635 A1 | 8/2010 |

OTHER PUBLICATIONS

Af Klint, R., et al., "Within-Step Modulation of Leg Muscle Activity by Afferent Feedback in Human Walking," *The Journal of Physiology*, 586(19):4643-4648 (2008).

Anderson, F.C., et al., "Dynamic Optimization of Human Walking," *J. of Biomechanical Engineering*, 123:381-390 (2001).

Au, S., et al., "An Ankle-Foot Emulation System for the Study of Human Walking Biomechanics," *Proc. IEEE Int. Conf on Robotics and Automation*, pp. 2939-2945 (2006).

Au, S., et al., "Powered ankle-foot prosthesis to assist level-ground and stair-descent gaits," *Neural Networks*, 21(4):654-666 (May 2008).

Au, S.K., et al., "An EMG-position controlled system for an active ankle-foot prosthesis: an initial experimental study," *Proceedings of the 2005 IEEE, $9^{th}$ Int'l Conf. Rehab Robotics*, pp. 375-379, (Jul. 2005).

Au, S.K., et al., "Powered Ankle-Foot prosthesis improves walking metabolic economy," *Robotics, IEEE Transactions*, 25(1):51-66 (Feb. 2009).

Cavagna, G.A., et al., "The Sources of External Work in Level Walking and Running," *J. Physiol.* 262:639-657 (1976).

Clancy, E.A., et al., "Sampling, noise-reduction and amplitude estimation issues in surface electromyography," *Journal of Electromyography and Kinesiology:*, 12(1):1-16 (Feb. 2002) PMID: 11804807.

Collins, S.H., et al., "A Bipedal Walking Robot with Efficient and Human-Like Gait," *Proc. 2005 IEEE Int'l Conf. Robotics and Automation*, Barcelona, Spain (Apr. 2005).

Cornell University 2009 Disability Status Report, United States (2009).

Cronin, N.J., et al., "Mechanical and Neural Stretch Responses of the Human Soleus Muscle at Different Walking Speed," *J. Physiol.*, (2009).

Deb, K., "Multi-Objective Optimization Using Evolutionary Algorithms," *Wiley* (2001).

Deb, K., et al., "A Hybrid Multi-Objective Evolutionary Approach to Engineering Shape Design," *International Conference on Evolutionary Multi-Criterion Optimization*, EMO-2001, pp. 385-399 (2001).

Deb, K., et al., "Controlled Elitist Non-Dominated Sorting Genetic Algorithms for Better Convergence," *International Conference on Evolutionary Multi-Criterion Optimization, EMO* 2001; pp. 67-81 (2001).

Delp, S., "Surgery Simulation: A Computer Graphics System to Analyze and Design Musculoskeletal Reconstructions of the Lower Limb," *PhD Thesis*, Stanford, (1990).

Delp, S., et al., "An Interactive Graphics-based Model of the Lower Extremity Orthopaedic Surgical Procedures," *IEEE Transactions on Biomedical Engineering*, 37(8):757-767 (1990).

Donelan, J.M., "Mechanical Work for Step-to-Step Transitions is a major Determinant of the Metabolic Cost of Human Walking," *The Journal of Experimental Biology*, 205:3717-3727 (2002).

Eilenberg, M.F., et al., "Control of a Powered Ankle-Foot Prosthesis Based on a Neuromuscular Model," *IEEE Transactions on Neural Systems and Rehabilitation Engineering*, 18(2):164-173 (2010).

Ferris, D.P., et al., "Robotic lower limb exoskeletons using proportional myoelectric control," pp. 2119-2124 (Sep. 2009).

Fukunaga, T., et al., "In Vivo Behavior of Human Muscle Tendon During Walking," *Proc. Biol. Sci.*, 268:229-233 (2001).

Gates, D.H., et al., "Characterization of ankle function during stair ambulation," *Conference Proceedings: Annual International Conference of the IEEE Engineering in Medicine and Biology Society. IEEE Engineering in Medicine and Biology Society. Conference*, 6:4248-4251, (2004). PMID: 17271242.

(56) References Cited

OTHER PUBLICATIONS

Geyer, H., et al., "A Muscle-Reflex Model that Encodes Principles of Legged Mechanics Produces Human Walking Dynamics and Muscle Activities," *IEEE Transactions on Neural Systems and Rehabilitation Engineering*, 18(3):263-273 (2010).
Geyer, H., et al., "Positive Force Feedback in Bouncing Gaits?" *Proceedings of the Royal Society of London, Series B: Biological Science*, 270(1529):2173-2183 (2003).
Grey, M.J., et al., "Positive Force Feedback in Human Walking," *J. of Physiology*, 581(1):99-105 (2007).
Grieve, D., "Prediction of Gastrocnemius Length from Knee and Ankle Joint Posture," *International Series of Biomechanics*, 2A:405-412 (1978).
Gunther, M. and Ruder, H., "Synthesis of Two-Dimensional Human Walking: A Test of the Lambda-Model," *Bio. Cybern*, 89:89-106 (2003).
Haimes, Y.Y., et al., "On a Bicriterion Formulation of THe Problems of Integrated System Identification and System Optimization," *IEEE Transactions on Systems, Man and Cybernetics*, 1(3):296-297 (1971).
Hargrove, L.J., et al., "Real-Time myoelectric control of knee and ankle motions for transfemoral amputees," *JAMA: The Journal of the American Medical Association*, 305(15):1542-1544 (Apr. 2011).
Hargrove, L.J., et al., "Toward the development of a neural interface for lower limb prosthesis control," *Conference Proceedings: Annual International Conference of the IEEE Engineering in Medicine and Biology Society. IEEE Engineering in Medicine and Biology Society. Conference*, 2009:2111-2114, (2009). PMID: 19964782.
Hase, K., et al., "Computer Simulation Study of Human Locomotion with a Three-Dimensional Entire-Body Neuro-Musculo-Skeletal Model, Acquisition of Normal Walking," *JSME Int. J., Series C*, 45(4):1040-1050 (2002).
Herbert, R.D., et al., "Change in Length of Relaxed Muscle Fascicles and Tendons with Knee and Ankle Movement in Human," *J. of Physiology*, 539:637-645 (2002).
Herr, H., et al., "Angular Momentum in Human Walking," *Journal of Experimental Biology*, 211:467-480 (2008).
Herr, H.M., et al., "Bionic Ankle-Foot Prosthesis Normalizes Walking Gait for Persons with Leg Amputation," *Proceedings of the Royal Society, Series B, Biological Sciences*, (2011).
Hill, A.V., "The Heat of Shortening and the Dynamic Constants of Muscle," *Proceedings of the Royal Society of London, Series B, Biological Sciences*, 126(843):136-195 (1938).
Hogan, N. et al., "Myoelectric signal processing: Optimal estimation applied to electromyography-part i: Derivation of the optimal myoprocessor," *Biomedical Engineering, IEEE Transactions on*, BME-27(7):382-395 (Jul. 1980).
Ishikawa, M., et al., "Muscle-Tendon Interaction and Elastic Energy Usage in Human Walking," *J. Appl. Physiol.*, 99:603-608 (2005).
Jo, S., "Hierarchical Neural Control of Human Postural Balance and Bipedal Walking and Sagittal Plane," *PhD. Thesis*, MIT, (2007).
Kadaba, M.P., et al., "Measurement of Lower Extremity Kinematics During Level Walking," *J. Orthop. Res.*, 8:383-392 (1990).
Kadaba, M.P., et al., "Repeatability of Kinematic, Kinetic and Electromyographic Data in Normal Adult Gait," *J. Orthop. Res.*, 7:849-860 (1989).
Kerrigan, D.C., et al., "A Refined View of the Determinants of Gait: Significant of Heel Rise," *Archives of Physical Medicine and Rehabilitation*, 81(8):1077-1080 (2000).
Kerrigan, D.C., et al., "Quantification of Pelvic Rotation as a Determinant of Gait," *Archives of Physical Medicine and Rehabilitation*, 82:217-220 (2001).
Krishnaswamy, P., "A Computational Framework to Study Neural-Structural Interactions in Human Walking," *Master's Thesis, Massachusetts Institute of Technology*, (2010).
Krishnaswamy, P., et al., "Human Leg Model Predicts Ankle Muscle-Tendon Morphology, State, Roles and Energetics in Walking," *PLoS Comput. Biol.* 7(3):31001107.doi:10.10371/journal.pcbi.1001107 (2011). PMID: 21445231 PMCID: 3060164.
Kuiken, T.A., et al., "Targeted muscle reinnervation for real-time myoelectric control of multifunction artificial arms," *JAMA: The Journal of the American Medical Association*, 301(6):619-628 (Feb. 2009).
Lichtwark, G.A., et al., "Interactions between the Human Gastrocnemius Muscle and the Achilles Tendon During Incline, Level and Decline Locomotion," *The Journal of Experimental Biology*, 209:4379-4388 (2006).
Ma, S.P., et al., "A Distribution-Moment Model of Energetics in Skeletal Muscle," *J. of Biomechanics*, 24:21-35 (1991).
MacKinnon, C., et al., "Control of Whole Body Balance in the Frontal Plane During Human Walking," *J. Biomech.*, 26(6):633-644 (1993).
Magnusson, S.P., et al., "Increased Cross-Sectional Area and Reduced Tensile Stress of the Achilles Tendon in Elderly Compared with Young Women," *J. of Gerontology: Biological Sciences*, 58A(2):123-127 (2003).
Markowitz, J., et al., "Speed Adaptation in a Powered Transtibial Prosthesis Controlled with a Neuromuscular Model," *Phil. Trans. R. Soc. B*, 366:1621-1631 (2011).
McGeer, T., "Passive Dynamic Walking," *International Journal of Robotics Research*, 9(2):62-82 (1990).
Mergner, T., et al., "A Multisensory Posture Control Model of Human Upright Stance," *Prog. Brain Res.*, 142:189-201 (2003).
Naito, H., et al., "Development of Hip Disarticulation Prosthesies Using a Simulator Based on Neuro-Musculo-Skeletal Human Walking Model," *J. Biomechanics Abstract of the 5th World Congress of Biomechanics*, 39 (2006).
Neptune, R., et al., "Modular Control of Human Walking: A simulation Study," *J. of Biomechanics*, 42:1282-1287 (2009).
Neptune, R.R., et al., "Forward Dynamics Simulations Provide Insight into Muscle Mechanical Work During Human Locomotion," *Exercise and Sport Science Reviews*, 37:203-210 (2009).
Neptune, R.R., et al., "The Effect of Walking Speed on Muscle Function and Mechanical Energetics," *Gait and Posture*, 28(1):135-143 (2008).
O'Connor, S.M., et al., "Direction Dependent Control of Balance During Walking and Standing," *J. Neurophysiol*, 102:1411-1419 (2009).
Ogihara, N., et al., "Generation of Human Biped Locomotion by a Bio-Mimetic Neuro-Musculo-Skeletal Model," *Biol. Cybern.*, 84:1-11 (2001).
Perry, J., et al., "Gait Analysis: Normal and Pathological Function," *SLACK incorporated* (1992).
Prilutsky, Bi, "Work, Energy Expenditure, and Efficiency of the Stretchshorting Cycle." *J. Appl. Biomech.*, 13(4):466-470 (1997).
Prochazka, A., et al., "Positive Force Feedback Control of Muscles," *J. Neurophysiol.*, 77:3226-3236 (1997).
Ralson, H.J., "Neural Control of Locomotion," *Chapter Energetics of Human Walking*, pp. 399-406, Plenum Press (1976).
Sanger, T.D., "Bayesian filtering of myoelectric signals," *Journal of Neurophysiology*, 97(2):1839-1845 (Feb. 2007).
Taga, G., "A Model of the Neuro-Musculo-Skeletal System for Anticipatory Adjustment of Human Locomotion during Obstacle Avoidance," *Biol. Cybern.*, 78:9-17 (1998).
Taga, G., "A Model of the Neuro-Musculo-Skeletal System for Human Locomotion Emergence of Basic Gait," *Biol. Cybern.*, 73:638-644 (1995).
Umberger, B.R., et al., "Mechanical Power and Efficiency of Level Walking with Different Stride Rates," *J. of Experimental Biology*, 210:3255-3265 (2007).
Visser, J.J., et al., "Length and Moment Arm of Human Leg Muscles as a Function of Knee and Hip-Joint Angles," *Eur. J. Appl. Physiol.*, 61:453-460 (1990).
Wang, J., "EMG Control of Prosthetic Ankle Plantar Flexion," *MIT Master's Thesis* (2011).
Willems, P.A., et al., "External, Internal and Total Work in Human Locomotion," *J. of Experiment Biology*, 198:379-393 (1995).
Winter, D.A., "Biomechanical Motor Patterns in Normal Walking," *J. of Motor Behavior*, 15(4):302-330 (1983).
Yamaguchi, G.T., et al., "A Survey of Human Musculotendon Actuator Parameters," *Technical Report: Multiple Muscle Systems Biomechanics and Movement Organization*, (1990).

(56) References Cited

OTHER PUBLICATIONS

Zajac, F.E., "Muscle and tendon: properties, models, scaling, and application to biomechanics and motor control," *Critical Reviews in Biomedical Engineering*, 17(4):359-411 (1989).

Ziegler-Graham, K., et al., "Estimating the Prevalence of Limb Loss in the United States, 2005 to 2050," *Archives of Physical Medicine and Rehabilitation*, 89(3):422-429 (2008).

Notice of Allowance from U.S. Appl. No. 12/698,128.

Aeyels, B., et al., "An EMG-Based Finite State Approach for a Microcomputer-Controlled Above-Knee Prosthesis," Engineering in Medicine and Biology Society 1995, pp. 1315-1316 (1997).

Peeraer, L., et al., "Development of EMG-based mode and intent recognition algorithms for a computer-controlled above-knee prosthesis," J. Biomed. Eng., 12: 178-182 (1990).

Saxena, S. C., and Mukhopadhyay, P., "E.M.G. operated electronic artificial-leg controller," Med. & Biol. Eng. & Comput., 15: 553-557 (1977).

Au, S.K.-W., et al., "Powered Ankle-Foot Prosthesis for the Improvement of Amputee Walking Economy." Doctoral dissertation, Massachusetts Institute of Technology (2007).

Endo, K., et al., "A Model of Muscle-Tendon Function in Human Walking," In Proc. of ICRA, pp. 1909-1915 (2009).

Endo, K., et al., "A Model of Muscle-Tendon Function in Human Walking." Doctoral dissertation, Massachusetts Institute of Technology (2012).

Martinez-Villalpando, E. C., "Design and Evaluation of a Biomimetic Agonist-Antagonist Active Knee Prosthesis." Doctoral dissertation, Massachusetts Institute of Technology (2012).

Yun, X., "Dynamic State Feedback Control of Constrained Robot Manipulators." Paper presented at the Proceedings of the 27th Conference on Decision and Control, Austin, TX (Dec. 1988).

Zlatnik, D., et al., "Finite-State Control of a Trans-Femoral (TF) Prosthesis," IEEE Transactions on Control Systems Technology, 10(3): 408-420 (2002).

Abbas, J.J. et al., "Neural Network Control of Functional Neuromuscular Stimulation Systems: Computer Simulation Studies," *IEEE Transactions on Biomedical Engineering*, vol. 42, No. 11, pp. 1117-1127, Nov. 1995.

Abul-Haj, C.J. et al., "Functional Assessment of Control Systems for Cybernetic Elbow Prostheses-Part II: Application of the Technique," *IEEE Transactions on Biomedical Engineering*, vol. 17, No. 11, pp. 1037-1047, Nov. 1990.

Akazawa, K. et al., "Biomimetic EMG-Prosthesis-Hand, 18th Annual International Conference of the IEEE Engineering in Medicine and Biology Society," Amsterdam pp. 535 and 536, 1996.

Aminian, K. et al., "Estimation of Speed and Incline of Walking Using Neural Network," *IEEE Transactions of Instrumentation and Measurement*, 44(3): 743-746 (1995).

Andrews, B.J. et al., "Hybrid FES Orthosis Incorporating Closed Loop Control and Sensory Feedback," *J. Biomed. Eng.*, 10: 189-195(1988).

Arakawa, T. et al., "Natural Motion Generation of Biped Locomotion Robot Using Hierarchical Trajectory Generation Method Consisting of GA, EP Layers," Proceedings of the 1997 IEEE International Conference on Robotics and Automation, Albuquerque, NM., pp. 375-379.

Au, et al., "Initial experimental study on dynamic interaction between an amputee and a powered ankle-foot prosthesis," Workshop on Dynamic Walking: Mechanics and Control of Human and Robot Locomotion, May 2006, Ann Arbor, MI, p. 1.

Au, S.K. et al., "Biomechanical Design of a Powered Ankle-Foot Prosthesis," Proceedings of the 2007 IEEE 10th International Conference on Rehabilitation Robotics, Noordwijk, The Netherlands, pp. 298-303, Jun. 12-15, 2007.

Au, S.K. et al., "Powered Ankle-Foot Prosthesis for the Improvement of Amputee Ambulation," paper presented at the Proceedings of the 29th Annual International Conference of the IEEE Eng. Med. Bio. Soc., Cité Internationale, Lyon, France, (Aug. 2007).

Barth, D.G. et al., "Gait Analysis and Energy Cost of Below-Knee Amputees Wearing Six Different Prosthetic Feet," *JPO*, 4(2): 63 (1992).

Baten, Chris T.M. et al., "Inertial Sensing in Ambulatory Back Load Estimation," paper presented at the 18th Annual International Conference of the IEEE Engineering in Medicine and Biology Society, Amsterdam, 1996, pp. 497-498.

Bateni, H. et al., "Kinematic and Kinetic Variations of Below-Knee Amputee Gait," *JPO*, 14(1):112 (2002).

Blaya, J. et al., "Active Ankle Foot Orthoses (AAFO)," Artificial Intelligence Laboratory, Massachusetts Institute of Technology, Cambridge, MA, pp. 275-277. (no date given).

Blaya, J.A. et al., "Active Ankle Foot Orthoses (AAFO)," Retrieved from: http://www.ai.mit.edu. Artificial Intelligence Laboratory, Massachusetts Institute of Technology, Cambridge, Massachusetts, pp: 251-253 (no date given).

Blaya, J.A. et al., "Adaptive Control of a Variable-Impedance Ankle-Foot Orthosis to Assist Drop Foot Gait," Artificial Intelligence Lab and Harvard-MIT Division Health Sciences and Technology, Boston, MA, 30 pages, no date given.

Blaya, J.A. et al., "Adaptive Control of a Variable-Impedance Ankle-Foot Orthosis to Assist Drop-Foot Gait," IEEE Transactions on Neural Systems and Rehabilitation Engineering, 12(1): 24-31 (2004).

Blaya, J.A., "Force-Controllable Ankle Foot Orthosis (AFO) to Assist Drop Foot Gait," submitted to the Department of Mechanical Engineering, Massachusetts Institute of Technology, Cambridge, Massachusetts (Feb. 2003), 88 pages.

Blickhan, R., "The Spring-Mass Model for Running and Hopping," *J. Biomechanics*, 22(11/12): 1217-1227 (1989).

Bortz, J.E. "A New Mathematical Formulation for Strapdown Inertial Navigation," *IEEE Transactions on Aerospace and Electronic Systems*, AES-7(1): 61-66 (1971).

Bouten, C.V. et al., "Assessment of Energy Expenditure for Physical Activity Using a Triaxial Accelerometer," *Medicine and Science in Sports and Exercise*, 26(12):1516-1523 (1994).

Brockway, J.M., "Derivation of Formulae Used to Calculate Energy Expenditure in Man," *Human Nutrition: Clinical Nutrition* 41C, pp. 463-471 (1987).

Brown, T.G., "On the Nature of the Fundamental Activity of the Nervous Centres; Together with an Analysis of the Conditioning of Rhythmic Activity in Progression, and a Theory of the Evolution of Function in the Nervous System," pp. 24-46 (no date given).

Chang, M.D., L., et al. "Ischemic Colitis and Complications of Constipation Associated With the Use of Alosetron Under a Risk Management Plan: Clinical Characteristics, Outcomes, and Incidences," *Am J Gastroenterol*, 105(4):866-875 (2010).

Chu, A. et al., "On the Biomimetic Design of the Berkeley Lower Extremity Exoskeleton," paper presented at the Proceedings of the 2005 IEEE International Conference on Robotics and Automation, Barcelona, Spain, (Apr. 2005) pp. 4556-4363.

Colborne, G.R., et al., "Analysis of mechanical and metabolic factors in the gait of congenital below knee amputees," *Am. J. Phys. Med. Rehabil.*, vol. 92, pp. 272-278, Oct. 1992.

Colgate, J.E., "The Control of Dynamically Interacting Systems," Massachusetts Institute of Technology, pp. 1-15, Aug. 1988.

Collins, S.H. et al., "A Bipedal Walking Robot with Efficient and Human-Like Gait," Proceedings of the IEEE, Spain, pp. 1983-1988, Apr. 2005.

Collins, S.H. et al., "Controlled Energy Storage and Return Prosthesis Reduces Metabolic Cost of Walking," ISB XXth Congress—ASB 29th Annual Meeting, Jul. 31-Aug. 5, Cleveland, Ohio, pp. 804 (no year given).

Collins, S.H., et al., Supporting Online Material for "Efficient Bipedal Robots Based on Passive-Dynamic Walkers," Mechanical Engineering, University of Michigan, Feb. 11, 2005, Ann Arbor, MI, pp. 1-8.

Crago, P.E. et al., "New Control Strategies for Neuroprosthetic Systems," Journal of Rehabilitation Research and Development, vol. 33, No. 2, Apr. 1996, pp. 158-172.

Daley, M.A. et al., "Running Stability is Enhanced by a Proximo-Distal Gradient in Joint Neuromechanical Control," *The Journal of Experimental Biology*, vol. 210, pp. 383-394 (Feb. 2007).

(56) References Cited

OTHER PUBLICATIONS

Dapena, J. et al., "A Three-Dimensional Analysis of Angular Momentum in the Hammer Throw," Biomechanics Laboratory, Indiana University, IN, *Medicine and Science in Sports and Exercise*, vol. 21, No. 2, pp. 206-220 (1988).
Davids, J.R., "Book Reviews" *Journal of Pediatric Orthopedics* 12, pp. 815, 1992.
Dietz, V. "Proprioception and Locomotor Disorders," *Nature Reviews*, vol. 3, pp. 781-790 (Oct. 2002).
Dietz, V. "Spinal Cord Pattern Generators for Locomotion," *Clinical Neurophysiology*, vol. 114, Issue 8, pp. 1-12 (Aug. 2003).
Doerschuk, P.C. et al., "Upper Extremity Limb Function Discrimination Using EMG Signal Analysis," *IEEE Transactions on Biomedical Engineering*, vol. BME-30, No. 1, Jan. 1983, pp. 18-28.
Doke, J. et al., "Mechanics and Energetics of Swinging the Human Leg," *The Journal of Experimental Biology*, vol. 208, pp. 439-445 (2005).
Dollar, A.M. et al., "Lower Extremity Exoskeletons and Active Orthoses: Challenges and State-of-the-Art," *IEEE Transactions on Robotics*, vol. 24, No. 1, pp. 1-15, Feb. 2008.
Donclan, J.M. et al., "Force Regulation of Ankle Extensor Muscle Activity in Freely Walking Cats," *Journal of Neurophysiology*, vol. 101, pp. 360-371 (2009).
Donelan, J.M. et al., "Simultaneous Positive and Negative External Mechanical Work in Human Walking," *Journal of Biomechanics*, vol. 35, 2002, pp. 117-124 (2002).
Drake, C., "Foot & Ankle Splints or Orthoses," HemiHelp Information Sheet, London, United Kingdom, 3 pages, http://www.hemihelp.org.uk/leaflets/hbleaflets90.htm Retrieved on: Jun. 20, 2003.
Drake, C., "Ankle & Foot Splints or Orthoses (AFOs)," HemiHelp Information Sheet, pp. 1-6, last revision Dec. 2011.
Drake, C., "Foot & Ankle Splints or Orthoses," HemiHelp Information Sheet No. 13, pp. 1-5, last updated Jun. 2009.
Eilenberg, M.F. "A Neuromuscular-Model Based Control Strategy for Powered Ankle-Foot Prostheses," Massachusetts Institute of Technology, pp. 1-90. Jul. 20, 2010.
Ekeberg, Ö et al., "Computer Simulation of Stepping in the Hind Legs of the Cat: An Examination of Mechanisms Regulating the Stance-to-Swing Transition," *J. Neurophysical*, vol. 94, pp. 4256-4268 (2005).
Ekeberg, Ö et al., "Simulations of Neuromuscular Control in Lamprey Swimming," The Royal Society, *Phil. Trans. R. Soc. Land*, vol. 354, pp. 895-902 (1999).
Endo, K. et al., "A Quasi-Passive Model of Human Leg Function in Level-Ground Walking," Proceedings of the 2006 IEEE/RSJ International Conference on Intelligent Robots and Systems, Oct. 9-15, 2006, Beijing, China, pp. 4935-4939.
Eppinger, S.D. et al., "Three Dynamic Problems in Robot Force Control," *IEEE Transactions on Robotics and Automation*, vol. 8, No. 6, pp. 772-778 (Dec. 1992).
Esquenazi, M.D., A., et al., "Rehabilitation After Amputation," *J Am Podiatr Med Assoc* vol. 91, No. 1, pp. 13-22 (Jan. 2001).
Farley, C.T. et al., "Energetics of Walking and Running: Insights From Simulated Reduced-Gravity Experiments," *J. Appl. Physiol.* 73(6):2709-2712 (1992).
Farry, K.A. et al., "Myoelectric Teleoperation of a Complex Robotic Hand," *IEEE Transactions on Robotics and Automation*, vol. 12, No. 5, pp. 775-778 (Oct. 1996).
Featherstone, R., "Robot Dynamics Algorithms," Edinburgh University, pp. 1-173, 1987.
Fite, K. et al., "Design and Control of an Electrically Powered Knee Prosthesis," Proceedings of the 2007 IEEE 10th International Conference on Rehabilitation Robotics, Jun. 12-15, The Netherlands, pp. 902-905.
Flowers, W.C., "A Man-Interactive Simulator System for Above-Knee Prosthetics Studies," Partial fulfillment for Doctor of Philosophy, MIT, pp. 1-94 Aug. 1972.
Fod, A. et al., "Automated Derivation of Primitives for Movement Classification," *Autonomous Robots*, vol. 12, No. 1, pp. 39-54 (Jan. 2002).

Frigon, A. et al., "Experiments and Models of Sensorimotor Interactions During Locomotion," *Biological Cybernetics*, vol. 95, pp. 606-627 (2006).
Fujita et al., "Joint Angle Control with Command Filter for Human Ankle Movement Using Functional Electrical Stimulation," Proceedings of the Ninth Annual Conference of the IEEE Engineering in Medicine and Biology Society, Boston, MA, Nov. 13-16, 1987.
Fukuda, O. et al., "A Human-Assisting Manipulator Teleoperated by EMG Signals and Arm Motions," *IEEE Transactions on Robotics and Automation*, vol. 19, No. 2, pp. 210-222 (Apr. 2003).
Gates, D.H. Thesis: "Characterizing Ankle Function During Stair Ascent, Descent, and Level Walking for Ankle Prosthesis and Orthosis Design," Boston University, pp. 1-84 (2004).
Gerritsen, K.G.M. et al., "Direct Dynamics Simulation of the Impact Phase in Heel-Toe Running," *J. Biomechanics*, vol. 28, No. 6, pp. 661-668 (1995).
Geyer, H. et al., "A Muscle-Reflex Model That Encodes Principles of Legged Mechanics Predicts Human Walking Dynamics and Muscle Activities," *IEEE Transactions on Neural Systems and Rehabilitation Engineering*, vol. 18, No. 3, pp. 263-273 (Jun. 2010).
Geyer, H. et al., "Compliant Leg Behavior Explains Basic Dynamics of Walking and Running," Proc. R. Soc. B, vol. 273, pp. 2861-2867 (2006).
Ghigliazza, R.M. et al., "A Simply Stabilized Running Model," University of Pennsylvania, *SIAM Journal on Applied Dynamical Systems*, vol. 2, Issue 2, pp. 187-218 (May 8, 2004).
Giszter, S., et al., "Convergent Force Fields Organized in the Frog's Spinal Cord," *Journal of Neuroscience*, 13(2): 467-491 (1993).
Godha, S. et al., "Integrated GPS/INS System for Pedestrian Navigation in a Signal Degraded Environment," ION GNSS, Fort Worth, TX, Sep. 26-29, 2006 pp. 1-14.
Goswami, A. et al., "Rate of Change of Angular Momentum and Balance Maintenance of Biped Robots," Proceedings of the 2004 IEEE International Conference on Robotics and Automation, New Orleans, LA, Apr. 2004, pp. 3785-3790.
Goswami, A., "Postural Stability of Biped Robots and the Foot-Rotation Indicator (FRI) Point," *The International Journal of Robotics Research*, vol. 18, No. 6, pp. 523-533 (Jun. 1999).
Graupe, D. et al., "A Microprocessor System for Multifunctional Control of Upper-Limb Prostheses via Myoelectric Signal Identification," *IEEE Transactions on Automatic Control*, vol. 23, No. 4, pp. 538-544 (Aug. 1978).
Gregoire, L. et al., "Role of Mono- and Biarticular Muscles in Explosive Movements," *International Journal of Sports Medicine*, vol. 5, No. 6, pp. 299-352 (Dec. 1984).
Grillner, S. and Zangger, P., "On the Central Generation of Locomotion in the Low Spinal Cat," *Experimental Brain Research*, 34: 241-261 (1979).
Grimes, D.L., "An Active Multi-Mode Above-Knee Prosthesis Controller," unpublished doctoral dissertation, Massachusetts Institute of Technology (1979).
Gu, W.J., "The Regulation of Angular Momentum During Human Walking," unpublished doctoral dissertation, Massachusetts Institute of Technology, 42 pages (2003).
Gunther, M. et al., "Human Leg Design: Optimal Axial Alignment Under Constraints," *J. Math. Biol.*, 48: 623-646 (2004).
Hanafusa, et al., "A Robot Hand with Elastic Fingers and Its Application to Assembly Process," pp. 337-359, Robot Motion, Brady, et al., MIT Press, Cambridge, MA 1982.
Hansen, A.H., et al., "The Human Ankle During Walking: Implications for Design of Biomimetic Ankle Prostheses," *Journal of Biomechanics*, 37: 1467-1474 (2004).
Hayes, W.C., et al., "Leg Motion Analysis During Gait by Multiaxial Accelerometry: Theoretical Foundations and Preliminary Validations," *Journal of Biomechanical Engineering*, 105: 283-289 (1983).
Heglund, N. et al., "A Simple Design for a Force-Plate to Measure Ground Reaction Forces," *J. Exp. Biol.*, 93: 333-338 (1981).
Herr, H.M. et al., "A Model of Scale Effects in mammalian Quadrupedal Running," *The Journal of Experimental Biology*, 205: 959-967 (2002).
Herr, H.M., and McMahon, T.A., "A Trotting Horse Model," *The International Journal of Robotics Research*, 19: 566-581 (2000).

(56) References Cited

OTHER PUBLICATIONS

Herr, H.M., and Wilkenfeld, A., "User-adaptive Control of A Magnetorheological Prosthetic Knee," *Industrial Robot: An International Journal*, 30(1): 42-55 (2003).

Herr, Hugh et al. "New Horizons for Orthotic and Prosthetic Technology: Artificial Muscle for Ambulation," The MIT Media Laboratory, pp. 1-9, 2004.

Heyn, A., et al., "The Kinematics of the Swing Phase Obtained From Accelerometer and Gyroscope Measurements," paper presented at the 18$^{th}$ Annual International Conference of the IEEE Engineering in Medicine and Biology Society, Amsterdam (1996).

Hirai, K., et al., "The Development of Honda Humanoid Robot," paper presented at the IEEE International Conference on Robotics & Automation, Leuven, Belgium (1998).

Hitt, J.K., et al., "The Sparky (Spring Ankle with Regenerative Kinetics) Project: Design and Analysis of a Robotic Transtibial Prosthesis with Regenerative Kinetics," Proceedings of the ASME International Design Engineering Technical Conferences and Computers and Information in Engineering Conference, vol. 5 Part C, DETC2007-34512, pp. 1587-1596, Las Vegas, Nevada (Sep. 2007).

Hof, A.L., et al., "Calf Muscle Moment, Work and Efficiency in Level Walking. Role of Series Elasticity," *J. Biochem.*, 16: 523-537 (1983).

Hofbaur, M.W., and Williams, B.C., "Mode Estimation of Probabilistic Hybrid Systems," MIT Space Systems and Artificial Intelligence Laboratories and Graz University of Technology, Department of Automatic Control, (No Date given).

Hofbaur, M.W., et al., "Hybrid Diagnosis with Unknown Behavioral Modes," Proceedings of the 13$^{th}$ International Workshop on Principles of Diagnosis (DX02) (2002).

Hofmann, A., et al., "A Sliding Controller for Bipedal Balancing Using Integrated Movement of Contact and Non-Contact Limbs," Proceedings of the 2004 IEEE/RSJ International Conference on Intelligence Robots and Systems, Japan (2004).

Hofmann, A.G., "Robust Execution of Bipedal Walking Tasks From Biomechanical Principles," unpublished doctoral dissertation for Massachusetts Institute of Technology (2006).

Hogan, N., "Impedance Control: An Approach to Manipulation," Dept. of Mechanical Engineering and Labortory of Manufacturing and Productivity, Massachusetts Institute of Technology, Cambridge MA, pp. 304-313 (Jun. 1984).

Hogan, N., "Impedance Control: An Approach to Manipulation: Part II—Implementation, " *Journal of Dynamic Systems, Measurement, and Control*,107: 8-16 (1985).

Hogan, N., "A Review of the Methods of Processing EMG for Use As a Proportional Control Signal," *Biomedical Engineering*, 11(3): 81-86 (1976).

Hogan, N., "Impedance Control: An Approach to Manipulation: Part I—Theory," *Journal of Dynamic Systems, Measurement, and Control*, 107: 1-7 (1985).

Hogan, N., "Impedance Control: An Approach to Manipulation: Part III—Application," *Journal of Dynamics Systems, Measurement and Control*, 107: 17-24 (1985).

Hogan, N., and Buerger, S.P., "Impedance and Interaction Control, Robots and Automation Handbook, Chapter 19, © 2005 by CRC Press LLC, 24 pgs.".

Holgate, M.A., et al., "The SPARKy (Spring Ankle with Regenerative Kinetics) Project: Choosing a DC Motor Based Actuation Method," Proceedings of the 2nd Biennial IEEE-EMBS International Conf. on Biomedical Robotics and Biomechatronics, Scottsdale, AZ, pp. 163-168, Oct. 19-22, 2008.

Hollander, K.W. et al., "Adjustable Robotic Tendon using a 'Jack Spring'™," Proceedings of the 2005 IEEE, 9$^{th}$ International Conference on Rehabilitation Robotics, Jun. 28-Jul. 1, 2005, Chicago, IL, USA, pp. 113-118.

Howard, R.D., Thesis: "Joint and Actuator Design for Enhanced Stability in Robotic Force Control," Submitted to the Dept. of Aeronautics and Astronautics on Aug. 8, 1990 in partial fulfillment of the requirements for the degree of Doctor of Philosophy.

Huang, H.-P. et al., "Development of a Myoelectric Discrimination System for a Multi-Degree Prosthetic Hand," Proceedings of the 1999 IEEE, International Conference on Robotics & Automation, Detroit, Michigan, (1999).

Huang, Q. et al., "Planning Walking Patterns for a Biped Robot," *IEEE Transactions on Robotics and Automation*,17(3): 280-289 (Jun. 2001).

Hultborn, H., "Spinal reflexes, mechanisms and concepts: From Eccles to Lundberg and beyond," *Progress in Neurobiology*,78: 215-232 (2006).

Ijspeert, A.J. et al., "From swimming to walking with a salamander robot driven by a spinal cord model," pp. 1-5 (no further info).

Ijspeert, A.J., "Central pattern generators for locomotion control in animals and robots: a review," *Preprint of Neural Networks*, vol. 21, No. 4, pp. 642-653 (2008).

International Preliminary Report on Patentability for International Application No. PCT/US2010/047279; Mailed: Mar. 15, 2012.

International Search Report and Written Opinion for International Application No. PCT/US2009/055600, Mailed: Apr. 29, 2010.

International Search Report and Written Opinion for International Application No. PCT/US2010/047279; Mailed: Jan. 19, 2011.

International Search Report and Written Opinion for International Application No. PCT/US2011/031105, Mailed: Oct. 11, 2011.

International Search Report for PCT/US2010/022783, "Model-Based Neuromechanical Controller for a Robotic Leg", dated May 4, 2010.

Ivashko, D.G. et al., "Modeling the spinal cord neural circuitry controlling cat hindlimb movement during locomotion," Neurocomputing, 52-54, pp. 621-629 (2003).

Johansson, J.L. et al., "A Clinical Comparison of Variable-Damping and Mechanically Passive Prosthetic Knee Devices," Variable-Damping vs. Mechanically Passive Prosthetic Knees, *Am J Phys Med Rehabil* 84(8):1-13, (Aug. 2005).

Johnson, C.T. et al., "Experimental Identification of Friction and Its Compensation in Precise, Position Controlled Mechanisms," *IEEE Transactions on Industry Applications*, vol. 28, No. 6, pp, 1392-1398 (Nov./Dec. 1992).

Jonic, S. et al., "Three Machine Learning Techniques for Automatic Determination of Rules to Control Locomotion," *IEEE Transactions on Biomedical Engineering*, vol. 46, No. 3, pp. 300-310 (Mar. 1999).

Kajita, S. et al., "A Hop towards Running Humanoid Biped," Proceedings of the 2004 IEEE International Conference on Robotics & Automation, pp. 629-635, 2004.

Kajita, S. et al., "Biped Walking on a Low Friction Floor," Proceedings of the 2004 IEEE/RSJ International Conference on Intelligent Robots & Systems, pp. 3546-3552, Sep. 28-Oct. 2, 2004, Sendai, Japan.

Kajita, S. et al., "Resolved Momentum Control: Humanoid Motion Planning based on the Linear and Angular Momentum," Proceedings of the 2003 IEEE/RSJ International Conference on Intelligent Robots & Systems, pp. 1644-1650 (2003).

Kaneko, K. et al., "Humanoid Robot HRP-2," Proceedings of the 2004 IEEE International Conference on Robotics & Automation, pp. 1083-1090 (Apr. 2004).

Kapti, A.O. et al., "Design and control of an active artificial knee joint," *Mechanism and Machine Theory*, vol. 41, pp. 1477-1485 (2006).

Katie, D. et al., "Survey of Intelligent Control Techniques for Humanoid Robots," *Journal of Intelligent and Robotic Systems*, vol. 37, pp. 117-141 (2003).

Khatib, O. et al., "Coordination and Decentralized Cooperation of Multiple Mobile Manipulators," *Journal of Robotic Systems*, 13(11): 755-764 (1996).

Khatib, O. et al., "Whole-Body Dynamic Behavior and Control of Human-Like Robots," *International Journal of Humanoid Robotics*, vol. 1, No. 1, pp. 29-43 (2004).

Kidder, S.M. et al., "A System for the Analysis of Foot and Ankle Kinematics During Gait," *IEEE Transactions on Rehabilitation Engineering*, vol. 4, No. 1, pp. 25-32 (Mar. 1996).

Kim, J.-H. et al., "Realization of Dynamic Walking for the Humaniod Robot Platform KHR-1," *Advanced Robotics*, 18(7): 749-768, (2004).

(56) References Cited

OTHER PUBLICATIONS

Kirkwood, C.A. et al., "Automatic detection of gait events: a case study using inductive learning techniques," *J. Biomed. Eng.*, vol. 11, pp. 511-516 (Nov. 1989).

Kitayama, I. et al., "A Microcomputer Controlled Intelligent A/K Prosthesis—Fundamental Development," Proceedings, Seventh World Congress of ISPO, Jun. 28-Jul. 3, 1992, Chicago, Illinois, USA, 25 pages.

Klute, G.K. et al, "Intelligent transtibial prostheses with muscle-like actuators," 2002 American Physiological Society Intersociety Meeting: The Power of Comparative Physiology: Evolution, Integration, and Applied, 1 page abstract.

Klute, G.K. et al., "Artificial Muscles: Actuators for Biorobotic Systems," *The International Journal of Robotics Research*, 21(4): 295-309 (2002).

Klute, G.K. et al., "Artificial Tendons: Biomechanical Design Properties for Prosthetic Lower Limbs," Chicago 2000 World Congress on Medical Physics and Biomedical Engineering, Chicago on Jul. 24-28, 2000, 4 pages.

Klute, G.K. et al., "Lower Limb Prostheses Powered by Muscle-Like Pneumatic Actuator," Submitted to Oleodinamica e Pneumatica, Publishe Tecniche Nuove, Milamo, Italy, Mar. 15, 2000, 6 pages.

Klute, G.K. et al., "McKibben Artificial Muscles: Pneumatic Actuators with Biomechanical Intelligence," IEEE/ASME 1999 International Conference on Advanced Intelligent Mechatronics, Atlanta, GA, pp. 221-226 (Sep. 1999).

Klute, G.K. et al., "Muscle-Like Pneumatic Actuators for Below-Knee Prostheses," Actuator 2000: 7th International Conference on New Actuators, Bremen, Germany on Jun. 19-21, 2000, pp. 289-292.

Klute, G.K. et al., "Powering Lower Limb Prosthestics with Muscle-Like Actuators," Abstract in: Proceeding of the 1st Annual Meeting of the VA Rehabilitation Research and Development Service, "Enabling Veterans: Meeting the Challenge of Rehabilitation in the Next Millennium," Washington, D.C., p. 52 (Oct. 1998).

Klute, G.K. et al., "Variable Stiffness Prosthesis for Transtibial Amputees," Dept of Veteran Affairs, Seattle, WA USA, 2 pages (2003).

Klute, G.K. et al., "Artificial Muscles: Actuators for Lower Limb Prostheses," Abstract in: Proceedings of the $2^{nd}$ Annual Meeting of the VA Rehabilitation Research and Development Service, Washington, D.C., Feb. 20-22, 2000, p. 107.

Klute, G.K. et al., "Mechanical properties of prosthetic limbs: Adapting to the patient, "*Journal of Rehabilitation Research and Development*, vol. 38, No. 3, pp. 299-307 (May/Jun. 2001).

Koganezawa, K. et al., *Biomedical Engineering* 1987, 2.3: Control Aspects of Artificial Leg, pp. 71-85 (1987).

Kondak, K. et al., "Control and Online Computation of Stable Movement for Biped Robots," Proceedings of the 2003 IEEE/RSJ, Int'l Conference on Intelligent Robots and Systems, Las Vegas, Nevada, Oct. 2003, pp. 874-879.

Kostov, A. et al., "Machine Learning in Control of Functional Electrical Stimulation Systems for Locomotion," *IEEE Transactions on Biomedical Engineering*, vol. 42, No. 6, pp. 541-551 (Jun. 1995).

Kuo, A.D., "A Simple Model of Bipedal Walking Predicts the Preferred Speed—Step Length Relationship," *Transactions of the ASME*, vol. 123, pp. 264-269 (Jun. 2001).

Kuo, A.D., "Energetics of Actively Powered Locomotion Using the Simplest Walking Model," *Journal of Biomechanical Engineering*, vol. 124, pp. 113-120 (Feb. 2002).

Lafortune, M.A., "Three-Dimensional Acceleration of the Tibia During Walking and Running," *J. Biomechanics*, vol. 24, No. 10, pp. 877-886 (1991).

LeBlanc, M.K. et al., "Generation and Transfer of Angular Momentum in the Javelin Throw," American Society of Biomechanics, Presented at the $20^{th}$ Annual Meeting of the American Society of Biomechanics, Atlanta, Georgia, Oct. 17-19, 1996, 4 pages.

Li, C. et al., "Research and Development of the Intelligently-Controlled Prosthetic Ankle Joint," Proceedings of the 2006 IEEE International Conference on Mechatronics and Automation, Jun. 25-28, 2006, Luoyana, China, pp. 1114-1119.

Light, L.H. et al., "Skeletal Transients on Heel Strike in Normal Walking with Different Footwear," *J. Biomechanics*, vol. 13, pp. 477-480 (1980).

Liu, X. et al., "Development of a Lower Extremity Exoskeleton for Human Performance Enhancement," Proceedings of 2004 IEEE/RSJ International Conference on Intelligent Robots and Systems, Sep. 28-Oct. 2, 2004, Sendai, Japan, 3889-3894.

Lloyd, R. et al., "Kinetic changes associated with load carriage using two rucksack designs," *Ergonomics*, vol. 43, No. 9, pp. 1331-1341 (2000).

Luinge, H.J., *Inertial Sensing of Human Movement*, Twente University Press, Enschede, the Netherlands, 80 pages (Feb. 15, 1973).

Lundberg, A., "Reflex control of stepping," The Norwegian Academy of Science and Letters, The Nansen Memorial Lecture, Oct. 10, 1968, 40 pages.

Macfarlane, P.A. et al., "Gait Comparisons for Below-Knee Amputees Using a Flex-Foot(TM) Versus a Conventional Prosthetic Foot," JPO 1991, vol. 3, No. 4, pp. 150, htt://www.oandp.org/jpo/library/printArticle.asp?printArticleld=1991_04_150, Retrieved on: Feb. 9, 2012, 10 pages.

Maganaris, C.N., "Force-length characteristics of in vivo human skeletal muscle," *Acta Physiol Scand*, 172: 279-285 (2001).

Maganaris, C.N., "Force-Length Characteristics of the in Vivo Human Gastroenemius Muscle," *Clinical Anatomy*, 16: 215-223 (2003).

Martens, W.L.J., "Exploring the Information Content and Some Applications of Body Mounted Piezo-Resistive Accelerometers," PhyVision b.v., Gernert, The Netherlands, pp. 9-12, no date given.

Maufroy, C. et al., "Towards a general neural controller for quadrupedal locomotion," *Neural Networks*, 21: 667-681 (2008).

Mayagoitia, R.E. et al., "Accelerometer and rate gyroscope measurement of kinematics: an inexpensive alternative to optical motion analysis systems," *Journal of Biomechanics*, 35: 537-542 (2002).

McFadyen, B.J. et al., "An Integrated Biomechanical Analysis of Normal Stair Ascent and Descent," *J. Biomechanics*, vol. 21, No. 9, pp. 733-744 (1988).

McGeer, T., Chapter 4: "Principles of Walking and Running," *Advances in Comparative and Environmental Physiology*, Chapter 4, pp. 113-139 (1992).

McIntosh, A.S. et al., "Gait dynamics on an inclined walkway," *J. Biomechanics*, vol. 39, Issue 13, pp. 2491-2502 (2006).

McMahon, T.A. et al., "Groucho Running," *J. Appl. Physiol.* 62(6) pp. 2326-2337 (1987).

McMahon, T.A. et al., "The Mechanics of Running: How Does Stiffness Couple with Speed?" *J. Biomechanics*, vol. 23, Suppl. 1, pp. 65-78 (1990).

Minassian, K. et al., "Human lumbar cord circuitries can be activated by extrinsic tonic input to generate locomotor-like activity," *Human Movement Science*, 26: 275-295 (2007).

Mochon, S. et al., "Ballistic Walking," *J. Biomechanics*, vol. 13, pp. 49-57 (1980).

Molen, N.H., "Energy/Speed Relation of Below-Knee Amputees Walking on a Motor-Driven Treadmill," *Physiol*, 31: 173-185 (1973).

Morris, J.R.W., "Accelerometry—A Technique for the Measurement of Human Body Movements," *J. Biomechanics*, vol. 6, pp. 729-736 (1973).

Muraoka, T. et al., "Muscle fiber and tendon length changes in the human vastus lateralis during show pedaling," *J. Appl. Physiol.*, 91: 2035-2040 (2001).

Nakagawa, A., "Intelligent Knee Mechanism and the Possibility to Apply the Principle to the Other Joints," paper presented at the Proceedings of the $20^{th}$ Annual International Conference of the IEEE Engineering in Medicine and Biology Society, 20(5): 2282-2287 (1998).

Neal, R. M. et al., "A View of the EM Algorithm That Justifies Incremental, Sparse, and Other Variants," pp. 1-14, no date given.

Ng, S.K. et al., "Fuzzy Model Identification for Classification of Gait Events in Paraplegics," IEEE Transactions on Fuzzy Systems, 5(4) (1997).

Nielsen, D.H. et al., "Comparison of Energy Cost and Gait Efficiency during Ambulation in Below-Knee Ampuees Using Different Prosthetic Feet," JPO, 1:24-31, http://www.oandp.org/jpo/library/1989_01_024.asd, Retrieved on: Feb. 7, 2012.

(56) References Cited

OTHER PUBLICATIONS

Oda, T. et al. "In Vivo Length-Force Relationships on Muscle Fiber and Muscle Tendon Complex in the Tibialis Anterior Muscle," International Journal of Sport and Health Sciences, 3:245-252 (2005).
Palmer, M.L., "Sagittal Plane Characterization of Normal Human Ankle Function Across A Range of Walking Gait Speeds," Unpublished master's thesis, Massachusetts Institute of Technology, Massachusetts, 71 pages (2002).
Paluska, D., and Herr H., "The Effect of Series Elasticity on Actuator Power and Work Output: Implications for Robotic and Prosthetic Joint Design," Robotics and Autonomous Systems, 54:667-673 (2006).
Paluska, D., and Herr, H., "Series Elasticity and Actuator Power Output," paper presented at the Proceedings of the 2006 IEEE International Conference on Robotics and Automation, 4 pages (May 2006).
Pang, M.Y.C. and Yang, J.F., "The Initiation of the Swing Phase in Human Infact Stepping: Importance of Hip Position and Leg Loading," Journal of Physiology, 528(2):389-404 (2000).
Pasch, K.A., et al., "On the drive systems for high performance machines," AMSE J. Mechanisms, Transmissions, and Automation in Design 106(1):102-108 (Mar. 1984).
Paul, C., et al., "Development of a Human Neuro-Musculo-Skeletal Model for Investigation of Spinal Cord Injury," Biol. Cybern., 93:153-170 (2005).
Pearson, K., et al., "Assessing Sensory Function in Locomotor Systems Using neurp-mechanical Simulations," Trends in Neurosciences, 29(11): 626-631 (2006).
Pearson, K.G., "Generating the Walking Gait: Role of Sensory Feedback," Progress in Brain Research, 143:123-129 (2004).
Perry, J., et al., "Efficiency of Dynamic Elastic Response Prosthetic Feet," Journal of Rehabilitation Research, 30(1):137-143 (1993).
Petrofsky, J.S.., et al., "Feedback Control System for Walking in Man," Comput. Biol. Med. 14(2):135-149 (1984).
Pfeffer, L.E., et al., "Experiments with a Dual-Armed, Cooperative, Flexible-Drivetrain Robot System," paper presented at the IEEE, Aerospace Robotics Laboratory, Department of Aeronautics and Astronautics, Stanford University (1993).
Popovic, D. and Sinkjaer, T., "Control of Movement for the Physically Disabled: Control for Rehabilitation Technology," (Springer Publisher) pp. 270-302, no date given.
Popovic, D., et al., "Control Aspects of Active Above-Knee Prosthesis," Int. J. Man-Machine Studies, 35:751-767 (1991).
Popovic, M., et al., "Angular Momentum Primitives for Human Walking: Biomechanics and Control," paper presented at the Proceedings IEEE/RSJ International Conference on Intelligent Robots and Systems, Sendai, Japan, pp. 1685-1691 (2004).
Popovic, M., et al., "Angular Momentum Regulation During Human Walking: Biomechanics and Control," paper presented at the Proceedings IEEE International Conference on Robotics and Automation, New Orleans, LA, pp. 2405-2411 (2004).
Popovic, M., et al., "Conservation of Angular Momentum During Human Locomotion," MIT Artificial Intelligence Laboratory, pp. 231-232 (2002).
Popovic, M.B. and Herr, H., "Global Motion Control and Support Base Planning," MIT pp. 1-8, no date given.
Popovic, M.B. and Herr, H., "Ground Reference Points in Legged Locomotion: Definitions, Biological Trajectories and Control Implications," Mobile Robots Towards New Applications, ISBN 3-86611-314-5, pp. 79-104 (2006).
Popovic, M.B., et al., "Zero Spin Angular Momentum Control: Definition and Applicability," MIT, pp. 1-16, no date given.
Popovic, M.R., et al., "Gait Identification and Recognition Sensor," paper presented at the Proceedings of 6th Vienna International Workshop on Functional Electrostiumlation (Sep. 1998).
Pratt, G.A. and Williamson, M.M., "Series Elastic Actuators." Paper presented at the meeting of the IEEE, pp. 399-406 (1995).
Pratt, G.A., "Legged Robots at MIT: What's New Since Raibert." Paper presented at the meeting of the IEEE, Robotics and Automation Magazine (Sep. 2000).

Pratt, G.A., "Low Impedance Walking Robots," Integ. and Comp. Biol., 42: 174-181 (2002).
Pratt, J.E., et al., "The RoboKnee: An Exoskeleton for Enhancing Strength and Endurance During Walking." Paper presented at the Proceedings of the 2004 IEEE International Conference on Robotics & Automation, New Orleans, LA (Apr. 2004).
Prochazka, A. and Yakovenko, S., "The Neuromechanical Tuning Hypothesis," Progress in Brain Research, 165: 257-267 (2007).
Prochazka, A., et al., "Sensory Control of Locomotion: Reflexes Versus Higher-Level Control," Sensorimotor Control of Movement and Posture, pp. 357-367 (2002).
Raibert, M.H., "Legged Robots that Balance," MIT Press, Cambridge, MA, p. 89 (1985).
Rassier, D.E., et al., "Length Dependence of Active Force Production in Skeletal Muscle," The American Physiological Society, pp. 1445-1457 (1999).
Riener, R., et al., "Stair Ascent and Descent at Different Inclinations," Gait and Posture, 15: 32-44 (2002).
Rietman, J.S., et al., "Gait Analysis in Prosthetics: Opinions, Ideas and Conclusions," Prosthetics and Orthotics International, 26: 50-57 (2002).
Robinson, D.W., "Design and Analysis of Series Elasticity in Closed-Loop Actuator Force Control." Unpublished doctoral dissertation, Massachusetts Institute of Technology (2000).
Robinson, D.W., et al., "Series Elastic Actuator Development for a Biomimetic Walking Robot." Paper presented at the IEEE/ASME International Conf. on Adv. Intelligent Mechatronics (Sep. 19-22, 1999).
Rosen, J., et al., "A Myosignal-Based Powered Exoskeleton System," IEEE Transaction on Systems, Man, and Cybernetics—Part A: Systems and Humans, 31(3):210-222 (2001).
Ruina, A., et al., "A Collisional Model of the Energetic Cost of Support Work Qualitatively Explains Leg Sequencing in Walking and Galloping, Pseudo-Elastic Leg Behavior in Running and the Walk-To-Run Transition," J. of Theoretical Biology, 237: 170-192 (2005).
Rybak, I.A., et al., "Modelling Spinal Circuitry Involved in Locomotor Pattern Generation: Insights from Deletions During Fictive Locomotion," J. Physiol., 577(2):617-639 (2006).
Rybak, I.A., et al., "Modelling Spinal Circuitry Involved in Locomotor Pattern Generation: Insights from the Effects of Afferent Stimulation," J. Physiol., 577(2):641-658 (2006).
Sanderson, D.J. and Martin. P.E., "Lower Extremity Kinematic and Kinetic Adaptations in Unilateral Below-Knee Amputees During Walking," Gait & Posture, 6(2):126-136 (1997).
Sanger, T.D., "Human Arm Movements Described by a Low-Dimensional Superposition of Principal Components," The J. of Neuroscience, 20(3):1066-1072 (2000).
Saranli, U., et al., "RHex: A Simple and Highly Mobile Hexapod Robot," The International Journal of Robotics Research, pp. 616-631 (2001).
Sarrigeorgidis, K. and Kyriakopoulos, K.J., "Motion Control of the N.T.U.A. Robotic Snake on a Planar Surface." Paper presented at the Proceedings of the 1998 IEEE International Conference on Robotics & Automation, Leuven, Belgium (May 1998).
Schaal, S. and Atkeson, C.G., "Constructive Incremental Learning from Only Local Information," Neural Computation, 10(8): 2047-2084 (1998).
Schaal, S., "Is Imitation Learning the Route to Humanoid Robots?", Trends in Cognitive Sciences, 3: 233-242 (1999).
Scott, S.H. and Winter, D.A., "Biomechanical Model of the Human Foot: Kinematics and Kinetics During the Stance Phase of Walking," J. Biomechanics, 26(9): 1091-1104 (1993).
Sentis, L. and Khatib, 0., "Task-Oriented Control of Humanoid Robots Through Prioritization." Paper presented at the IEEE-RAS/RSJ International Conference on Humanoid Robots, pp. 1-16 (no date given).
Seyfarth, A., et al., "A Movement Criterion for Running," J. of Biomechanics, 35: 649-655 (2002).
Seyfarth, A., et al., "Stable Operation of an Elastic Three-Segment Leg," Biol. Cybern., 84: 365-382 (2001).
Seyfarth, A., et al., "Swing-Leg Retraction: A Simple Control Model for Stable Running," The J. of Experimental Biology, 206: 2547-2555 (2003).

(56) References Cited

OTHER PUBLICATIONS

Sinkjaer, T., et al., "Major role for sensory feedback in soleus EMG activity in the stance phase of walking in man," *Journal of Physiology*, 523.3: 817-827 (2000).

Skinner, H.B., and Effeney, D.J., "Gait Analysis in Amputees," *American Journal of Physical Medicine*, 64(2): 82-89 (1985).

Smidt, G.L., et al., "An Automated Accelerometry System for Gait Analysis," *J. Biomechanics*, 10: 367-375 (1977).

Srinivasan, M., "Energetics of Legged Locomotion: Why is Total Metabolic Cost Proportional to the Cost of Stance Work." ISB XXth Congress—ASB 29$^{th}$ Annual Meeting, Cleveland, OH (Jul. 31-Aug. 5 (no year given).

Stepien, J., et al., "Activity Levels Among Lower-Limb Amputees: Self-Report Versus Step Activity Monitor," *Arch. Phys. Med. Rehabil.*, 88: 896-900 (2007).

Sugano, S., et al., "Force Control of the Robot Finger Joint equipped with Mechanical Compliance Adjuster," Proceedings of the 1992 IEEE/RSJ International Conference on Intelligent Robots and Systems, Raleigh, NC (Jul. 1992).

Sugihara, T., et al., "Realtime Humanoid Motion Generation through ZMP Manipulation based on Inverted Pendulum Control," Proceedings of the 2002 IEEE International Conference on Robotics & Automation, Washington, DC (May 2002).

Sup, F., at al., "Design and Control of a Powered Transfemoral Prosthesis," *The International Journal of Robotics Research*, 27(2): 263-273 (2008).

Supplementary European Search Report Application No. 10736533.0 dated Aug. 16, 2013.

Supplementary European Search Report Application No. 10736550.0 dated Aug. 1, 2013.

Takayuki, F., et al., "Biped Locomotion using Multiple Link Virtual Inverted Pendulum Model," *T.IEE Japan*, 120-C (2): 208-214 (2000).

Thoroughman, K., and Shadmehr, R., "Learning of action through adaptive combination of motor primitives," *Nature*, 407: 742-747(2000).

Tomović, R., and McHee, R.B., "A Finite State Approach to the Synthesis of Bioengineering Control Systems," *IEEE Transactions on Human Factors in Electronics*, 7(2): 65-69 (1966).

Tong, K., and Granat, M., "A practical gait analysis system using gyroscopes," *Medical Engineering & Physics*, 21: 87-94 (1999).

Türker, K., "Electromyography: Some Methodological Problems and Issues," *Phys. Ther.*, 73: 698-710 (1993).

Van den Bogert, A. J., "Exotendons for Assistance of Human Locomotion," Biomedical Engineering OnLine, BioMed Central, 2(17):1-8 (2003).

Van den Bogert, A. J., et al., "A Method for Inverse Dynamic Analysis Using Accelerometry," *J. Biochemechanics*, 29(7): 949-954 (1996).

Veltink, P.H., et al., "The Feasibility of Posture and Movement Detection by Accelerometry," paper presented at the IEEE meeting (1993).

Vukobratovic, M., and Juricic, D., "Contribution to the Synthesis of Biped Gait," paper presented at the IEEE Transactions on Bio-Medical Engineering, BME-16(1) (Jan. 1969).

Vukobratovic, M., and Stepanenko, J., Mathematical Models of General Anthropomorphic Systems, *Mathematical Biosciences*, 17: 191-242 (1973).

Walsh, C.J., et al., "Biomimetic Design of an Under-Actuated Leg Exoskeleton for Load-Carrying Augmentation," Unpublished Master's thesis, Massachusetts Institute of Technology, Cambridge, MA (2006).

Waters, R.L., et al., "Energy Cost of Walking of Amputees: The Influence of Level of Amputation," *The Journal of Bone and Joint Surgery*, 58A(1): 42-46 (1976).

Wilkenfeld, A., "Biologically Inspired Autoadaptive Control of a Knee Prosthesis," unpublished doctoral dissertation, Massachusetts Institute of Technology, Cambridge, MA (2000).

Wilkenfeld, A., and Herr, H., "An Auto-Adaptive External Knee Prosthesis," MIT Lab., (No date given).

Willemsen, A.Th.M., et al., "Automatic Stance-Swing Phase Detection from Accelerometer Data for Peroneal Nerve Stimulation," presented at the meeting of IEEE Transactions on Biomedical Engineering, 37(12):1201-1208 (1990).

Willemsen, A.Th.M., et al, "Real-Time Gait Assessment Utilizing a New Way of Accelerometry," *J. Biomechanics*, 23(8):859-863 (1990).

Williams, B.C., et al., "Mode Estimation of Model-Based Programs: Monitoring Systems with Complex Behavior," paper submitted to Massachusetts Institute of Technology, Cambridge, MA, (No date given).

Williamson, M.M., "Series Elastic Actuators," A.I. Technical Report # 1524 submitted to Massachusetts Institute of Technology, Cambridge, Massachusetts (Jan. 1995).

Winter, D.A., "Energy Generation and Absorption at the Ankle and Knee during Fast, Natural, and Slow Cadences," *Clinical Orthopedics and Related Research*, 175: 147-154 (1983).

Winter, D.A., and Robertson, D.G.E., "Joint Torque and Energy Patterns in Normal Gait," Biol. Cybernetics, 29:137-142 (1978).

Winter, D.A., and Sienko, S.E., "Biomechanics of Below-Knee Amputee Gait," *J. Biomechanics*, 21(5):361-367 (1988).

Wisse, M., "Essentials of Dynamic Walking: Analysis and Design of Two-legged Robots," 195 pgs, (2004).

Woodward, M.I. and Cunningham, J.L., "Skeletal Accelerations Measured During Different Exercises," *Proc. Instn. Mech. Engrs.*, 207: 79-85 (1993).

Wu, G. and Ladin, Z., "The Study of Kinematic Transients in Locomotion Using the integrated Kinematic Sensor," *IEEE Transactions on Rehabilitation Engineering*, 4(3):193-200 (1996).

Yakovenko, S., et al., "Contribution of Stretch Reflexes to Locomotor Control: A Modeling Study," *Biol. Cybern.*, 90: 146-155 (2004).

Au, et al., "Powered Ankle-Foot Prosthesis: The Importance of Series and Parallel Motor Elasticity," IEEE Robotics & Automation Magazine, pp. 52-59, Sep. 2008.

\* cited by examiner

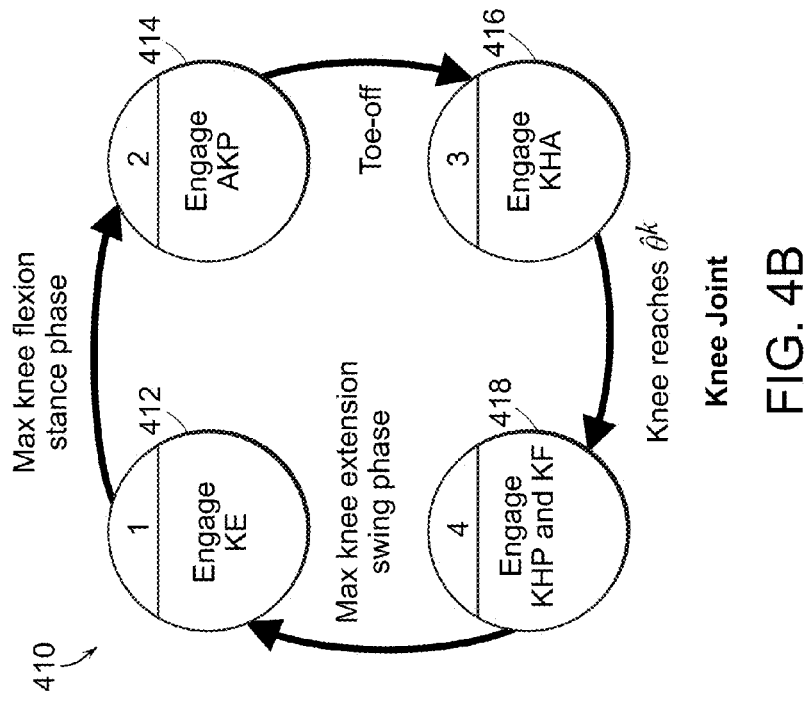
FIG. 4B Knee Joint
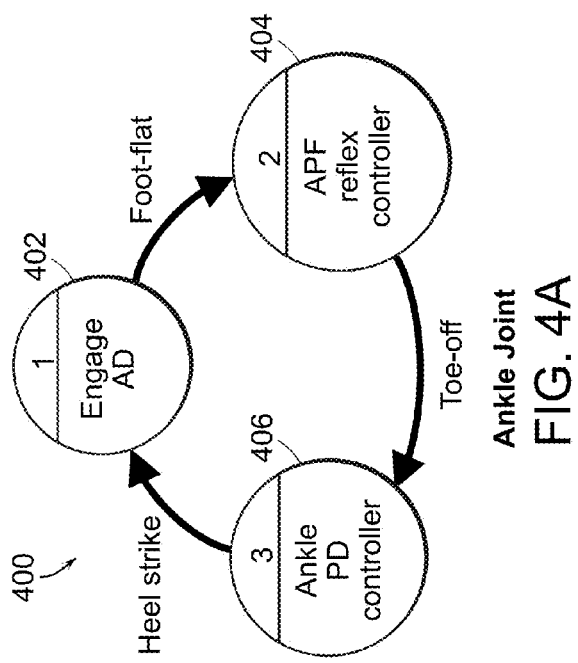
FIG. 4A Ankle Joint
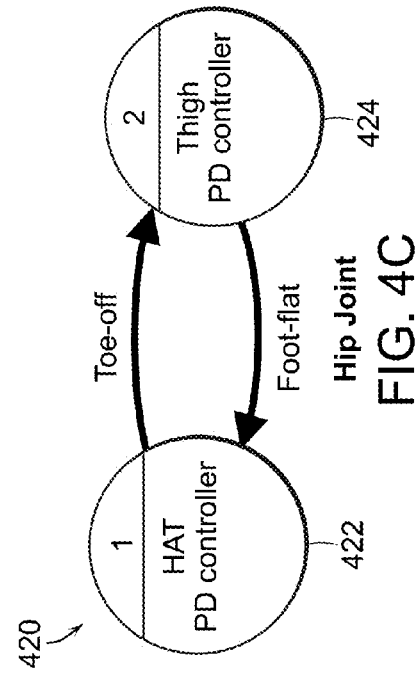
FIG. 4C Hip Joint

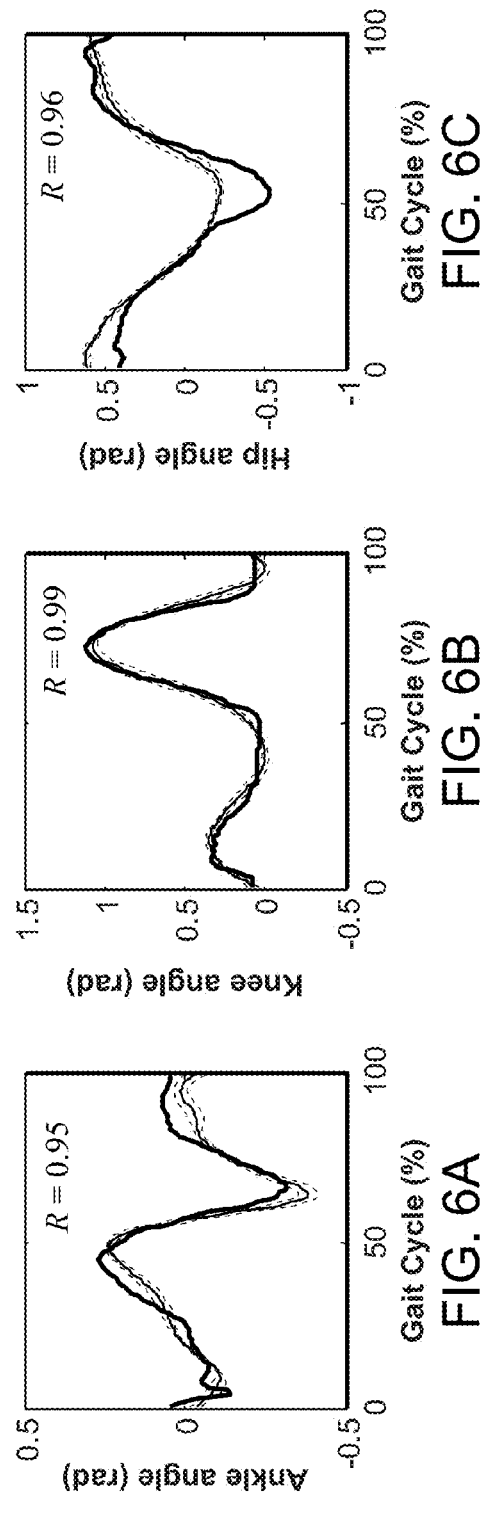
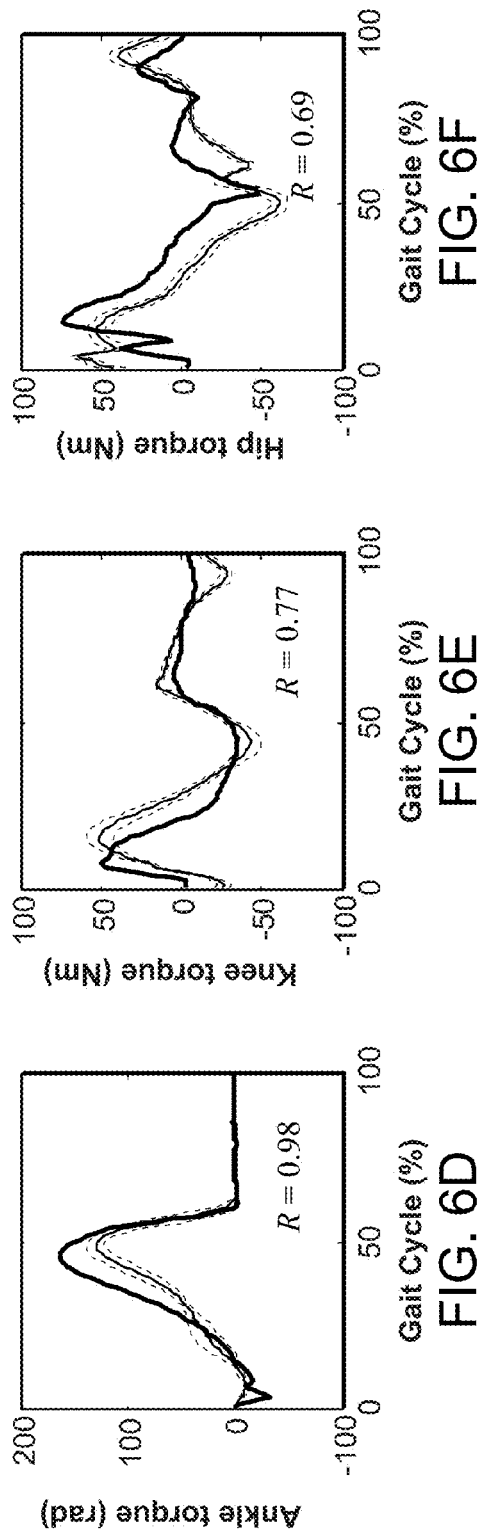
FIG. 6A, FIG. 6B, FIG. 6C, FIG. 6D, FIG. 6E, FIG. 6F

NEUROMUSCULAR MODEL-BASED SENSING AND CONTROL PARADIGM FOR A ROBOTIC LEG

RELATED APPLICATION(S)

This application claims the benefit of U.S. Provisional Application No. 61/635,223, filed on Apr. 18, 2012. The entire teachings of the above application are incorporated herein by reference.

BACKGROUND OF THE INVENTION

Generally, existing commercially available prostheses, such as active ankle prostheses, are only able to reconfigure joint angle in response to very limited external factors. For example, available microprocessor-controlled ankle prostheses typically are only able to reconfigure ankle joint angle during a swing phase, requiring several strides to converge to a terrain-appropriate ankle position at first ground contact. Further, such ankle prostheses generally do not provide sufficient stance phase power for normal gait, and therefore cannot adapt biomimetically to changes in terrain slope and walking speed. Known control schemes for microprocessor-controlled ankle-foot prostheses rely upon fixed ankle state relationships deemed appropriate for walking at target speeds and across known terrains. Although somewhat effective at their intended steady-state gait speed and terrain, such controllers generally do not allow for adaptation to environmental disturbances such as speed transients and rapid intra-step terrain variations.

Therefore, a need exists for a controller of a robotic limb, such as a robotic leg or ankle, and a method for controlling a robotic limb, that overcomes or minimizes the above-referenced problems.

SUMMARY OF THE INVENTION

The invention generally is directed to a neuromuscular model-based controller for controlling at least one robotic limb joint of a robotic limb, and a method for controlling a robotic limb that includes at least one robotic limb joint. The neuromuscular model-based controller of the invention and the method of its use both embody a neuromuscular model-based sensing and control paradigm for a robotic limb.

In one embodiment, the neuromuscular model-based controller for controlling at least one robotic limb joint of a robotic limb of the invention includes a neuromuscular model including a muscle model, muscle geometry and a reflex feedback loop, wherein the reflex feedback loop conveys feedback data of at least one of muscle force, muscle length and muscle velocity of the muscle model, to thereby adjust activation of the muscle model, and wherein one or more parameters that determine the relation between the feedback data and activation of the muscle model are adjusted consequent to sensing data from at least one of an intrinsic and extrinsic sensor, such as at least one of a velocity of the robotic limb and a terrain underlying the robotic limb, the neuromuscular model employing the muscle model and the muscle geometry, comprising muscle joint moment arms, to determine at least one of a torque command and an impedance command. A control system of the model-based neuromechanical controller is in communication with the neuromuscular model, whereby the control system receives at least one of the torque command and the impedance command from the neuromuscular model and controls at least one of position, torque and impedance of the robotic limb joint.

In another embodiment, the invention is a method for controlling a robotic limb that includes at least one robotic limb joint. The method includes transmitting a measured joint state of the robotic limb to a neuromuscular model, the neuromuscular model including a muscle model, muscle geometry and a reflex feedback loop, whereby the measured joint state of the robotic limb is employed by the muscle geometry and the muscle model to determine at least one of a muscle force, a muscle length and a muscle velocity, and whereby at least one of the muscle force, muscle length and muscle velocity is conveyed by the reflex feedback loop as feedback data to thereby adjust activation of the muscle model, and wherein the one or more parameters that determine the relation between the feedback data and activation of the muscle model are further adjusted consequent to at least one of velocity of the robotic limb and a terrain underlying the limb, the neuromuscular model employing the muscle model to determine at least one of a torque command and an impedance command. The at least one of the torque command and the impedance command are transmitted to a control system. Optionally, at least one of a joint state, a joint torque and a joint impedance of the robotic limb are measured. At least one of the joint state, joint torque and joint impedance of the robotic limb are transmitted to the control system, whereby the control system adapts at least one of the torque command and the impedance command in response to the respective measured joint state, joint torque and joint impedance of the robotic limb to thereby obtain the current command for controlling at least one of the robotic limb joint position, torque and impedance. Alternatively, the control system can perform an open loop control framework where torque and impedance are not measured and fed back to the control system; rather, joint torque and impedance are controlled through modulation of motor current, either directly in the case of open loop torque control, or through a proportional-derivative control on measured joint state in the case of open loop impedance control. In the case of position control, the control system can perform an integration of the torque command to generate a position command. The system can then compare this position command to the measured robotic joint state and apply a feedback control.

In one embodiment of the neuromuscular model-based controller, the control system includes a feedforward gain, a lead compensator and a friction compensator to adapt at least one of the torque command and the impedance command, and thereby obtain the current command. In another embodiment, the control system further includes a motor controller for driving an actuator of the robotic limb joint with the current command. In still another embodiment, the neuromuscular model-based controller includes at least one sensor at the robotic limb, wherein the sensor includes at least one member of the group consisting of an angular joint displacement sensor, a velocity sensor, a torque sensor, an impedance sensor, and an inertial measurement unit, to thereby generate joint state data.

In yet another embodiment of the neuromuscular model-based controller, the joint state data includes a measured robotic limb joint angle and joint angular velocity measured by the at least one sensor. The control system can further include a parallel spring model that employs the measured robotic limb joint angle to thereby further modulate at least one of the torque command and the impedance command. The muscle geometry can be configured to determine a muscle moment atm and a muscle tendon length using the measured joint angle. In one embodiment, the muscle model includes a muscle tendon unit having a contractile element in a series elastic element, wherein the muscle model determines muscle force using the muscle tendon length and a stimulation input from the reflex feedback loop. In one particular embodiment, the muscle model includes at least one of the bilinear muscle model, a Hill-type muscle model and a clutch-spring model.

The reflex feedback loop can be configured as a local feedback loop, whereby the reflex feedback loop is configured to receive muscle feedback information, e.g., muscle force feedback, from the muscle model and to provide stimulation input to the muscle model. In one embodiment, the muscle force feedback is a positive force feedback. In another embodiment, reflex feedback loop is configured to mimic the stretch reflex of an intact human muscle.

In still another embodiment, the neuromuscular model and the control system are configured to control the robotic limb, wherein the robotic limb is a leg, and where the neuromechanical controller further includes a finite state machine synchronized to the walking gait cycle, the finite state machine being configured to receive intrinsic data from at least one of the sensors and to determine a gait phase of the robotic leg using the intrinsic data received.

In various embodiments, the neuromuscular model and the control system are configured to control a robotic leg comprising a knee joint, an ankle joint, a knee joint and hip joint, or any combination thereof.

In an embodiment of the method of controlling a robotic limb that includes at least one robotic hip joint, the method further includes the step of transmitting the measured joint angle state of the robotic limb joint to the control system, whereby at least one of the torque command and the impedance command is further adapted by the measured joint angle state to thereby obtain the current command for controlling the robotic limb joint. In another embodiment, the reflex feedback loop applies a delay and a gain to at least one of the muscle force, muscle length and muscle velocity, which is added to an offset stimulation to thereby obtain a neurostimulation signal that is employed to adjust activation of the muscle model. In yet another embodiment, at least one of the delay and gain is modulated by the velocity of the robotic limb and the underlying terrain.

As for another embodiment, a method further includes the steps of switching the reflex feedback loop between an on position and an off position, so that the reflex feedback loop is operating when an individual wearing the robotic limb is in a stance phase, and low pass filtering the neurostimulation signal with a time constant.

This invention has many advantages. For example, the neuromuscular model-based controller and method for controlling a robotic limb that includes at least one robotic limb joint enables adaptation to at least one of velocity of the robotic limb and terrain underlying the robotic limb. Further, the controller and method of use of the controller of the invention adjusts parameters that determine the relation between muscle force, muscle length and muscle velocity of a muscle model employed to control the robotic limb joint to thereby adjust activation of the muscle model and, consequently, to modulate a torque command and an impedance command employed to actuate a control system in response to feedback from the robotic limb, or in response to stimulus from the individual wearing the robotic limb joint, thereby resulting in not only an objective response to changes in the environment, but also a response to the intent of the wearer, as conveyed by extrinsic signals, such as electromyographic signals.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Other aspects, advantages and novel features of the invention will become more apparent from the following detailed description of the invention when considered in conjunction with the accompanying drawings wherein:

FIGS. 4A-C illustrate example walking finite state machines. The state machines for (4A) ankle, (4B) knee and (4C) hip are shown. The state machines turn on and off the muscle reflex controllers and initiate the isometric muscle force generation. Each isometric muscle is disengaged automatically when its series spring returns to its equilibrium position after an energy storage and release sequence. The state transitions are facilitated by gait events. For example, from state 3 to state 1, the ankle state controller engages the Ankle Dorsiflexor at heel strike, and from state 1 to state 2, the knee state controller engages the Ankle-Knee Posterior at maximum knee flexion.

FIG. 5A shows data for one representative participant (participant #1, Table I). Each closed circle is one forward dynamic solution that can walk for at least 20 seconds without falling down and where model walking speed falls within the range from 1.2 msec to 1.35 msec. The dashed line and shaded area represent mean±one standard deviation for human metabolic COT data from the literature (Herr and Grabowski, 2011). The open diamond is the model's optimal solution because it falls within the shaded region and has the highest R value. The open square is the model solution of Anderson & Pandy (2001). FIG. 5B illustrates the same relationships as in FIG. 5A for the remaining eight subjects (P2-P9).

FIGS. 6A-F depict joint kinetic and kinematic predictions. Shown are model predictions for (6A) ankle angle, (6B) knee angle, (6C) hip angle, (6D) ankle torque, (6E) knee torque and (6F) hip torque. The black curves are the average of 10 walking model cycles from the optimal solution plotted in FIG. 5A. The grey curves are human biological data from Herr and Popovic (2008) of the modeled participant (Participant #1 in Table I). The dotted curves are one standard deviation from the biological data mean (N=7 walking trials). Maximum cross-correlation coefficient (R) values are shown for each model prediction.

DETAILED DESCRIPTION OF THE INVENTION

Figure 1:
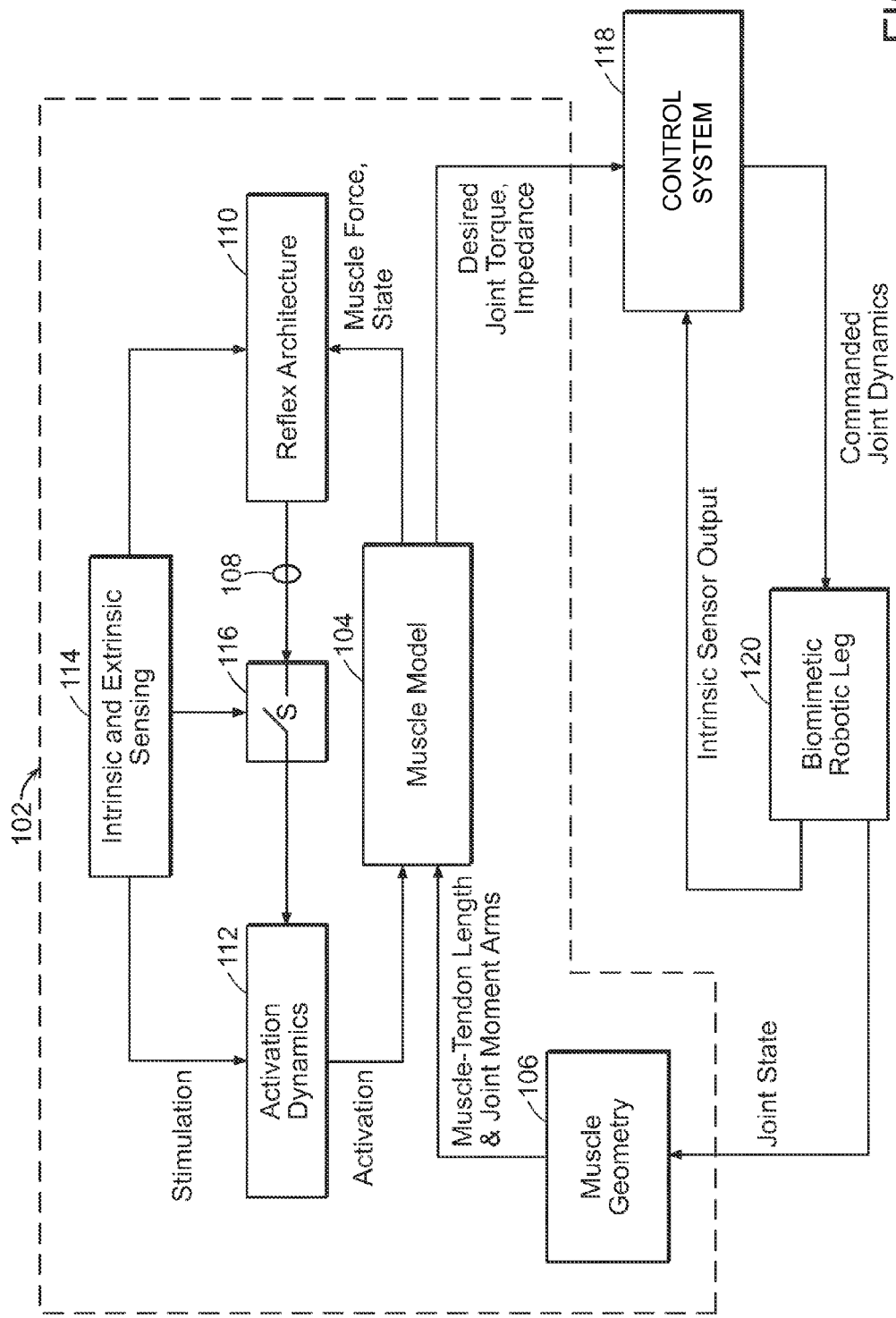
FIG. 1 is a block diagram of an exemplary embodiment of a general neuromuscular model architecture, according to one aspect of the present invention.

In one embodiment, the invention is an apparatus and method for producing biomimetic positions, torques and impedances at the hip, knee and ankle joints of a powered leg prosthesis, orthosis, or exoskeleton during walking and running gaits. Sensory data are collected using intrinsic and/or extrinsic sensors. Intrinsic sensing refers to information collected from sensors located on the wearable robotic device, and extrinsic sensing refers to all information collected from sensors located externally to the wearable device. As an example, in the case of a leg prosthesis, a surface electrode for the measurement of the electromyographic signal from residual limb muscles would be an extrinsic sensor, and an inertial measurement unit located on the device itself would be classified as an intrinsic sensor. Intrinsic sensors measure device positions, motions, forces, torques, pressures, and temperatures. Extrinsic sensors might comprise such mechanical and temperature sensors positioned externally to the wearable device, as well as neural sensors for the determination of user motor intent.

This sensory information is passed to a neuromuscular model of human locomotion, which computes appropriate joint dynamics for the device to provide to the user. The following sections detail a sensing and control mechanism, the neuromuscular models applied in control, a successful application of this mechanism for the control of a powered ankle-foot prosthesis, and one method for inferring neural intent from surface electromyographic (EMG) measurements.

Overview of Sensing and Control Scheme

In one embodiment, a control architecture commands biomimetic torques, impedances and positions to the hip, knee and/or ankle joints of a wearable robotic device during legged locomotion. The model-based control scheme, depicted in FIG. 1, relies on data collected from at least one of intrinsic and extrinsic mechanical sensors, and extrinsic neural sensors used to infer the motor intent of the user, volitionally and/or non-volitionally. A set of potential intrinsic/extrinsic mechanical sensors may include, but are not limited to: digital encoders or hall-effect sensors to measure joint angular displacement and velocity, torque sensors at the hip, knee and ankle joints, and inertial measurement units (IMU's) located on limb segments to measure limb orientations and translations. Further, extrinsic neural sensors for direct sensing of user intent may include, but are not limited to: electrodes to measure the EMG signals of biological limb musculature, peripheral neural implants for efferent sensing of motor nerve axons, and/or central brain implants for sensing of brain motor commands. A control system of the invention may also include or employ an afferent stimulation using a nerve implant, allowing the user of the wearable robot to better modulate efferent motor commands for volitional or non-volitional control of the wearable device.

Among other sensory modalities, collected intrinsic sensory data provide information about joint state (angular position and velocity) of the hip, knee, and ankle joints. In the case of a transfemoral amputee, for example, joint state at the ankle and knee can be measured through angular sensors. In one embodiment, the hip joint state can be estimated under the assumption that the upper body (torso) maintains a vertical orientation during gait. The hip's angular position and velocity can then be determined using the angular position sensor at the knee and an IMU located between the robotic knee and ankle for the determination of lab frame orientation of the lower leg.

The neuromuscular model used to compute desired joint dynamics may include muscles modeled in a variety of ways. The muscle model may include, but is not limited to, a bilinear muscle model or a Hill-type muscle model. The measured states of the robotic joints are employed to determine the internal state (force length, velocity) of each of the virtual muscle-tendon units of the neuromuscular model employing morphological information of the muscle moment arms about each modeled joint.

The impedance and force of each virtual muscle are additionally governed by the muscle activation, which may be determined from a local reflex loop, an external source, or a combination thereof. In the reflex case, a feedback loop is implemented where virtual muscle force and state are used to produce muscle stimulation, which is then filtered to produce muscle activation as shown in FIG. 1. This feedback-based control scheme is designed to emulate the force feedback and stretch reflex of an intact human muscle. This reflexive feedback loop can be a linear or non-linear function of virtual muscle force, length and velocity. In one embodiment, the reflexive feedback loop is nonlinear, and comprises a threshold prestim parameter, as well as force and state gains and exponents, or $$u(t) = x + y_F[F(t-\Delta t_F)]^{z_F} + y_l[l(t-\Delta t_l)]^{z_l} + y_v[v(t-\Delta t_v)]^{z_v} \quad (1)$$

where x is the prestim parameter, $y_i$ are force and state gains, and $z_i$ are force and state exponents.

In the purely external source case, a neural sensor is employed to provide some estimate of motor intent, which is then input to an activation dynamics block where a muscle activation is estimated as an input to the muscle model. Typically, such measurements of motor intent would comprise one or more peripheral neural sensors from implants interfacing with nerves and/or muscles, but in the most general case, such motor intent commands could additionally be measured from central brain implants.

In the combination case, intrinsic and/or extrinsic sensory data are employed to modulate the reflex parameters of the neuromuscular model. In the combination case, the framework of FIG. 1 describes a procedure where the reflexive parameters are modulated by the controller either within a single gait cycle, and/or from gait cycle to gait cycle in an updating manner, based upon detected variations in gait speed and/or terrain. In one embodiment, gait speed and terrain condition are detected by intrinsic sensing, and the virtual force output of at least one modeled muscle and its associated state gains/exponents ($y_i$ and $z_i$ within equation 1) are adjusted either within a gait cycle and/or from gait cycle to gait cycle in an updating manner. In another embodiment, extrinsic efferent neural signals from muscles and/or peripherial nerves are employed to modulate reflexive parameters, such as force and state gains and exponents. For example, as is described in Example III, infra, measured calf muscle EMG in a transtibial amputee can be used to modulate the gain of a positive torque feedback during the stance period of a walking gait cycle, providing the amputee direct volitional control over powered plantar flexion during terminal stance in walking. It will be understood by those of skill in the art that stimulation through a nerve implant to reflect intrinsic/extrinsic mechanical sensory data as an afferent feedback signal would allow the user of the wearable robot to better modulate efferent neural motor commands for a desired prosthetic/orthotic dynamical response.

Once the force of each virtual muscle spanning a joint is determined (by the implemented muscle model), each muscle force is multiplied by its biologically-realistic muscle moment arm and then all muscle torque contributions are summed around the joint to produce a net torque and impedance estimate. The model estimates are then sent to the controller (FIG. 1) as the desired net torque and impedance for each robotic joint. The controller tracks these desired values at each joint to produce human-like joint forces and impedances. In the case where the human user's motor intent is to control device joint position, the controller integrates the desired joint torque to achieve a joint position estimate, and then modulates device joint position to achieve that desired position.

One embodiment of a neuromuscular model-based controller for controlling at least one robotic limb joint of a robotic limb, and a method of employing the neuromuscular model-based controller of the invention are represented schematically in FIG. 1. As shown therein, neuromuscular model-based controller 100 includes neuromuscular model 102 which, in turn, includes muscle model 104, muscle geometry 106, reflex feedback loop 108 and reflex architecture 110. Neuromuscular model 102, as well as each of muscle model 104, muscle geometry 106 and reflex feedback loop 108, are processors, or components of processors, such as designated computer processors that are configured to perform functions described and associated with each of neuromuscular model 102, muscle model 104, muscle geometry 106 and reflex feedback loop 108. Alternatively, neuromuscular model 102, as well as each of muscle model 104, muscle geometry 106 and reflex feedback loop 108, are algorithmic procedures of a single global algorithm or computer code run by a single processor or a plurality of processors. Detailed descriptions of each of neuromuscular model 102, muscle model 104, muscle geometry 106 and reflex feedback loop 108 are described, for example, in U.S. Publication No. 2010/0324699, U.S. application Ser. No. 12/698,128, entitled: Model-Based Neuromechanical Controller for a Robotic Leg, by Hugh M. Herr et al., filed Feb. 1, 2010, the teachings of which are incorporated herein by reference in their entirety.

Reflex feedback loop 108 conveys feedback data of at least one of muscle force, muscle length and muscle contractile velocity of muscle model 104 to thereby adjust activation of muscle model 104. Parameters that determine the relation between feedback data and activation of muscle model 104 through activation dynamics 112 are adjusted consequent to at least one of a velocity of a robotic limb, such as biomimetic robotic leg 120, and a terrain underlying the robotic limb. Parameters that determine the relation between the feedback data and activation of muscle model are dictated by a reflex architecture 110 that can be a linear or non-linear function of virtual muscle force, muscle length and muscle velocity. For example, in one embodiment, the reflex feedback loop is nonlinear, and includes a threshold prestim parameter, as well as force and state gains and exponents, and is represented by the Formula (1), shown, supra. A formula representing a linear function of virtual muscle force, muscle length and muscle contractile velocity can be represented, for example, by Equation (2.3), in Example II, infra.

Neuromuscular model 102 further employs muscle model 104 and muscle geometry 106 to determine at least one of a torque command and an impedance command.

In the embodiment shown in FIG. 1, activation of muscle model 104 occurs by virtue of reflex architecture 110, which are equations employed to convert muscle force, muscle length and velocity into stimulation signals (i.e., reflex feedback equations). Examples of reflex feedback equations are described below, at Section 2.3 of Example I, infra, and, specifically with respect to Equations (5)-(11). Feedback data conveyed by reflex feedback loop 108 is adjusted by at least one of intrinsic and extrinsic sensing 114 which, optionally, are determined, at least in part, by switch 116 of an individual wearing robotic limb while walking.

"Intrinsic sensing" means sensing by a robotic limb of its own state, such as that of a robotic ankle sensing its own angle, orientation, acceleration and torque of a component motor. The examples of intrinsic sensing are described infra, in Example II, with respect to ankle angle measurements.

"Extrinsic sensing" means external measurements made by sensors employed by the device, such as electromyographic measurements of a residual limb of an individual wearing a robotic limb controlled by the invention. An example of extrinsic sensing according to the one embodiment of the invention is described infra, in Example III, at Section 3.3.2, with respect to an EMG measurement model described therein.

"Activation dynamics" as that term is employed herein, refers to differential equations that employ input muscle stimulation, for example, and shapes it to approximate muscle activation. Examples of suitable equations are described infra, at Example I, at Equation (4) and Example II, at Equation 2.1.

"Reflex architecture," as that term is employed herein, refers to equations that are employed to turn muscle force, length and velocity into stimulation signals (i.e. reflexive feedback equations). Examples of such equations are shown as Formula (1), supra, as Equations (5) through (11), in Example I, infra, and as Equation (2.3) in Example II, infra.

"Muscle model" as that term is employed herein means a processor or component of a processor, employing differential equations that make up inputs, such as muscle length, muscle velocity and activation, such as is determined by activation dynamics, to muscle force, such as a bilinear or Hill-type muscle model. The muscle model typically includes a tendon component so that inputs to the differential equations employed include both muscle and tendon length, in addition to muscle activation determined by differential equations employed by the activation dynamics. Examples of suitable expressions of these relations are described infra at Example I, at Equations (1) through (3).

"Muscle geometry," as that term is employed herein, is a module, or component of a module of a computer processor that maps muscle-tendon length and muscle-tendon moment arm and lever arms from measured joint angles. For example, in the case of prosthesis control, "joint angle input" is the angle of the robotic joint, as measured by intrinsic sensing, which is converted by, for example, a polynomial fit or a lookup table to muscle-tendon length and muscle-tendon moment arm or lever arm, as described below in Example II, at Section E.

Torque, Impedance, Position control system 118 receives at least one of a desired joint torque command and desired joint impedance command from neuromuscular model 102. Control system 118 adapts at least one of the torque command and impedance command from neuromuscular model 102 in response to at least one of a respective measured torque and a measured impedance of a robotic limb of biomimetic robotic leg 120 to thereby obtain a current command that is directed from control system 118 to biomimetic robotic leg 120 to thereby control at least one of position, torque and impedance of biomimetic robotic leg 120, which includes a robotic limb joint. A joint state is conveyed from biomimetic leg 120 to muscle geometry 106.

"Torque, impedance, position control" as that phrase is employed herein, means a hardware controller of a robotic prosthetic device. An example of such a hardware controller is described infra, at Example II, FIG. 11 and accompanying text.

"Biomimetic robotic leg," as that term is employed herein refers to a robotic ankle, robotic knee or combination thereof, and can include a control system component such as torque, impedance, position controller 118 of the invention. Examples of suitable biomimetic robotic legs, are described infra at Examples II and III.

The following are non-limiting examples that illustrate embodiments of the invention.

Example I

Human Walking Models

Two human walking models are described that may be applied in the control of prosthetic, orthotic and exoskeletal components. It is important to note that these are only two of many models that may be used for this purpose. These models do, however, lend themselves well to the task; since they include reflex feedback-based neural control schemes that fit neatly into the framework illustrated in FIG. 1.

a. Neuromuscular Model with Hill-Type Muscle Elements

Figure 2:
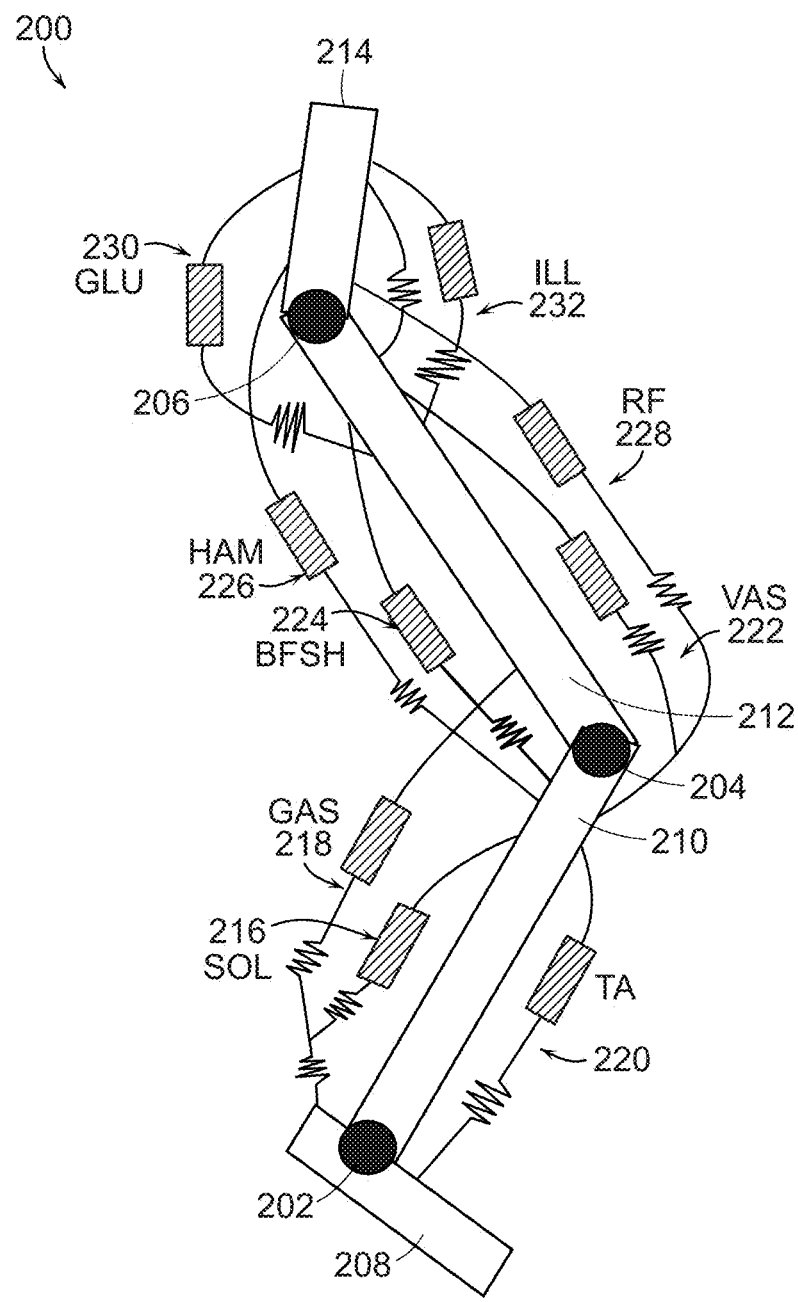
FIG. 2 depicts a full leg neuromuscular model including Hill-type muscle-tendon units.

In this section, a lumped-parameter neuromuscular model for walking is described that includes Hill-type representations of all the major muscle groups of the leg (FIG. 2). FIG. 2 illustrates neuromuscular model 200 comprising ankle 202, knee 204 and hip 206 joints connected by rigid bodies representing the human trunk 214 and two, three-segment legs, each leg including a foot 208, a shank 210, and a thigh 212. As shown in FIG. 2, nine muscle-tendon units were modeled: soleus (SOL) 216, gastrocnemius (GAS) 218, tibialis anterior (TA) 220, vastii group (VAS) 222, biceps femoris short head (BFSH) 224, hamstring group (HAM) 226, rectus femoris (RF) 228, gluteus maximus (GLU) 230, and hip flexors, e.g., iliopsoas (ILL) 232.

Human walking data are critical for the advancement of the model. The following are the data types used in building the model and the methods for collecting them:

Motion capture is used to track the motion of the participant's body segments. This provides kinematic data that are used to determine joint angles.

An instrumented treadmill allows measurement of the three-dimensional forces applied by the participant to the walking surface. These kinetic data are collected synchronously with the kinematic data for use in an inverse dynamics analysis.

Measurements of the electrical activity of the dominant muscles of the leg are made by placing EMG electrodes on the skin overlying the bellies of the muscles of interest during walking trials. From this we identify the times and magnitudes of activation of each muscle by the nervous system.

Throughout walking trials the participant's inspired and expired gas volume and composition are recorded and analyzed to calculate steady-state metabolic energy consumption. From this, the metabolic cost of transport can be determined for each walking condition.

B-mode ultrasound imaging is used to record images of muscle fascicles in vivo during walking trials. Images are collected at 50 Hz and then digitized to provide measurements of muscle fascicle lengths throughout the gait cycle.

The collected kinematic and kinetic data are used to obtain information about the joints and muscles of the leg. The motion capture data are used to scale the full body model of the SIMM software (Musculographics, Inc). This model represents the average anatomy of a male human as determined by extensive cadaver studies (Delp, S., Loan, J., Hoy, M., Zajac, F., Topp, E., and Rosen, J. (1990), An interactive graphics-based model of the lower extremity to study orthopaedic surgical procedures, *IEEE Transactions on Biomedical Engineering*, 37(8): 757-767), and is widely accepted as the professional standard in the field. The resulting representation of each subject is used to compute joint angles, muscle-tendon unit lengths, and muscle-tendon unit moment aims from the motion capture data. Adding the collected force plate data and utilizing the SIMM/SDFAST dynamics pipeline, joint torques of the hip, knee, and ankle are computed. For each walking protocol, all reasonable trajectories are averaged and used as model inputs.

The morphological parameters governing force production in the tendons of the model are then estimated using an optimization procedure similar to the one conducted in [5]. This procedure uses the kinematic, kinetic, electromyographic, and ultrasound data collected in walking trials at self-selected speed on level ground. As discussed earlier, the kinematic and kinetic data are used to determine joint moments, muscle-tendon lengths, and muscle-tendon moment arms about each joint. The electromyographic data are used to estimate the muscle activations of all major muscle groups spanning the hip, knee, and ankle joints. The ultrasound data are used to determine muscle fascicle lengths. We model each muscle as Hill-type and, as in (Krishnaswamy, P., Brown, E. N., Herr, H. M. (2011) Human Leg Model Predicts Ankle Muscle-Tendon Morphology, State, Roles and Energetics in Walking. PLoS Comput Biol 7(3): e1001107. doi: 10.1371/journal.pcbi.1001107), hypothesize that the muscle-tendon morphology of the leg has evolved to maximize the economy of walking at self-selected speed over level ground.

The estimated activations, muscle-tendon lengths, and muscle-tendon moment arms are then input to the model, with the muscle-tendon morphological parameters being chosen as those that minimize the metabolic cost of walking. The optimization is guided by the constraints that the output joint moments match those computed from the data (within some tolerance). If reliable muscle fascicle length measurements are available, the optimization may be further constrained to produce output muscle fascicle lengths that match these measurements (again within some tolerance). We thoroughly examine the solution space for this optimization problem, focusing on the region that is energetically efficient and closely matches the biological data. The final results of this identification step are sets of muscle-tendon parameters that, for each subject, accurately describe the muscle groups of the leg that dominate sagittal plane motion in walking.

Once the muscle-tendon morphologies for each subject are determined, we explore control of the system. The collected EMG data are used to infer reflexive feedback schemes for each muscle actuator through a procedure similar to (Markowitz, J. Krishnaswamy, P., Eilenberg, M. F., Endo, K., Barnhart, C., and Herr, H. (2011) Speed adaptation in a powered transtibial prosthesis controlled with a neuromuscular model. *Philosophical Transactions of the Royal Society B*, 366: 1621-31). The muscle reflexes comprise linear and/or nonlinear combinations of the muscle force and state (fascicle length and velocity) variables, which are then fed into the model as neural activation (See FIG. 1). For each walking speed and inclination, reflex gains and thresholds are tuned so that the resulting activation profiles match those estimated from EMG measurements. In this way we determine which proposed terms are relevant and thereby derive a reflex architecture to use in our forward dynamic simulations.

We then build a forward dynamic simulation of human walking using the previous results. The SIMM-produced scaling of each subject is used as well as the muscle-tendon parameters and reflex architectures determined in the system identification steps. For each walking condition, the reflex parameters (gains and thresholds) are re-optimized to produce stable walking that matches the observed joint torques and cost of transport as closely as possible. This produces (for each speed and inclination) a forward dynamic walking model actuated by Hill-type muscles controlled by reflexive feedback. This model can then be programmed into robotic prosthesis, orthosis or exoskeleton components, taking as input measured joint state and torque and producing commanded torque.

b. Neuromuscular Model with Bi-Linear and Hill-Type Muscle Elements

Although joint biomechanics and whole-body energetics are well documented for human walking, the underlying mechanisms that govern individual muscle-tendon behaviors are not fully understood. Presented here is a computational model of human walking that unifies muscle and joint biomechanics with whole-body metabolism for level-ground walking at self-selected speed. In the model, muscle-tendon units that dorsiflex the ankle, and flex and extend the knee, are assumed to act as linear springs upon neural activation; each muscle-tendon is modeled as a tendon spring in series with an isometric force source. To provide the mechanical power lost in step-to-step gait transitions, a Hill-type soleus muscle is modeled to actively plantar flex the ankle using muscle state and force as reflex feedback signals. Finally, to stabilize the trunk during stance, and to protract and retract each leg throughout the swing phase, two mono-articular Hill-type muscles actuate the model's hip joint. Following a forward dynamics optimization procedure, the walking model is shown to predict muscle and joint biomechanics, as well as whole-body metabolism, supporting the idea that the preponderance of leg muscles operate isometrically, affording the relatively high metabolic walking economy of humans.

1. Introduction

Bipedal walking is the human body's natural method for moving from one location to another at slow speeds. As walking is frequently and casually used to conduct daily activities, a disability to the lower extremity can dramatically reduce a person's quality of life. Today's commercially-available prosthetic leg technology cannot fully emulate biological knee and ankle function in walking, leading to higher metabolic demand, slower walking speeds and problems of balance for transfemoral amputees [1]. In this example, a computational model of human walking is utilized to understand how leg muscles and tendons work mechanically during walking in order to motivate the design of economical robotic legs for prosthetic applications.

Researchers often explore walking biomechanics from measures of ground reaction force, joint kinematics and muscle electromyography [2]. Ground reaction force and joint angles are typically captured with a force plate and motion capture system, respectively, and joint torques are estimated using an inverse dynamics calculation. However, using only net joint torque, joint state and muscle electromyographic data, calculating individual muscle force is an indeterminate problem, since the number of muscles is larger than the number of joints, and at any instant, energy for muscle-tendon work could come from the series-elastic tendon or from the active muscle. Previous studies [3-6] have proposed that the optimality of neural control for prescribed objectives can resolve individual muscle-tendon contributions to joint actuation in walking. These studies modeled leg muscle-tendons with morphological parameters from the literature, asserted a control objective such as minimizing metabolic cost of transport or tracking biological joint mechanics, and obtained optimal muscle activations for the particular objective. For example, Anderson & Pandy [3] employed a three-dimensional human musculoskeletal model with Hill-type muscle models and optimized muscle activations to minimize metabolic cost. However, their model prediction overestimated whole-body metabolic cost by ~46%. In more recent work, Neptune et al. [4-6] used a two-dimensional human musculoskeletal model with Hill-type muscle models and optimized muscle activations such that the error between the simulation result and kinetic and kinematic human gait data were minimized. Again their muscle fascicle mechanical work estimate was approximately twice as large as would be expected from human metabolic measurements. In distinction to these dynamics programming methods, Geyer & Herr [7] developed a forward dynamic model of human walking that was driven solely by muscle reflex behaviors that encode principles of legged mechanics. The model showed qualitative agreement with joint angles, joint torques and muscle activations, suggesting that human motor output might largely be shaped by muscle reflex behaviors. More recently, by extending the Geyer & Herr [7] model, Song & Geyer [8] optimized muscle control parameters such that the metabolic cost was minimized at different walking speeds. However, their model still overestimated human walking metabolic expenditure by ~30% at a moderate speed of 1.25 m/sec.

Metabolic cost of transport (COT), or the amount of metabolic energy required to transport unit body weight unit distance, is minimized at moderate walking speeds, and is equal to ~0.24 J/Nm at 1.25 m/sec (total 0.35 J/Nm minus basal) [9]. Tendon stiffness may play a critical role in lowering muscle work and metabolic demand in walking. When a muscle is stretching or isometric, metabolic power is relatively low. However, once a muscle starts to contract, metabolic power increases sharply [10]. Researchers have hypothesized that a tuned tendon stiffness allows economical mechanical power absorption and delivery for cyclic, level-ground gaits such as walking and running by keeping muscle fascicle velocity near zero [11, 12]. For example, Ishikawa et al. [11] used an ultrasonographic apparatus to measure fascicle length changes in the medial Gastrocnemius during walking, and observed negligible length change in the muscle from 30% to 50% of gait cycle, even though the ankle and knee angles changed substantially. Further, Lichtwark & Wilson [12] also observed negligible length change in the Gastrocnemius fascicles during the stance phase, indicating the Achilles tendon was lengthened and then shortened instead of the muscle itself, lowering metabolic demand.

In this example, it is hypothesized that the preponderance of leg muscles operates isometrically during level-ground walking at a self-selected speed. Specifically, it is anticipated that muscle-tendon units that dorsiflex the ankle, and flex and extend the knee, act as compliant springs upon neural activation, where the muscle generates force isometrically and the series tendon provides power absorption and delivery. Since the human knee performs net negative work throughout a level-ground walking cycle [13], and since an isometric muscle-tendon control is incapable of dissipating mechanical energy as heat, a corollary to this hypothesis is that energy would necessarily have to be transferred via biarticular muscle-tendons to hip and/or ankle joints throughout the walking gait cycle. Such a transfer of energy would reduce the necessary muscle-tendon work at the hip and ankle joints, further improving the economy of walking humans.

To test these hypotheses, we present a computational model of human walking where the muscle-tendon units that dorsiflex the ankle, and flex and extend the knee, are modeled as a tendon spring in series with an isometric force source, or a clutch ("clutch-spring model"). To provide the mechanical power for step-to-step gait transitions, a Hill-type Soleus muscle is modeled to actively plantar flex the ankle using muscle state and force as reflex feedback signals. Finally, to stabilize the trunk during stance, and to protract and retract each leg throughout the swing phase, two mono-articular Hill-type muscles actuate the model's hip joint. Following a forward dynamics optimization procedure, both morphological and neural control parameters are optimized for nine human test participants, and then the resulting model behaviors are compared to human kinetic, kinematic and energetic measurements.

2. Methodology 2.1 Physical and Musculoskeletal Model

Figure 3:
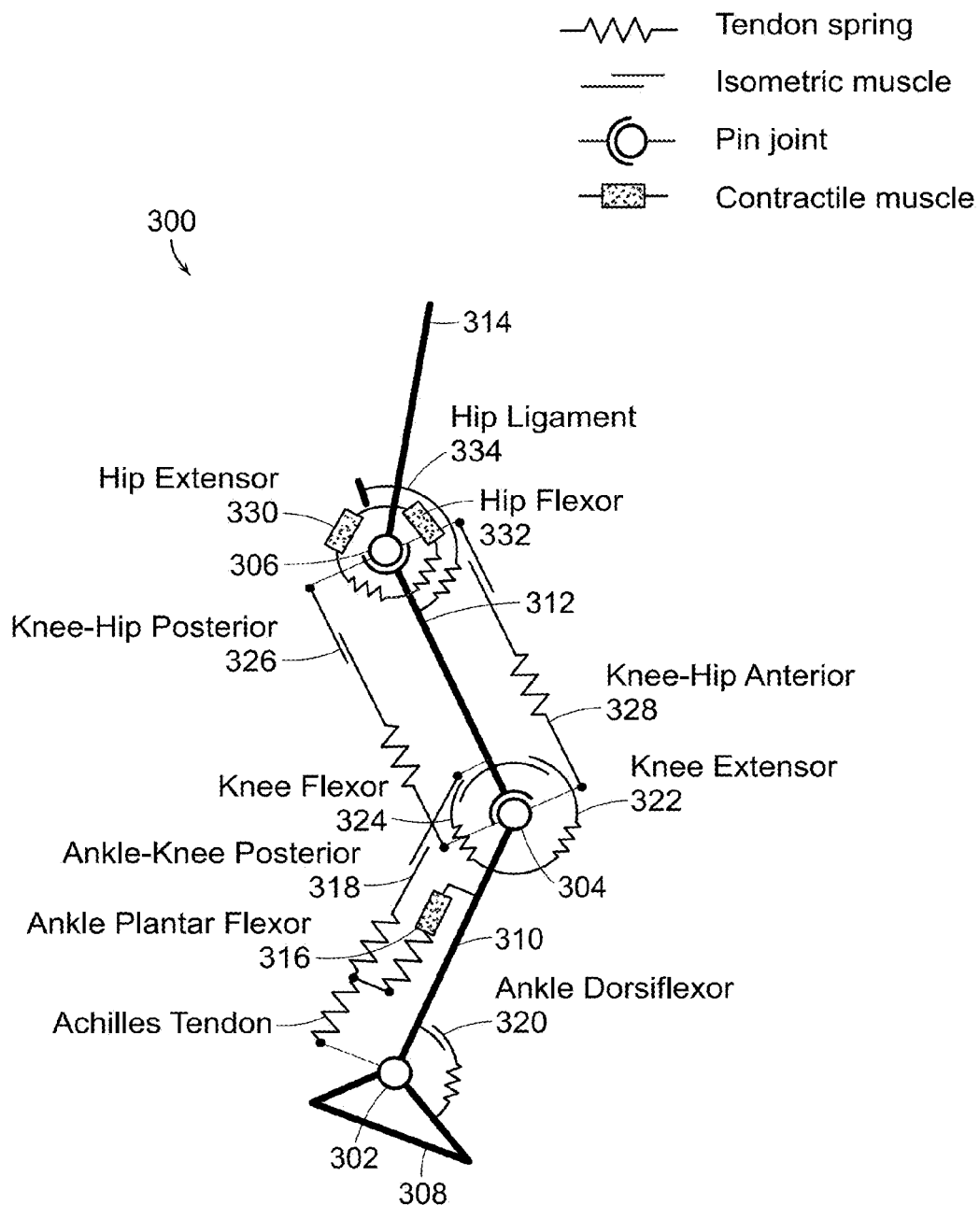
FIG. 3 illustrates an example musculoskeletal walking model. Only three contractile muscles act about the model's ankle and hip joints capable of performing non-conservative work, namely the Ankle Plantar Flexor (APF), Hip Extensor (HE) and Hip Flexor (HF). All remaining muscle-tendon units of the leg are modeled as an isometric muscle in series with a compliant tendon, namely Ankle Dorsiflexor (AD), Ankle-Knee Posterior (AKP), Knee Flexor (KF), Knee Extensor (KE), Knee-Hip Posterior (KHP) and Knee-Hip Anterior (KHA). The hip joint also includes a unidirectional, linear torsional spring representing the dominant ligaments that tend to flex that joint, namely Hip Ligament.

To understand how muscle-tendon units behave mechanically during walking, a sagittal plane model was constructed. FIG. 3 illustrates a musculoskeletal walking model 300 comprising ankle 302, knee 304 and hip 306 joints connected by rigid bodies representing the human trunk and two, three-segment legs. These seven segments (two feet 308, two shanks 310, two thighs 312 and one head-arm-torso (HAT) segment 314) were represented with simple rigid bodies whose mass and shape parameters were estimated using human morphological data from the literature. In this example, morphological data sets from nine human participants studied in [14] were used in the construction of nine rigid-body morphological models (Listed in Table I and see

[14] for details). In addition, in the study of [14], for these same human study participants, kinetic (Advanced Mechanical Technology force platforms) and kinematic data (VICON 512 motion analysis system) were collected at a self-selected walking speed. In the present example, these nine human rigid body models, and their corresponding human walking data sets, were used for neuromechanical modeling and evaluation.

TABLE I

| Subject | M(kg) | $H_{CM}$(m) | $L_{leg}$(m) |
|---|---|---|---|
| 1 | 81.9 | 1.08 | 0.99 |
| 2 | 57.2 | 0.92 | 0.80 |
| 3 | 82.6 | 1.08 | 0.88 |
| 4 | 65.3 | 0.99 | 0.88 |
| 5 | 50.1 | 0.88 | 0.75 |
| 6 | 64.6 | 1.03 | 0.91 |
| 7 | 73.9 | 1.01 | 0.89 |
| 8 | 49.9 | 0.88 | 0.75 |
| 9 | 62.7 | 0.94 | 0.81 |

Table I lists participant body mass, center of mass (CM) height during quiet standing, and leg length. The methodology for estimating CM height is described in [14]. Leg length was measured as the vertical distance from the ground to the greater trochanter of the femur during quiet standing.

The musculoskeletal aspects of the walking model were derived by inspection of the body's architecture, and modeled muscles were attached where main muscle groups are attached on the human leg. Hill-type muscles composed of contractile elements with corresponding series tendons were included to model selected muscles-tendon units within the human leg. As shown in FIG. 3, nine muscle-tendons were modeled: soleus—Ankle Plantar Flexor (APF) 316; gastrocnemius—Ankle-Knee Posterior (AKP) 318; tibialis anterior—Ankle Dorsiflexor (AD) 320; vastii group—Knee Extensor (KE) 322; bicep femoris short head—Knee Flexor (KF) 324; hamstring group—Knee-Hip Posterior (KHP) 326; rectus femoris—Knee-Hip Anterior (KHA) 328; gluteus maximus—Hip Extensor (HE) 330; and grouped hip flexors—Hip Flexor (HF) 332. Like their biological correspondents, these muscle-tendon units were modeled as unidirectional force sources, acting only in tension and never in compression. Each muscle-tendon unit was modeled using constant upper and lower moment arms with values taken from the literature [15].

As shown in FIG. 3, a monoarticular, Hill-type muscle was included to model the Ankle Plantar Flexor 316, or the Soleus muscle, used to power step-to-step gait transitions from one single support phase to the next single support phase. Further, agonist-antagonist, Hill-type muscles were employed to model the monoarticular hip joint musculature (Hip Extensor 330/Hip Flexor 332) used to stabilize the model's trunk during stance, and protract and retract each leg during the swing phase. The remaining muscle groups of the leg were modeled as isometric force sources with a tuned series tendon spring for power absorption and delivery, similar to the model of [16, 17]. Specifically, as shown in FIG. 3, all the muscles that span the knee in the human leg (Knee-Hip Posterior 326, Knee-Hip Anterior 328, Knee Flexor 324, Knee Extensor 322, Ankle-Knee Posterior 318), and dorsiflex the ankle (Ankle Dorsiflexor 320) were modeled in this manner. Specifically, each muscle generated force isometrically upon activation, like a mechanical clutch becoming locked upon engagement. Upon muscle activation, or clutch engagement, the muscle's series tendon spring was stretched, storing elastic energy. Once a tendon spring released its energy, its corresponding muscle, or clutch, automatically became deactivated. As shown in FIG. 3, the model's hip joint also included a passive linear torsional spring (Hip Ligament 334) representing the ligaments of the hip that apply a flexion moment about that joint. All modeled muscles and ligaments were considered massless. The mathematical expressions for the Hill-type muscle and its series tendon are described in the next section.

2.2 Muscle-Tendon Model

Each muscle-tendon unit was composed of a linear, series-tendon elasticity (SE), and a Hill-type contractile element (CE) with nonlinear force-length and force-velocity relations. In addition to the CE, the muscle model included linear parallel elasticity (PE) and buffer elasticity (BE) components, as described in [18]. The force of the CE was computed as the product of muscle activation α, CE force-length relationship $f_l(l_{CE})$, and CE force-velocity relationship $f_v(v_{CE})$, or $$F_{CE} = \alpha F_{max} f_l(l_{CE}) f_v(v_{CE}) \tag{1}$$

$$f_l(l_{CE}) = \exp\left[c \left|\frac{l_{CE} - l_{opt}}{l_{opt} w}\right|^3\right] \tag{2}$$

$$f_v(v_{CE}) = \begin{cases} \dfrac{v_{max} + v_{CE}}{v_{max} - K v_{CE}} & \text{if } v_{CE} < 0 \\ N - \dfrac{(N-1)(v_{max} - v_{CE})}{7.56 K v_{CE} + v_{max}} & \text{otherwise} \end{cases} \tag{3}$$

where $F_{max}$ is the maximum isometric force, $l_{CE}$ is the length of the CE, $l_{opt}$ is the optimal length of the CE and $v_{CE}(t)$ is the CE velocity. In the force-length relationship $f_l(l_{CE})$, w describes the width of the bell-shaped curve and c is ln(0.05), fulfilling $f_l(l_{opt}(1\pm w))=0.05$. The force-velocity relationship $f(v_{CE})$ follows the Hill equation [19] for muscle shortening ($v_{CE}<0$), where $v_{max}$ is the maximum contraction velocity and K is a curvature constant. Muscle lengthening ($V_{CE} \geq 0$) is characterized by an equation based on Aubert [20], where N is the dimensionless amount of force $F_{CE}/F_{max}$ reached at a lengthening velocity $v_{CE}=v_{max}$.

Based on this product approach, the muscle fascicle dynamics was computed by integrating the CE velocity. The muscle activation α relates to a neural input S(t) with a first order differential equation describing the excitation-contraction coupling, or $$\tau \frac{d\alpha(t)}{dt} = S(t) + prestim - \alpha(t) \tag{4}$$

where τ is a time constant, and prestim is a predefined prestimulation. The maximum isometric force and optimal length of the Ankle Plantar Flexor muscle $F_{max}^{ap}$ and $l_{opt}^{ap}$, respectively, were variables for the optimization procedure (See section 2.5 Optimization strategy), while the remaining physical muscle parameters were taken from the literature [7, 21].

2.3 Muscle Reflex Control

The modeled Ankle Plantar Flexor 316 and Hip Flexor 332/Extensor 330 muscles were controlled by feedback reflex controllers. Muscle control was reflexive, not requiring previously-computed joint trajectories or central pattern generators. A force, length and velocity reflex loop was used to control the Ankle Plantar Flexor to power step-to-step gait transitions. Further, two types of length and velocity reflex loops were employed in the control of Hip Flexor/Extensor muscles to stabilize the trunk and to protract and retract the swing leg.

2.3.1 Force, Velocity and Length Feedback Controller for the Ankle Plantar Flexor Muscle During the stance phase, especially at terminal stance, the soleus muscle generates a large amount of positive mechanical power to plantar flex the ankle and push-off the ground [2, 22]. Empirical measurements have demonstrated the importance of muscle-fascicle force and state reflex responses for the soleus muscle [23-25]. In order to replicate this behavior, force, velocity and length feedback from the muscle fascicle were adopted for the Ankle Plantar Flexor control, with feedback signals normalized by maximum isometric force, maximum velocity and optimal length, respectively. The positive force feedback term in the model was based on the studies of Geyer & Herr [7] and Prochazka et al. [26]. Under such force, velocity and length feedback, the stimulation of the Ankle Plantar Flexor $S^{ap}(t)$ was calculated as $$S^{ap}(t) = G_F^{ap} F^{ap}(t - \Delta t^{ap}) u(F^{ap}(t - \Delta t^{ap}) - F_0^{ap}) + \\ G_l^{ap} l^{ap}(t - \Delta t^{ap}) u(l^{ap}(t - \Delta t^{ap}) - l_0^{ap}) + \\ G_v^{ap} v^{ap}(t - \Delta t^{ap}) u(v^{ap}(t - \Delta t^{ap})) \quad (5)$$

where $G_F^{ap}$, $G_l^{ap}$, $G_v^{ap}$ are force, length and velocity feedback gains; $F^{ap}$ and $F_0^{ap}$ are the measured muscle force and force threshold; and $l^{ap}$, $l_0^{ap}$ are the measured CE length and length threshold; $v^{ap}$ is the measured CE velocity; and $\Delta t^{ap}$ is a time-delay for the feedback loop. The functions u( ) are unit step functions that ensure the feedback terms are only enabled when the function argument is positive. This feedback control was turned on only after foot-flat during the stance phase, and was turned off at the time of toe-off. During the swing phase, the ankle joint was controlled with a simple proportional-derivative (PD) control with low gain to keep the ankle angle equal to $\hat{\theta}^a$ in preparation for heel-strike. In the force and state feedback control, $G_F^{ap}$, $G_l^{ap}$, $G_v^{ap}$, $\Delta t^{ap}$, $F_0^{ap}$, $l_0^{ap}$ and $\hat{\theta}^a$, were variables for the optimization procedure (See section 2.5 Optimization strategy), while the remaining parameters were taken from the literature [7]. The ankle state machine defining the initiation of these control actions is described below in the subsequent Section 2.4 Finite state machine.

2.3.2 HAT and Thigh Segment PD Feedback Controller for the Hip Muscles

Balancing the head, arms and trunk (HAT) segment (see 314 of FIG. 3) is generally considered a multi-sensory integration task from vestibular, visual and proprioceptive signals [27]. While this complex integration seems critical to control standing, it may not be required for locomotion [28]. However, Günther & Ruder [15] and Geyer & Hen [7] stabilized the HAT segment in human walking models by activating the hip muscles proportional to the velocity of the HAT segment, and according to its forward pitch angle in the inertial system. The model presented here was constructed with hip controllers motivated by these two studies.

Two distinct muscle hip controllers were employed for stance and swing phases. During stance, the Hip Flexor 332 and Extensor 330 muscles were used to balance the HAT segment 314. These muscles were stimulated with a PD signal of the difference between HAT's pitch angle $\theta^{HAT}$ with respect to gravity and the reference angle $\hat{\theta}^{HAT}$ as $$S_{stance}^h(t) = -G_{p1}^h \{\hat{\theta}^{HAT} - \theta^{HAT}(t - \Delta t^h)\} - G_{d1}^h \dot{\theta}^{HAT}(t - \Delta t^h) \quad (6)$$

$$S_{extensor}^h(t) = \begin{cases} S_{stance}^h(t) & \text{if } S_{stance}^h > 0 \\ 0 & \text{otherwise} \end{cases} \quad (7)$$

$$S_{flexor}^h(t) = \begin{cases} -S_{stance}^h(t) & \text{if } S_{stance}^h < 0 \\ 0 & \text{otherwise} \end{cases} \quad (8)$$

where $G_{p1}^h$ and $G_{d1}^h$ are the proportional and derivative gains, and $\Delta t^h$ is a time-delay of the feedback loop. In the hip balance controller, $G_{p1}^h$, $G_{d1}^h$ and $\hat{\theta}^{HAT}$ were variables for the optimization procedure (See section 2.5 Optimization strategy), while the remaining parameters were taken from the literature [7].

During the swing phase, the swing leg had to be protracted forward in preparation for heel-strike. The hip joint 306 (FIG. 3) was controlled so that the thigh pitch angle $\theta^{thigh}$ reached a reference angle $\hat{\theta}^{high}$ as $$S_{swing}^h(t) = -G_{p2}^h \{\hat{\theta}^{thigh} - \theta^{thigh}(t - \Delta t^h)\} - G_{d2}^h \dot{\theta}^{thigh}(t - \Delta t^h) \quad (9)$$

$$S_{extensor}^h(t) = \begin{cases} S_{swing}^h(t) & \text{if } S_{swing}^h > 0 \\ 0 & \text{otherwise} \end{cases} \quad (10)$$

$$S_{flexor}^h(t) = \begin{cases} -S_{swing}^h(t) & \text{if } S_{swing}^h < 0 \\ 0 & \text{otherwise} \end{cases} \quad (11)$$

where $G_{p2}^h$ and $G_{d2}^h$ are the proportional and derivative gains, $\hat{\theta}^{thigh}$ is a reference thigh angle in the global axis, and $\Delta t^h$ is a time-delay. In the swing phase, the Hip Flexor 332 muscle was mainly activated to bring the swing leg forward in a protraction movement. Moreover, after maximum knee extension is reached, human walkers generate retraction torque in preparation for heel-strike [7, 8]. In order to replicate this behavior, two different reference angles, $\hat{\theta}_1^{thigh}$ and $\hat{\theta}_2^{thigh}$, were used before and after the maximum knee extension, respectively, where $\hat{\theta}_1^{thigh} \leq \hat{\theta}_2^{thigh}$. In the hip reflex state controller, $G_{p1}^h$, $G_{d1}^h$, $\hat{\theta}^{HAT}$, $G_{p2}^h$, $G_{d2}^h$, $\hat{\theta}_1^{thigh}$ and $\hat{\theta}_2^{high}$ were variables for the optimization procedure (See section 2.5 Optimization strategy), while the remaining parameters were taken from the literature [7]. These HAT and thigh reflex controllers were switched by a hip finite state machine described in the next section.

2.4 Finite State Machine

State transitions of a finite machine were facilitated by the walking model, and its interactions with a modeled ground surface, and each muscle was engaged or activated according to the state. FIGS. 4A-C show finite state machines for controlling the ankle, knee and hip joints, i.e., joints 302, 304, and 306 of FIG. 3, respectively. The state machines turned on/off muscle feedback controllers at the ankle and hip, and activated the isometric muscle control by clutching the muscles. Each isometric muscle was de-activated or disengaged automatically when its series spring returned to its equilibrium position. The design methodology for state transitions, and corresponding muscle activation timings, are described in [17].

As shown in FIG. 4A, the ankle state machine 400 included three states, 402, 404 and 406. In State 1 (402), which began at heel-strike, the Ankle Dorsiflexor was engaged or locked in an isometric contraction. The controller transitioned from State 1 (402) to State 2 (404) at foot-flat, at which time the feedback control was initiated for the Ankle Plantar Flexor. These transitions were established based on electromyographic signals of the primary ankle muscles [2, 17]. The controller transitioned from State 2 (404) to State 3 (406) at toe-off. In State 3 (406), the feedback controller was turned off and a low-gain PD controller was applied at the ankle joint to keep the ankle angle equal to $\hat{\theta}^a$ in preparation for heel-strike. At the next heel-strike, the controller transitioned from State 3 (406) back to State 1 (402).

As shown in FIG. 4B, the knee state machine controller 410 included four states, 412, 414, 416 and 418. The controller transitioned from State 1 (412) to State 2 (414) at maximum knee flexion during the stance phase following heel-strike. In State 2 (414), the Ankle-Knee Posterior muscle was engaged or locked in an isometric contraction. The transition from State 2 (414) to State 3 (416) was triggered by toe-off after which the Knee-Hip Anterior was activated. The controller transitioned from State 3 (416) to State 4 (418) when the knee angle reached $\hat{\theta}^k$ during swing extension after maximum knee flexion was achieved during the swing phase. The Knee-Hip Posterior and Knee Flexor were activated in State 4 (418). Finally, the controller returned back to State 1 (412) from State 4 (418) when the knee joint reached maximum extension in the swing phase. The Knee Extensor was engaged in State 1 (412). As described in the optimization procedure in the next section, the knee reference angle $\hat{\theta}^k$ was an optimized parameter.

As shown in FIG. 4C, the hip state machine controller 420 included only two states, 422 and 424. The hip controller transitioned from State 2 (424) to State 1 (422), at the time of foot-flat, and from State 1 (422) to State 2 (424) at toe-off. The hip muscles were controlled with the HAT and thigh segment PD controllers in States 1 and 2 (422 and 424), respectively.

2.5 Optimization Strategy

The model as described in reference to FIG. 3 above had a total of 28 parameters that were evaluated with a walking forward dynamics simulation. The parameters were 10 tendon stiffnesses, 1 hip ligament engagement angle, 2 muscle physical parameters ($F_{max}^{ap}$, $l_{opt}^{ap}$), 10 muscle control parameters ($G_F^{ap}$, $G_l^{ap}$, $G_v^{ap}$, $\Delta t^{ap}$, $F_0^{ap}$, $l_0^{ap}$, $G_{p1}^h$, $G_{d1}^h$, $G_{p2}^h$, $G_{d2}^h$), and 5 reference angles ($\hat{\theta}^a$, $\hat{\theta}^{HAT}$, $\hat{\theta}_1^{thigh}$, $\hat{\theta}_2^{thigh}$, $\hat{\theta}^k$). The minimum and maximum bounds for the tendon-stiffness parameters were defined as follows. Using electromygraphic data from the literature [2], the torque change was defined when each muscle was active and the corresponding joint angle change. Using the effective moment arm for each muscle-tendon, the corresponding change in force and length were computed. The nominal spring constant was then calculated by simply dividing the force change by the length change. The lower and upper bounds for each tendon spring stiffness was then set equal to 0.1 and 5 times its estimated nominal spring constant.

The bounds of $F_{max}^{ap}$, $l_{opt}^{ap}$, and $\Delta t^{ap}$ were set equal to 0.1 and 5 times their nominal values taken from literature [21]. All control gains were bounded between 0 and 5. Further, $F_0^{ap}$ was bounded between 0 and 5 times the isometric maximum force [21], and $l_0^{ap}$ was bounded between 0 and 2 times the optimal muscle fascicle length taken from literature [21]. The bounds of all reference angles were defined to be large enough to cover all physically-achievable movements. Generally, each numerical bound was made large enough to prevent the optimization from hitting its min or max values. When the optimization reached an extreme value, the bound was expanded and the optimization was rerun.

Parameters were evaluated with a walking forward dynamics simulation. In order to consider both joint biomechanics and metabolic COT, the current approach adopted an elitist non-dominated sorting genetic algorithm (termed NSGA-II) [29-31], and the following two cost functions were used. The first cost function is defined as $$cost_1 = \begin{cases} \frac{1}{D+N} & \text{if } t_s < 20 \\ c_{et} & \text{otherwise} \end{cases} \quad (12)$$

where $t_s$ is the last time of walking simulation, D is the normalized walking distance, N is the number of steps, and $c_{et}$ is the metabolic COT. Metabolic COT is defined as $$c_{et} = \frac{\sum_i \int p\left(\frac{v^i}{v_{max}^i}\right) F_{max}^i v_{max}^i \alpha^i(t) dt}{MgD} \quad (13)$$

where $p(v_{CE}/v_{max})$ is the normalized metabolic power function in terms of normalized muscle fascicle velocity, $\alpha^i$ is the ith muscle activation, and $F_{max}^i$, $v_{max}^i$, and $v^i$ are maximum isometric force, maximum velocity and velocity of the ith muscle, respectively. This metabolic cost function was taken from Krishnaswamy et al. [32] with $F_{max}^i$ and $v_{max}^i$, taken from the literature for each modeled muscle [7, 21]. Each individual was evaluated after a forward dynamics simulation. When the simulation time reached 20 seconds, steady state walking was assumed and the simulation terminated, and then the next individual was simulated. When the model fell down in less than 20 seconds, the simulation was terminated immediately and the next simulation was initiated. The optimizer used the first objective function of Eq. 12 to find parameters that enabled the model to walk for more than 20 seconds without falling down. If the musculoskeletal model was capable of walking for more than 20 seconds, the second term of the objective function of Eq. 12 was used. The value of the second cost in Eq. 12 is always less than that of the first cost, so the optimizer selected parameters that enabled both robust and economical walking [33, 34].

The second cost function is based upon the quality of the model's fit to the joint angle data for the three leg joints, and is defined as $$cost_2 = 1 - \sum_i \frac{R_i}{3} \quad (14)$$

where $R_i$ is the maximum cross-correlation coefficient of the ith joint angle between the model and biological data. R=1 indicates perfect agreement with biological data, whereas R=0 indicates no agreement. Biological joint angle data for ankle, knee and hip were taken from the study of [14]. Moreover, since the self-selected walking speed of all study participants was between 1.2 and 1.35 m/s in [14], only individuals within that speed range were preserved in the next generation. This is a similar method of $\epsilon$-constraint of optimization as used in [35] and shortened the amount of computation, as well as made the optimization converge more readily. The population was set to 100, and the initial individuals were generated randomly. The optimization was terminated when a new pareto optimal solution had not been found in the last 10 generations, where a pareto optimal solution was defined as an individual with less or equal $cost_1$ or $cost_2$ than any other individual in the same generation.

2.6 Model Evaluation 2.6.1 Energy Transfer Across Joints

As the model has biarticular units, stored energy at one spring from one joint can be released to the other joint, or mechanical energy transfer can occur. In this example, an energy transfer, for instance, from joint 1 to joint 2 was calculated as $$ET_{1-2} = \frac{W_2 - W_1}{MgL_{leg}} \tag{15}$$

where $W_1$ and $W_2$ are the total net work done across a gait cycle by a biarticular unit spanning joint 1 and 2, respectively. This quantity is dimensionless, normalized by each participant's body weight, Mg, and leg length, $L_{leg}$.

2.6.3 Whole-Body Mechanical Energetics

Willems, et al. [36] reported that the body's total mechanical energy can be estimated from the sum of the gravitational potential energy and the kinetic energy of each model segment. However, as Ishikawa, et al. [11] showed, muscle tendon units store a considerable amount of energy, and thus cannot be ignored in the estimation of the body's total mechanical energy. As the model presented here includes the elastic energy storage of tendons and ligaments, the total whole-body mechanical energy $E_{tot,wb}$ can be calculated from the gravitational potential energy $E_{pot}$, the kinetic energy $E_k$, and the elastic energy storage $E_e$ as $$E_{tot,wb} = E_{pot} + E_k + E_e \tag{16}$$

$$= Mgh_{cm} + \frac{1}{2}Mv_{cm}^2 + \sum_{i=1}^{n}\left(\frac{1}{2}m_i v_{r,i}^2 + \frac{1}{2}m_i K_i^2 w_i^2\right) + \frac{1}{2}\sum_{i=1}^{11}k_i \Delta x_i^2$$

where, $h_{cm}$ and $v_{cm}$ are the height and the linear velocity of the center of mass of the whole body; $v_{r,i}$ is the linear velocity of the center of mass of the ith segment relative to the center of mass of whole body; $w_i$ and $K_i$ are the angular velocity and the radius of gyration of the ith segment around its center of mass; M is total body mass; g is the acceleration due to gravity; and $k_i$ and $\Delta x_i$ are the spring coefficient and displacement of the ith model spring, respectively. Whole-body center of mass position and velocity, $h_{cm}$ and $v_{cm}$, were calculated from the motion capture data of [14] as $$\vec{r}_{cm} = \frac{1}{M}\sum_{i=1}^{n} M_r^i \vec{r}_{cm}^i \tag{17}$$

where $\vec{r}_{cm}$ is the vector to the CM of the whole body, $M_r^i$ is mass of ith segment and $\vec{r}_{cm}^i$ is the vector to the CM of ith segment relative to the CM of whole body. Whole-body center of mass height, $h_{cm}$, is the vertical element $\vec{r}_{cw}$, and $v_{cm}$ is obtained as the Euclidean noun of the derivative of $\vec{r}_{cm}$.

Willems, et al. [36] reported the mechanical energy exchange within the human body during normal walking without considering elastic energy storage within tendons and ligaments. The model presented here enables an estimate of elastic energy storage and the percentage recovery between elastic energy, potential and kinetic energies throughout the walking gait cycle. The percentage recovery (RECD) between elastic, potential, and kinetic energy domains is defined as $$REC = \frac{|W_{pk}| + |W_e| - |W_{tot}|}{|W_{pk}| + |W_e|} \times 100 \tag{18}$$

where $W_{pk}$ is the sum of the positive increments of the potential/kinetic energy curve, $W_e$ is the sum of the positive increments of elastic energy curve, and $W_{tot}$ is the sum of positive increments of both curves in one complete walking cycle. The percentage recovery is 100 percent when the two energy curves are exactly equal in shape and amplitude, but opposite in sign. In that particular case of a conservative model, the total mechanical energy of the body does not vary in time.

3. Results 3.1 Determination of the Optimal Solution

Figure 5A:
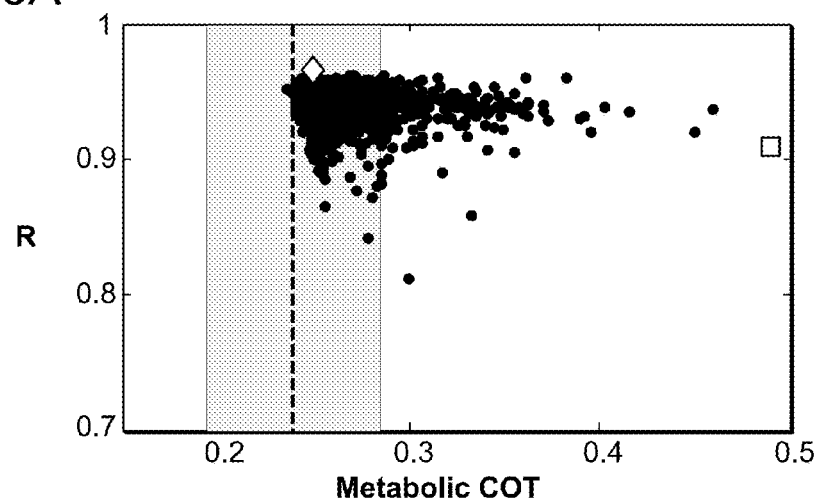
FIGS. 5A-B illustrate the relationship between metabolic cost of transport (COT) and the maximum cross-correlation coefficient (R).

FIG. 5A shows the results of the NSGA-II optimization for one modeled representative participant with two cost functions: metabolic COT and the maximum cross-correlation coefficient, R, summed across three joint angles and normalized by 3. The closed symbols are all the forward dynamic solutions that walk for at least 20 seconds without falling down, and where model walking speed falls within the range from 1.2 msec to 1.35 msec. As a comparison, the open square symbol denotes the model of Anderson & Pandy [3] with a metabolic COT value that far exceeds human walking energetic levels.

Figure 5B:
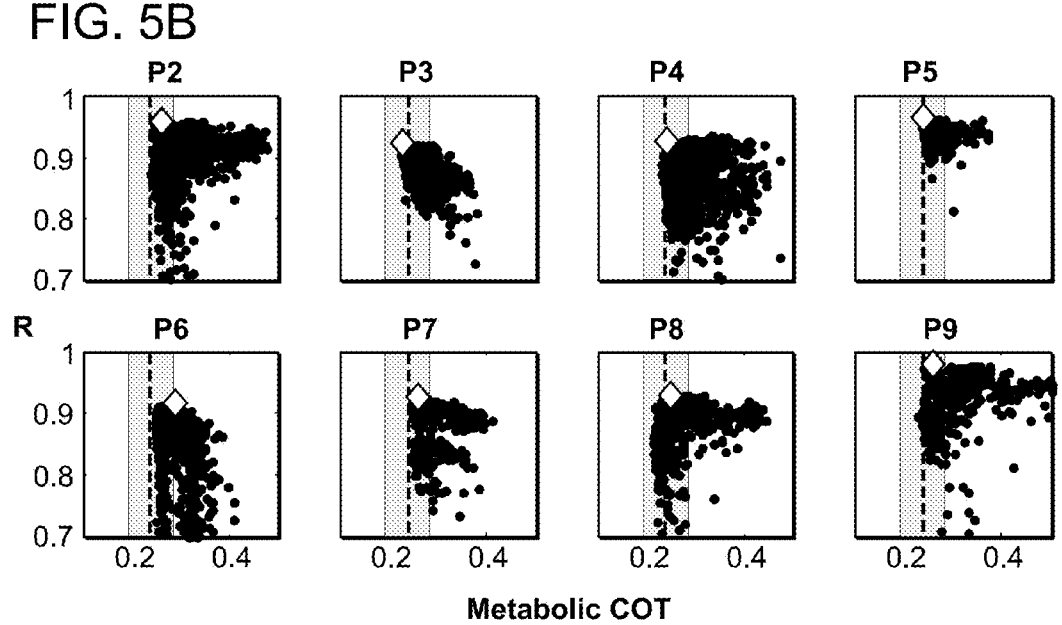

One objective of this approach is to find a musculoskeletal model that predicts both walking biomechanics and energetics at a self-selected walking speed. Thus, here one can define the best solution as that individual with the highest R value, designating the greatest kinematic joint agreement, that predicts human walking metabolic COT data within one standard deviation of the mean. For the representative participant shown in FIG. 5A, the open diamond designates the optimal solution having these properties. The relationships between COT and R for the other eight study participants (P2-P9) are shown in FIG. 5B where, in each plot, the open diamond once again designates the optimal solution chosen using these same criteria. The results shown in FIGS. 5A-B indicate that all nine walking models, having different mass, height, and segment properties, show good agreement with all nine of the modeled human-walking participants in terms of biological joint kinematics and metabolic COT.

3.2 Walking Kinetics and Kinematics 3.2.1 Joint Angle and Torque Agreement

Joint angles and torques for ankle, knee and hip are shown in FIGS. 6A-F for one representative participant versus percent gait cycle. The model makes quantitative predictions of ankle (FIG. 6A), knee (FIG. 6B), and hip (FIG. 6C) joint angles, showing good agreement with biological data at all joints (ankle R=0.95, knee R=0.99, hip R=0.96). The mean of nine participants' R values are 0.85±0.07, 0.95±0.02, and 0.96±0.01 (mean±s.d) for the ankle, knee and hip joints, respectively.

The R value for ankle torque in FIG. 6D also shows good agreement with biological data (ankle R=0.98) for the same representative participant. However, R values for knee (FIG. 6E) and hip (FIG. 6F) joint torque show poorer agreement with biological data (knee R=0.77, hip R=0.69). A similar trend is present across all study participants. The mean R value for ankle torque shows good agreement with biological data (ankle R=0.84±0.11), while the average of R values for knee and hip joint torque show significantly poorer agreement (knee R=0.59±0.19, hip R=0.46±0.10). The poorer agreement at knee and hip joints compared to the ankle may be caused by the fact that, when a joint angle is geometrically far from the ground surface, inverse dynamic calculations results in a larger torque error. Previous studies also showed poorer agreement for hip and knee joint torques compared to ankle torque [3, 7].

3.2.2 Ground Reaction Force, Walking Speed, Step Length, and Stride Time

Figure 7:
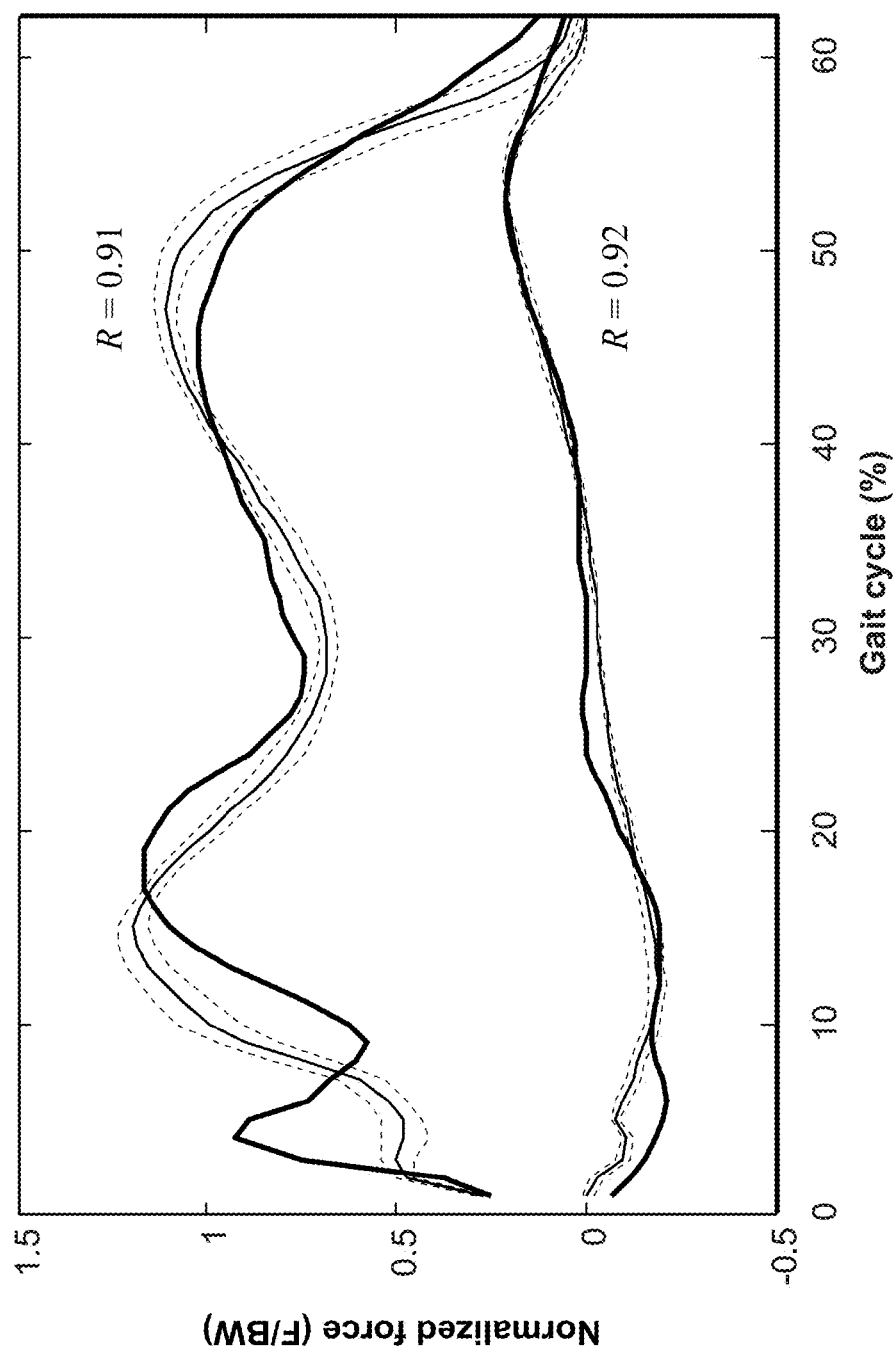
FIG. 7 depicts ground reaction force (GRF) prediction. Vertical GRF (upper curves) and horizontal GRF (lower curves) for biological walking (grey lines) and model walking (black lines) are shown for one representative participant (Participant #1, Table I). Only data from the stance phase (0~62% of gait cycle) are shown. The dotted curves are one standard deviation from the biological data mean (N=7 walking trials). Model GRFs are the mean of 10 walking stance phases from the optimal solution shown in FIG. 5A. All data are normalized by body weight. Maximum cross-correlation coefficient (R) values are shown for each model prediction.

FIG. 7 shows vertical and horizontal ground reaction forces for the same representative participant as in FIGS. 6A-F. The model makes quantitative predictions of vertical and horizontal ground reaction forces, showing good agreement with human data (vertical R=0.91, horizontal R=0.92). Here, the vertical ground reaction force in stance shows the M-shape pattern characteristic of walking gaits, indicating similar CM dynamics between model and human for steady-state walking.

For all nine participants, the optimal model's mean walking speed, step length and stride time are listed in Table II. The current model walks with a somewhat longer step length and stride time than human's do at a self-selected walking speed.

TABLE II

|  | Model | Human |
|---|---|---|
| Walking speed (m/s) | 1.28 ± 0.04 | 1.27 ± 0.11 |
| Step length (m) | 0.80 ± 0.07 | 0.67 ± 0.06 |
| Stride time (s) | 1.25 ± 0.04 | 1.04 ± 0.10 |

Table II lists walking speed, step length and stride time. Mean and standard deviations are shown for the optimal walking solutions of all nine morphological models.

3.3 Walking Metabolic Energetics
3.3.1 Metabolic COT

Using measures of oxygen consumption and carbon dioxide exhalation, the metabolic COT for human walking has been estimated at 0.24±0.04 (total of 0.35 J/Nm minus basal rate) for a walking speed of 1.25 msec [9]. For walking speeds ranging from 1.2 m/sec to 1.35 msec, the metabolic COT of the nine-modeled participants for the optimized solutions shown in FIGS. 5A-B is 0.22±0.02, a model prediction showing good agreement with biological data.

Anderson & Pandy [3] and Umberger et al. [37] suggested a mathematical methodology to calculate the metabolic cost of walking that employs metabolic heat rate estimates based upon muscle state. Using their suggested methodology, Anderson & Pandy [3] estimated their walking model's metabolic COT to be ~0.49 (walking speed ~1.37 m/s). More recently, Song & Geyer [7] adopted the Umberger et al. [37] model and reported that their model walked with a metabolic COT of ~0.3 at 1.2 in/sec (human metabolic COT is 0.24±0.04 [8]). The metabolic COT of the present model is 0.22±0.02 and 0.21±0.02 based on the Anderson & Pandy [3] model and Umburger et al. [37] model, respectively. Thus, using either methodology to estimate metabolic COT, the walking model presented here shows good agreement with human walking data.

3.3.2 Energy Transfer Between Leg Joints

As a biarticular unit spans two joints, mechanical energy can be carried from one joint to another; energy stored through rotation at one joint can be reused at an adjacent joint later in the gait cycle. Table III shows normalized energy transfer from knee to hip ($ET_{k-h}$), and ankle to knee ($ET_{a-k}$) for all participants, normalized by body weight and leg length. All participants show a small amount of energy transfer from the ankle to knee joint, $ET_{a-k}$. As an example, participant 1 transfers 0.13 J of mechanical energy from ankle to knee. The amount of energy transfer from the knee to hip joint $ET_{k-h}$ is also relatively small. For example, participant 1 transfers 1.9 J of mechanical energy from knee to hip during each gait cycle.

TABLE III

|  | $ET_{k-h}$ | $ET_{a-k}$ | REC(%) | FibNet | FibPos | FibNeg | ElaPos |
|---|---|---|---|---|---|---|---|
| 1 | 0.002 | 0.000 | 43.7 | 0.026 | 0.034 | −0.008 | 0.048 |
| 2 | 0.002 | 0.002 | 65.6 | 0.009 | 0.017 | −0.008 | 0.038 |
| 3 | 0.003 | 0.005 | 55.8 | 0.018 | 0.025 | −0.007 | 0.038 |
| 4 | 0.001 | 0.000 | 41.0 | 0.010 | 0.018 | −0.008 | 0.029 |
| 5 | 0.001 | 0.000 | 59.2 | 0.010 | 0.02 | −0.010 | 0.032 |
| 6 | 0.004 | 0.001 | 78.8 | 0.022 | 0.028 | −0.007 | 0.049 |
| 7 | 0.003 | 0.002 | 61.7 | 0.026 | 0.033 | −0.008 | 0.048 |
| 8 | 0.004 | 0.002 | 69.6 | 0.027 | 0.034 | −0.007 | 0.048 |
| 9 | 0.003 | 0.002 | 61.7 | 0.026 | 0.033 | −0.008 | 0.048 |
| mean | 0.003 | 0.002 | 60 | 0.018 | 0.026 | −0.008 | 0.041 |
| s.d. | 0.001 | 0.001 | 12 | 0.007 | 0.007 | 0.001 | 0.008 |

Table III lists walking model mechanical energetics. Listed are total energy transfer from knee to hip ($ET_{k-h}$) and from ankle to knee ($ET_{a-k}$), percentage recovery (REC), net muscle fiber mechanical work (FibNet), muscle fiber positive mechanical work (FibPos), muscle fiber negative actuator work (FibNeg), and spring positive mechanical work (ElaPos). Values listed for 9 modeled study participants. All energy quantities are normalized by the product of leg length and body weight (See Table I for values).

3.3.3 Whole-Body Mechanical Energetics

Figure 8:
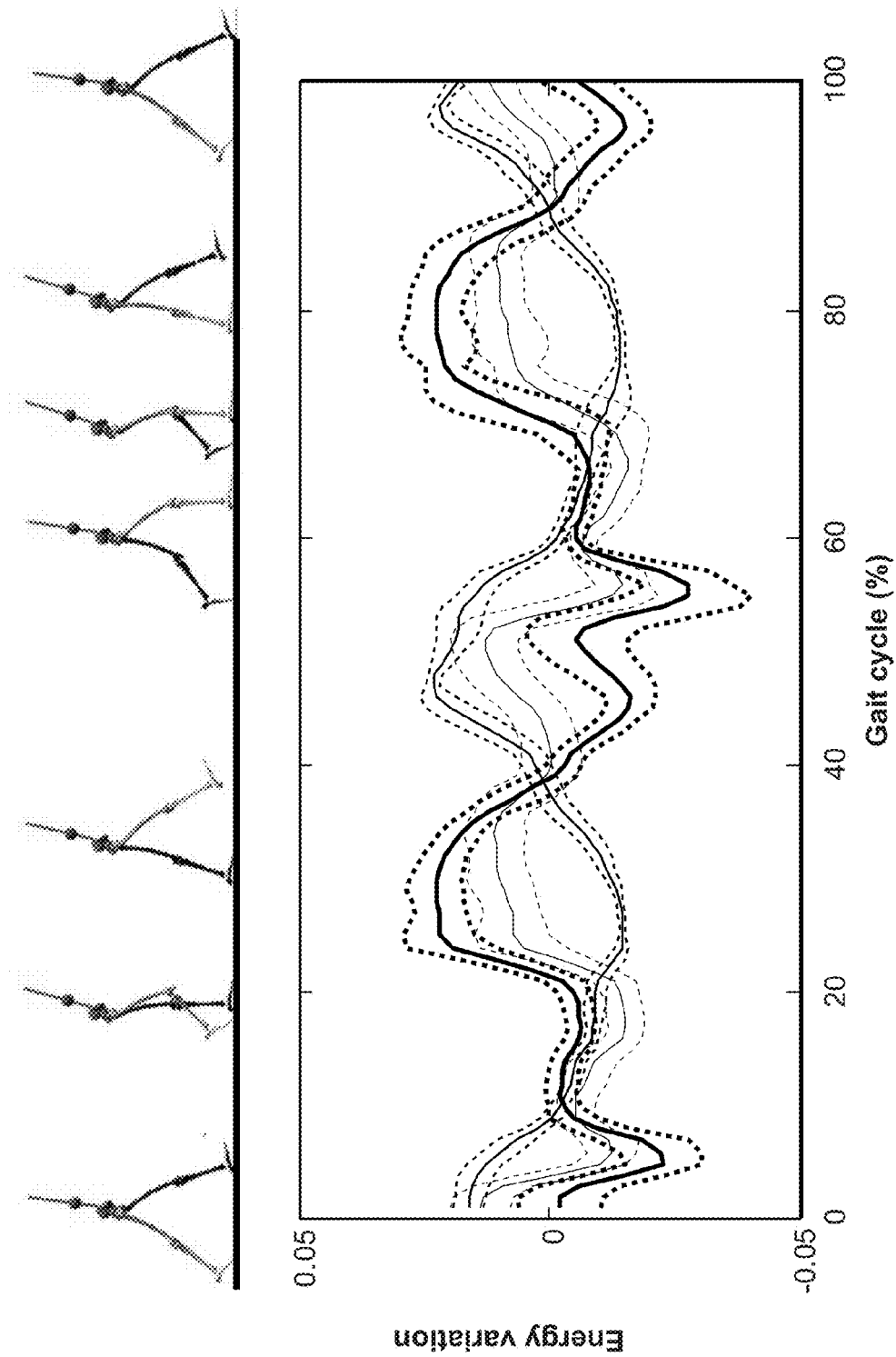
FIG. 8 depicts potential, kinetic and elastic mechanical energy predictions. The thin grey curve is the sum of gravitational potential and kinetic mechanical energies during steady-state model walking of one representative participant (Participant #1, Table I). The black curve is the estimated elastic potential energy from all the springs within the walking model. The thick grey curve is the model's total mechanical energy. Each dotted line is one standard deviation about the mean (N=10 walking model cycles). Energy curves are normalized by body weight and the center of mass height during quiet standing (See Table I for values).

For the same representative participant, FIG. 8 shows potential and kinetic energy variations in time throughout the gait cycle as estimated from the model, as well as variations in elastic energy storage from the model's tendons and ligaments. Elastic energy storage is maximized around 45% and 95% of the gait cycle, while kinetic/potential energy is maximized at 28% and 78% of the gait cycle. Their peaks are phase shifted, which implies energy exchange occurs between these mechanical energy domains. The recovery between kinetic/potential and spring energy of the nine study participants is 60±12% (See Table III). Table III also shows total net muscle fiber mechanical work (FibNet), positive muscle fiber mechanical work (FibPos), negative muscle fiber mechanical work (FibNeg), and total spring positive mechanical work (ElaPos) for the nine participants. The results show smaller values for FibNet, FibPos and FibNeg, and larger values for ElaPos than from the literature [4-6]. This result is not surprising since the preponderance of leg muscles in the walking model generate force isometrically with zero fascicle work, where the series tendon is used for power absorption and delivery instead of the muscle.

3.4 Walking Control
3.4.1 Reflex Dynamics of the Ankle Plantar Flexor

The Ankle Plantar Flexor muscle (see 316, FIG. 3) employs force, velocity, and length feedback signals throughout the stance period. In order to assess the relative contribution of each feedback signal, force, velocity and length feedback data were normalized by isometric force, maximum shortening velocity and rest length, respectively, of the modeled muscle. For the optimal solution shown in FIG. 5A, the normalized force feedback sharply increases at 30% gait cycle, assuming a peak value of 0.65 at 50% gait cycle. In distinction, the normalized velocity feedback signal remains small, and the normalized position feedback is nearly zero. At terminal stance, the normalized velocity feedback signal increases modestly (peak value ~0.03), contributing somewhat to ankle powered plantar flexion but the preponderance of signal comes from force feedback. Previous studies have shown a similar trend. Notably, Mint et al. [23] isolated the contributions of force-based and state-based afferent feedback during different intervals of stance at self-selected walking speed. They found that force feedback was dominant in late stance but contributed little during mid-stance perturbations, where spindle-based feedback was shown to dominate.

4. Discussion

A computational model of walking is presented that unifies muscle and joint biomechanics with whole-body metabolism for level-ground walking at self-selected speed. For a model to predict both biomechanics and energetics, it can be hypothesized that the preponderance of leg muscles must generate force at low fascicle speed allowing economical force generation. To simplify the model, six of the nine leg muscles are assumed to act in a purely isometric manner, where a tuned, series-tendon compliance enables full energy absorption and delivery, lowering metabolic demands in walking. Specifically, all muscles spanning the knee, as well as the Ankle Dorsiflexor, are assumed to act isometrically upon neural activation. Only three of the nine modeled leg muscles provide nonconservative positive work throughout the gait cycle. To provide the mechanical power for step-to-step gait transitions, a Hill-type Soleus muscle is modeled to actively plantar flex the ankle using muscle state and force as reflex feedback signals. Finally, to stabilize the trunk during stance, and to protract and retract each leg throughout the swing phase, two mono-articular Hill-type muscles actuate the model's hip joint.

The results of this example support this general neuromechanical framework. As shown in FIGS. 5-7, the model shows good agreement with metabolic COT, joint state, joint torque and ground reaction force data from nine, weight and height-matched human participants. This example underscores the importance of musculoskeletal modeling as a way to uncover basic underlying mechanisms that govern individual muscle-tendon behaviors in level-ground human walking.

4.1 Mechanical Efficiency of Walking

In addition to metabolic COT, traditionally mechanical efficiency [5] has been used to evaluate human walking energetics. Donelan et al. [38] measured human walking metabolic energy expenditure and mechanical work done by the ground reaction forces, and estimated the efficiency of human walking. They defined efficiency as $$efficiency_1 = -\frac{W_{GRF}^-}{E} \quad (19)$$

where $W_{GRF}^-$ is the negative mechanical work done by the ground reaction force on the center of mass, and E is the total metabolic energy expenditure [38]. Using this definition, they estimated walking efficiency to be ~0.25 at a walking speed of 1.27 m/sec. The model presented here predicts a walking efficiency equal to 0.24±0.02 across all nine participants.

The equation 19 definition of efficiency does not include positive and negative joint work contributions. Umberger et al. [37] examined the influence of joint work on efficiency. They defined walking efficiency as $$efficiency_2 = -\frac{W_{joint}^+}{E - W_{joint}^-} \quad (20)$$

where $W_{joint}^+$ and $W_{joint}^-$ are the total positive and negative mechanical work values across all joints, respectively. The negative mechanical work is also considered, as the negative work has the potential to be returned as positive work later in the gait cycle [38]. The Umburger et al. [37] results showed that when walking at 1.3 msec, subjects had an efficiency of ~0.38. Neptune et al. [5] constructed a musculoskeletal model for self-selected speed walking using a forward dynamics simulation, and calculated the mechanical work of each joint and the mechanical efficiency using the same metabolic cost as Umburger et al. [36]. Their results showed a similar efficiency of ~0.40. The model presented in this investigation shows an efficiency of 0.36±0.02 using this same definition.

Recently, a few researchers developing musculoskeletal models estimated walking efficiency with actual muscle CE work, or $$efficiency_3 = -\frac{W_{CE}^+}{E} \quad (21)$$

where $W_{CE}^+$ is positive mechanical work done by all CE's. Note that negative work need not be included in the denominator as was done in equation 20 because CE work can be directly computed from the musculoskeletal simulation. Neptune et al. [4] estimated an efficiency of 0.59 using the same metabolic cost as Umburger et al. [37]. On the contrary, the model presented here predicts a mechanical efficiency of 0.14=0.01 across all nine study participants. This predicted efficiency number is perhaps smaller than the value published in Neptune et al. [4] because the preponderance of modeled muscles act as isometric force sources, where CE work is by definition zero, but still consumes metabolic energy.

4.2 Is Purely Isometric Force Generation Optimal Energetically?

To simplify model control, in this example six of the nine leg muscles were assumed to act isometrically upon neural activation. However, instead of a purely isometric muscle model, a combination of eccentric and concentric CE motion may be more economical. As described in this section, one can relax the constraint of isometric force generation by re-optimizing each series-tendon stiffness to minimize muscle metabolism with the constraint that each muscle-tendon unit still outputs the same forces and overall displacements found in the optimal forward dynamic simulation shown in FIG. 5A. Like the forward dynamic simulation, muscle biological parameters such as maximal force, maximal velocity, and optimal length of muscle fascicles were taken from literatures [7]. The result of each muscle-tendon unit re-optimization is shown in Table IV. These numbers are normalized by the optimization result of the NSGA-II (Best solution in FIG. 5A). The optimization shows slightly higher stiffnesses (1.05~1.18) and lower metabolic COT contributions (0.58~0.99). Using these re-optimized metabolic values, the total metabolic COT for walking is estimated at ~0.24, while the result of the former optimal solution was ~0.25 (See FIG. 5A for value). This result indicates that, deviating from the isometric control hypothesis does not show significant energetic difference, supporting the simplifying assumption made in this study.

TABLE IV

| Muscle unit | KE | KHP | KF | KHA | AKP | AD |
|---|---|---|---|---|---|---|
| SEE stiffness | 1.17 | 1.14 | 1.13 | 1.21 | 1.05 | 1.18 |
| Metabolic COT contribution | 0.95 | 0.63 | 0.79 | 0.58 | 0.73 | 0.99 |

In Table IV, re-optimized SEE stiffness and metabolic COT contribution of each muscle are assumed to operate isometrically. Listed are the optimized stiffness and metabolic COT contribution for one representative participant (participant #1, Table I). The numbers are normalized by the optimal solution shown in FIG. 5A.

4.3 Model Limitations and Modifications

The walking model presented here lacks morphological structures and control mechanisms that play a role in shock attenuation during impact loading of the leg with the ground. Notably, the vertical force spike just after heel-strike at 5% gait cycle in FIG. 7 is substantially higher in the model compared to biological data. This force differential is likely due to the lack of shock reduction mechanisms in the modeled leg compared to the human limb. For example, the model does not include subtalar joint and foot movements that attenuate shock in the biological ankle-foot complex at foot-strike, including inversion/eversion rotations about the subtalar joint and longitudinal arch and heel pad compressions within the foot [39]. Model performance can be improved by including such degrees of freedom and elastic structures within the model.

Another shock attenuating strategy is terminal swing-phase limb retraction where a hip moment moves the foot rearwardly towards the ground to enhance foot ground-speed matching. Such limb retraction movement has been shown to enhance model stability for bipedal running [41] and may additionally improve walking stability. The walking model of this study had limited retraction before foot-strike causing perhaps an over estimate of step length and stride time (See Table II for values), and an unnatural vertical force spike during impact loading at 5% gait cycle (See FIG. 7). The model may be modified to include terminal-swing limb retraction to improve shock attenuation. Such modification can likely improve model robustness to speed and terrain disturbances.

Neuromechanical models of human locomotory function provide insights into orthotic and prosthetic leg design. Biophysical models that describe the morphology and neural control of human limbs can motivate the design of synthetic limbs that are quiet, low mass, economical, and stable—powered limbs that move like, and feel like, their biological counterparts. The design of orthotic and prosthetic legs to assist human walking can benefit from minimizing actuator work using tuned series-compliance.

REFERENCES

[1] J. Johansson, D. Sherrill, P. Riley, B. Paolo, H. Hen. A Clinical Comparison of Variable-Damping and Mechanically-Passive Prosthetic Knee Devices, American Journal of Physical Medicine & Rehabilitation. 84(8): 563-575, 2005.

[2] J. Perry and B. Schoneberger, *Gait Analysis: Normal and Pathological Function*. SLACK incorporated, 1992.

[3] F. C. Anderson and M. G. Pandy, "Dynamic optimization of human walking," *Journal of Biomechanical Engineering*, vol. 123, no. 5, pp. 381-390, 2001.

[4] R. Neptune, K. Sasaki, and S. Kautz, "The effect of walking speed on muscle function and mechanical energetics," *Gait & posture*, vol. 28, no. 1, pp. 135-43, 2008.

[5] R. Neptune, "Forward dynamics simulations provide insight into muscle mechanical work during human locomotion," *The American College of Sports Medicine*, pp. 203-210, 2009.

[6] R. Neptune, D. Clark, and S. Kautz, "Modular control of human walking: a simulation study," *Journal of biomechanics*, vol. 42, pp. 1282-1287, 2009.

[7] H. Geyer and H. Herr, "A muscle-reflex model that encodes principles of legged mechanics produces human walking dynamics and muscle activities.," *IEEE transactions on neural systems and rehabilitation engineering*, vol. 18, no. 3, pp. 263-73, June 2010.

[8] S. Song and H. Geyer, "Regulating speed and generating large speed transitions in a neuromuscular human walking model," *Robotics and Automation (ICRA), 2012 IEEE*, pp. 511-516, May 2012.

[9] H. Herr and A. Grabowski, "Bionic ankle-foot prosthesis normalizes walking gait for persons with leg amputation," *Proceeding of the Royal society B*, 2011.

[10] S. P. Ma and G. I. Zahalak, "A distribution-moment model of energetics in skeletal muscle," *Journal of Biomechanics*, vol. 24, pp. 21-35, 1992.

[11] M. Ishikawa, P. V. Komi, M. J. Grey, V. Lepola, and G.-P. Bruggemann, "Muscle-tendon interaction and elastic energy usage in human walking," *J Appl Physiol*, vol. 99, pp. 603-608, 2005.

[12] G. Lichtwark and A. Wilson, "Interactions between the human gastrocnemius muscle and the Achilles tendon during incline, level and decline locomotion," *Journal of experimental biology*, vol. 209, pp. 4379-4388, 2006.

[13] D. Winter, "Biomechanical motor patterns in normal walking.," *Journal of motor behavior*, vol. 15, no. 4, pp. 302-330, 1983.

[14] H. Herr and M. Popovic, "Angular momentum in human walking," *Journal of Experimental Biology*, vol. 211, pp. 467-481, 2008.

[15] M. Günther and H. Ruder, "Synthesis of two-dimensional human walking: a test of the model," *Biological cybernetics*, vol. 89, pp. 89-106, 2003.

[16] K. Endo, D. Paluska, and H. Herr, "A quasi-passive model of human leg function in level-ground walking," in *Proc. IEEE International Conference on Intelligent Robotics and Systems*, pp. 4935-4939, 2006.

[17] K. Endo, H. Herr. Human Walking Model Predicts Joint Mechanics, Electromyography and Mechanical Economy. IEEE/RSJ International Conference on Intelligent Robots and Systems (IROS); October 11-15; St. Louis, US, 2009.

[18] GT. Yamaguchi, A. Suwa, D. Moran, and J M. Winter, "A survey of human musculotendon parameters," in *Multiple Muscle Systems: Biomechanics and Movement Organization*, 1990, pp. 717-773.

[19] A. Hill, "The heat of shortening and the dynamic constants of muscle," *Proceedings of the Royal Society of London. Series B*, vol. 126, pp. 136-195, 1938.

[20] H. Geyer, A. Seyfarth, and R. Blickhan, "Positive force feedback in bouncing gaits?," *Proceedings. Biological sciences/The Royal Society*, vol. 270, no. 1529, pp. 2173-83, October 2003.

[21] S. L. Delp, "Surgery simulation: A computer graphics system to analyze and design musculoskeletal reconstructions of the lower limb," 1990.

[22] S. Au, P. Dilworth, and H. Herr, "An ankle-foot emulation system for the study of human walking biomechanics," in *Proc. IEEE int. conf. on robotics and automation*, 2006, pp. 2939-2945.

[23] R. of Klint, J. B. Nielsen, J. Cole, T. Sinkjaer, and M. J. Grey, "Within-step modulation of leg muscle activity by afferent feedback in human walking," *The Journal of physiology*, vol. 586, no. Pt 19, pp. 4643-8, October 2008.

[24] R. Mint, J. B. Nielsen, T. Sinkjaer, and M. J. Grey, "Sudden Drop in Ground Support Produces Force-Related Unload Response in Human Overground Walking," *J Neurophysiol* 101: vol. 101, pp. 1705-1712, 2009.

[25] N. J. Cronin, M. Ishikawa, M. J. Grey, R. of Klint, P. V. Komi, J. Avela, T. Sinkjaer, and M. Voigt, "Mechanical and neural stretch responses of the human soleus muscle at different walking speeds," *The Journal of physiology*, vol. 587, no. 13, pp. 3375-82, July 2009.

[26] A. Prochazka, D. Gillard, and D. J. Bennett, "Positive Force Feedback Control of Muscles Positive Force Feedback Control of Muscles," *J Neurophysiol*, vol. 77, pp. 3226-3236, 1997.

[27] T. Mergner, C. Maurer, and R. J. Peterka, "A multisensory posture control model of human upright stance," *Progress in Brain Research*, vol. 142, pp. 189-201, 2003.

[28] S. M. O'Connor and A. D. Kuo, "Direction-dependent control of balance during walking and standing.," *Journal of neurophysiology*, vol. 102, no. 3, pp. 1411-1419, 2009.

[29] K. Deb and T. Goel, "Controlled Elitist Non-dominated Sorting Genetic Algorithms for Better Convergence," *EVOLUTIONARY MULTI-CRITERION OPTIMIZATION*, vol. 1993, pp. 67-81, 2001.

[30] K. Deb and T. Goel, "A Hybrid Multi-Objective Evolutionary Approach to Engineering Shape Design," *Proceedings of the First International Conference on Evolutionary MultiCriterion Optimization*, pp. 385-399, 2001.

[31] K. Deb, *Multi-Objective Optimization using Evolutionary Algorithms*. Wiley, 2001.

[32] P. Krishnaswamy, E. N. Brown, H. M. Herr, "Human Leg Model Predicts Ankle Muscle-Tendon Morphology, State, Roles and Energetics in Walking," *PLoS Comput Biol.*, 7(3): e1001107. doi:10.1371/journal.pcbi.1001107, 2011.

[33] K. Hase and N. Yamazaki, "Computer Simulation Study of Human Locomotion with a Three-Dimensional Entire-Body Neuro-Musculo-Skeletal Model: I. Acquisition of Normal Walking," *JSME international journal. Series C, Mechanical systems, machine elements and manufacturing*, vol. 45, no. 4, pp. 1040-1050, 2002.

[34] H. Naito, T. Inoue, K. Hase, T. Matsumoto, and M. Tanaka, "Development of a Simulator for Human Walking with Hip Disarticulation Prosthesis using Neuro-Musculo-Skeletal Model," *J. Biomechanics Abstract of the 5th World Congress of Biomechanics*, vol. 2004, pp. 155-156, 2004.

[35] Y. Y. Haimes, L. S. Lasdon, and D. A. Wismer, "On a Bicriterion Formulation of the Problems of Integrated System Identification and System Optimization," *IEEE Transactions on Systems, Man and Cybernetics*, vol. 1, no. 3, pp. 296-297, 1971.

[36] P. A. Willems, G. A. Cavagna, and N. C. Heglund, "External, internal and total work in human locomotion.," *The Journal of Experimental Biology*, vol. 198, pp. 379-393, 1995.

[37] B. R. Umberger, K. G. M. Gerritsen, and P. E. Martin, "A model of human muscle energy expenditure.," *Computer methods in biomechanics and biomedical engineering*, vol. 6, no. 2, pp. 99-111, April 2003.

[38] J. Donelan, R. Kram, and A. Kuo, "Mechanical work for step-to-step transitions is a major determinant of the metabolic cost of human walking," *Journal of Experimental Biology*, vol. 3727, pp. 3717-3727, 2002.

[39] B. Prilutsky, "Work, Energy Expenditure, and Efficiency of the Stretch-Shortening Cycle," *Journal of Applied Biomechanics*, vol. 13, no. 4, p. 466, 1997.

[40] R. F. Ker, M. B. Bennett, S. R. Bibby, R. C. Kester, R. McN. Alexander, "The Spring in the Arch of the Human Foot," *Nature*, vol. 325, pp. 147-149, 1987.

[41] A. Seyfarth, H. Geyer, H. Herr, "Swing-leg Retraction: A Simple Control Model for Stable Running," *Journal of Experimental Biology*, 206: 2547-2555, 2003.

Example II

Application of a Neuromuscular Model to Prosthetic Control

A neuromuscular model of the function of the ankle joint during level ground, self-selected speed walking was developed by Krishnaswamy et al. (Krishnaswamy, P., Brown, E. N., Herr, H. M. (2011) Human Leg Model Predicts Ankle Muscle-Tendon Morphology, State, Roles and Energetics in Walking. PLoS Comput Biol 7(3): e1001107. doi:10.1371/journal.pcbi.1001107). This model encompassed the inverse step described in Example I (a), supra, but only for the ankle joint. In the following example, we describe the application of this model to control of a powered ankle-foot prosthesis. Emergent speed adaptive behavior was observed using this linear, reflex-based controller. No intrinsic or extrinsic sensing was employed in this example to modulate or tune the reflexive parameters with walking gait speed. Here reflexive parameters include, but are not limited to, thresholds, gains, and exponents on the feedback signals of muscle force, length and velocity. Hence, this case corresponds to the special case within the general framework of FIG. 1 where intrinsic sensing is only required to initiate the reflex response of a virtual calf muscle, but not to modulate reflexive parameters, either throughout a reflexive activation period during stance, or from walking cycle to walking cycle. Given the diagram in FIG. 1, this special case is achieved by using intrinsic and/or extrinsic sensing to close the switch, S, thereby initiating the reflexive feedback loop of one or more muscles. However, it should be understood that the general framework of FIG. 1 describes a procedure where reflexive parameters may be modulated by the controller either within a single activation period, or from gait cycle to gait cycle in an updating manner, based upon detected variations in gait speed and/or terrain.

Speed Adaptation in a Powered Transtibial Prosthesis Controlled with a Neuromuscular Model Control schemes for powered ankle-foot prostheses can benefit from a means to make them inherently adaptive to different walking speeds. Towards this goal, one may attempt to emulate the intact human ankle, as it is capable of seamless adaptation. Human locomotion is governed by the interplay among legged dynamics, morphology, and neural control including spinal reflexes. It has been suggested that reflexes contribute to the changes in ankle joint dynamics that correspond to walking at different speeds. Here a data-driven muscle-tendon model is presented that produces estimates of the activation, force, length, and velocity of the major muscles spanning the ankle to derive local feedback loops that may be employed in the control of those muscles during walking. This purely reflexive approach ignores sources of non-reflexive neural drive and does not necessarily reflect the biological control scheme, yet can still closely reproduce the muscle dynamics estimated from biological data. The resulting neuromuscular model was applied to control a powered ankle-foot prosthesis and tested by an amputee walking at three speeds. The controller produced speed adaptive behavior; net ankle work increased with walking speed, highlighting the benefits of applying neuromuscular principles in the control of adaptive prosthetic limbs.

1. Introduction

The human ankle generates net positive mechanical work during gait at moderate to fast walking speeds [1]. During stance phase, commercially available ankle-foot prostheses only store and release elastic strain energy and thus cannot generate net ankle work. To restore biological ankle function, self-contained powered prostheses have recently been developed with the capability to reproduce physiological levels of net mechanical work [2-4]. While these prostheses can reduce the metabolic cost of the wearer [5], many control challenges remain in realizing the potential of these devices for walking under diverse conditions, such as varying terrains and speeds. Toward this end, this approach focuses on the advancement of a speed adaptive control strategy for a powered ankle-foot prosthesis.

To develop a speed adaptive controller, one can consider the biomechanical changes in human ankle behavior across speed. A change in walking speed corresponds to a change in the relationship between ankle joint state (angle and derivatives) and joint torque. One way to encode these speed-adaptive variations in a prosthetic control scheme is to program the prosthesis with fixed mathematical functions defined by parameters that vary across speed [4]. However, this strategy requires supervisory controllers to explicitly vary function parameters as walking speed changes [4]. An alternative is a method described in Holgate, et al. [6], which uses tibia global angular position and angular velocity to measure gait cycle location regardless of stride length, thus enabling speed adaptation. This has the advantage of not requiring walking speed measurements from the device, preventing measurement errors and latency in parameter changes from affecting performance. Another method is presented here to achieve inherent speed adaptability by implicitly encoding speed-correlated torque-state variations in a biophysically inspired function. This method also does not require an explicit measurement of walking speed and may provide more potential for adaptability over a broader range of conditions.

Such a function can be developed by emulating muscle reflexes, i.e. muscle behaviors that are mediated by neural circuits that are confined to the spinal cord [7]. It has been suggested [8] that afferent feedback is important in enabling walking speed-dependent biomechanical changes. Reflexes offer a dynamic means to rapidly communicate mechanical changes to the neuromuscular system, and so may enable joint power generation to be appropriately timed across speed [8]. Thus, reflexes may provide a biophysical basis for closed-loop feedback control of ankle dynamics across speed.

Human motor control is believed to be composed of both a feedforward neural drive and a reflexive feedback component [7],[8]. Nonetheless, models controlled with only local reflexive feedback loops are able to produce walking simulations that qualitatively agree with human gait dynamics and muscle activations [9]. This purely feedback-based approach has been applied to a powered ankle-foot prosthesis to control it as if it were driven by a human muscle with a local force feedback reflex [10]. This system exhibited slope-adaptive behavior but the use of a force-feedback reflex alone, without parameter interventions, did not result in the biological trend of increasing net ankle work across speed [11]. Empirical studies such as Klint, et al. [12] have established the existence of length-based as well as force-based afferent feedback to the plantar flexors during stance in walking. Hence, other reflexes may be required in tandem with force feedback to produce speed-adaptive functionality, although the specific reflex pathways required and the quantitative details of their contributions are not yet known.

As described below, a neuromuscular modeling framework, when duly considering the interplay between musculoskeletal dynamics and neural control, can provide insight into reflex pathways contributing to ankle function in walking gait. In the approach presented here, a neuromuscular model composed of length, velocity, and force feedback in the posterior leg muscles, when used to control a powered ankle-foot prosthesis, can exhibit speed-adaptive behavior by producing a trend of increasing ankle joint net work with increasing walking speed. To evaluate this approach, we first developed the proposed modeling framework based on kinematic, kinetic and electromyographic gait data from an intact-limbed subject. The resulting neuromuscular model was then used to control a powered ankle-foot prosthesis worn by a transtibial amputee walking at three distinct speeds.

2. Methods
A. Modeling

Reflexes, among other neural pathways, dynamically link muscle force and state to muscle activation [7]. To specify a reflex-based controller one would require profiles of muscle force, state, and activation, all of which are difficult to access. Muscle state has a nonlinear dependence on tendon action and joint mechanics. Activation cannot be known in silico without quantifying the neural control pathways involved, which are unknown a priori and are what we set out to find in the first place. As a resolution to this difficulty we chose to estimate activations from electromyographic (EMG) data of healthy walking subjects, since the data already incorporates the dynamic effects of neural control within the subject. With the activations (effective control commands) and ankle angles from gait data, we actuated a dynamical model of the plant (consisting of ankle muscle-tendon units) and estimated muscle state profiles. The estimates of muscle state and activations were used to derive a reflex architecture that may contribute significantly to walking, as well as to quantify reflex parameters that are consistent with the muscle-tendon dynamics. This overall framework, shown in FIGS. 9A-B, emphasizes the interplay of legged dynamics with neural control.

Figure 9A:
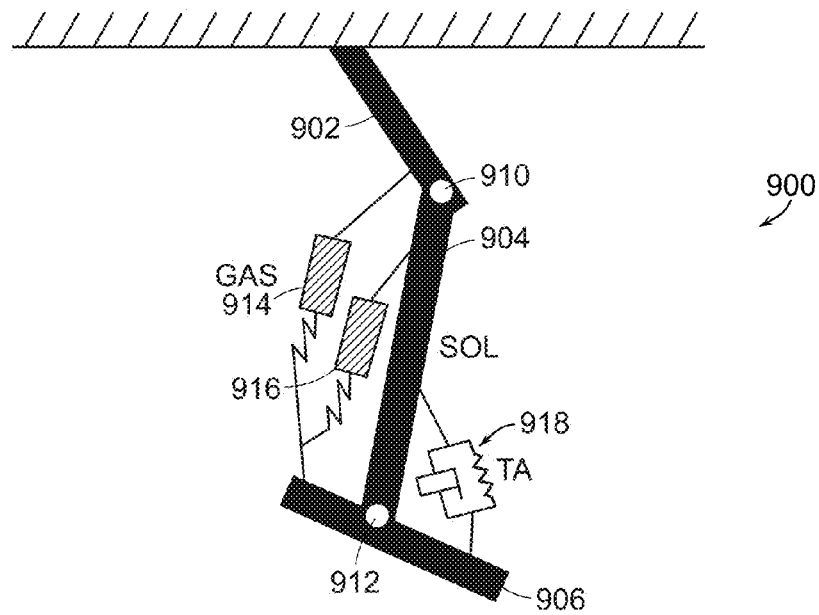
FIG. 9A illustrates an example musculoskeletal model applied in a prosthesis controller.

FIG. 9A illustrates an example musculoskeletal model 900 applied in a prosthesis controller. The model 900 includes a thigh 902 coupled to a shank 904 at knee joint 910 and a foot 906 coupled to the shank 904 at ankle joint 912. Two plantar flexors 914, 916 are modeled as muscle-tendon complexes while the dorsiflexor 918 is modeled as a unidirectional rotary spring-damper.

Figure 9B:
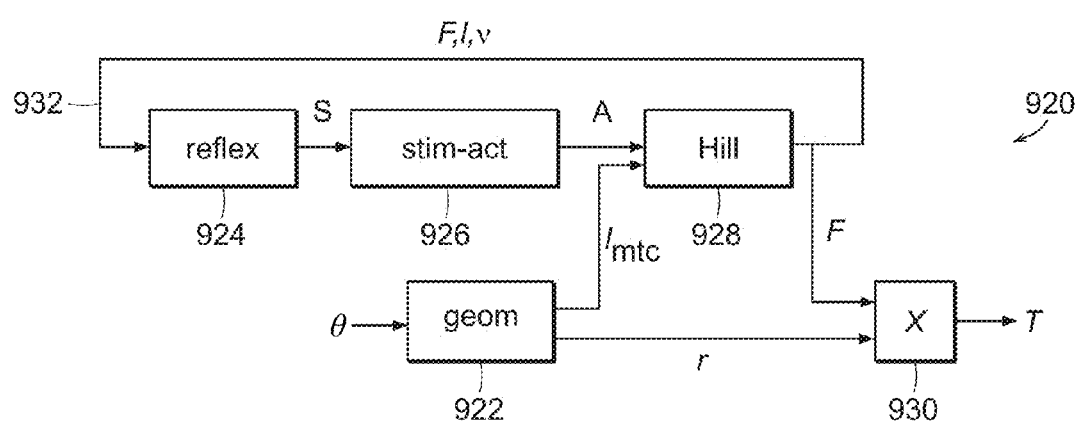
FIG. 9B is a block diagram illustrating an example reflex-based controller.

FIG. 9B is a block diagram illustrating an example reflex-based controller 920. The input includes joint angles θ (ankle and knee for gastrocnemius (GAS); just ankle for soleus (SOL)) and the output is the muscle contribution T to ankle torque. As shown, the controller includes blocks 922, 924, 926, 928 and 930. Block 922 ("geom") represents the geometrical mapping from angle to length of muscle-tending unit ($l_{mtc}$) and ankle moment arm r. Block 924 ("reflex") represents the reflex structure (equation (2.3)), block 926 ("stim-act") the stimulation-to-activation dynamics (equation (2.1)), and block 928 the Hill-type muscle model [9, 10]. Blocks 924, 926 and 928 are configured in a feedback loop 932. Feedback data includes muscle force (F), muscle length (l), and muscle velocity (v). Block 930 determines the output muscle torque contribution T as the product of muscle force F and muscle moment arm r.

The biological data forming the basis of the above modeling scheme were composed of kinematic, kinetic and EMG measurements. Data were collected with approval from the MIT Committee on the Use of Humans as Experimental Subjects at an instrumented motion analysis facility in the MIT Computer Science and Artificial Intelligence Lab. After obtaining informed consent, a healthy male participant was asked to walk barefoot at self-selected speed (1.25 m s$^{-1}$). Standard motion capture techniques (described in [13]) were employed to collect the kinematic and kinetic data. Surface EMG recordings were obtained from the soleus, medial gastrocnemius, lateral gastrocnemius and tibialis anterior muscles of one randomly chosen leg in the presence of a physician. A total of 25 walking trials within 5% of self-selected speed were collected. The walking trials were repeated on multiple days (with consistent calibrations) to test the robustness of modeling and estimation techniques to day-to-day differences.

Muscle activations were estimated from EMG data using a technique reported in [13]. Standard preprocessing techniques [14] were applied to the signal before applying a causal, recursive, and vectorized implementation of the Bayesian algorithm described in [15]. This algorithm models muscle activation as a slow diffusion process driven by calcium sourcing and sinking jump processes and produces an output x(t). This output does not take into account the difference in activation and deactivation rates, which is critical to the timing of activation buildup. Consequently x(t) was passed through the calcium-activation dynamics described in [16]:

$$\frac{d\alpha(t)}{dt} + \left[\frac{1}{\tau_{act}}(\gamma + (1-\gamma)x(t))\right]\alpha(t) = \frac{1}{\tau_{act}}x(t), \quad (2.1)$$

where $0<\gamma=(\tau_{act}/\tau_{deact})<1$. The activation time constant $\tau_{act}$ was set to be 9-10 ms with the deactivation time constant set to 45-50 ms [17].

All steady-state walking data and resulting estimates therefrom were split into gait cycles, time-normalized to percent gait cycle (% GC) coordinates, and ensemble averaged for modeling and analysis. Ankle joint angles and muscle contributions to ankle torques were obtained by processing the motion capture data in SIMM [18] (Software for Interactive Musculoskeletal Modeling, Musculo-Graphics Inc., Evanston, Ill.).

The muscle activations, joint angles and joint torques were used to estimate individual muscle force and state profiles in walking, using a muscle-tendon model and a method from [13] as described below.

The dynamics of the primary leg muscle-tendon units contributing to ankle function in normal walking were modeled. The anatomical correlates of the model (shown in FIGS. 9A-B) include the large muscle-tendon units actuating ankle rotation in the sagittal plane—namely the soleus and gastrocnemius (with medial and lateral heads represented as one effective muscle) plantar flexors with the Achilles tendon split amongst them—and the tibialis anterior dorsiflexor. All three muscle-tendon units 914, 916, 918 were modeled using (a) Hill-type muscle dynamics [9, 10] and (b) a common non-linear tendon model [19]. (The tibialis anterior was modelled in the same way as the plantar flexors here but replaced with a rotary spring-damper in the prosthesis controller described later.) Each muscle and tendon were dynamically connected in series at a fixed pennation angle with each other.

Morphological parameters (muscle maximum isometric force, tendon shape factor, reference strain and slack length) defining the model were chosen as those that most efficiently relate the muscle activations and biological joint angles with the biological joint torques [13]:

$$M(m,\alpha(t),\theta(t)) \rightarrow [C,\tau(t)], \quad (2.2)$$

where the model M is actuated with muscle activations $\alpha(t)$ and joint angles $\theta(t)$ from the biological gait data, and muscle-tendon parameters m are obtained as those as those that minimize metabolic consumption C, subject to the constraint of matching the output torque $\tau(t)$ to the biological ankle torque. C was computed using empirical measures of muscle metabolic power as a function of contractile element velocity [20, 21]. Bounds on the morphological parameters were chosen to ensure consistency with values reported in the literature [16, 17]. Because of errors starting up the model the cost C was counted starting at 4% of the gait cycle and ran until the end of stance (since the swing cost was small and relatively flat in the parameter space). The errors starting up the model came from two sources. First, since impact dynamics are highly variable and thus the input data shows increased variability immediately following heel strike, it is difficult to fit the model torque to the experimental average during this phase of gait. Secondly, the model has state (muscle fascicle length and velocity) and since there is no input data before heel strike (the model is only trained on stance) there is a brief interval required for the model to converge to the correct fascicle state. Note that the plantar flexors (914, 916 of FIG. 9A) that are the dominant torque sources in the ankle [22] are inactive during the omitted period. Using the values of m thus obtained and the inputs $\alpha(t)$ and $\theta(t)$, estimates of muscle force and state profiles were calculated by numerically solving the muscle-tendon model in MATLAB Simulink® [13].

As noted in [13], the resulting model provides empirically inaccessible estimates of individual muscle force. It also results in muscle-tendon morphologies that can be used to predict empirically realistic individual muscle states [13]. Since the morphological features link joint level leg dynamics with neural activations, it is a scheme well suited toward identifying the reflexes that facilitate the interplay of legged dynamics with neural control [13].

Reflexes respond to changes in muscle force and state (relayed by the spindle and golgi tendon sensors in muscles) to contribute to neural stimulation of the muscle and in turn muscle activation [7]. Therefore trends in the muscle force, state, and activation profiles may be used to identify feedback control pathways that contribute to observed state changes. If one ignores the effects of non-reflexive neural drive, a purely feedback-based control structure may derived. In reality feedback does not fully characterize the neural contributions to muscle activation in human gait; for instance central pattern generators (CPG) may also play a role [23, 24]. Nonetheless researchers have suggested that distal muscle-tendon units (such as those spanning the ankle) are likely to be primarily influenced by feedback pathways since they have greater proprioceptive feedback and are more influenced by contact forces [9, 25]. With this in mind we use the observed trends in the estimated muscle variables to motivate a feedback-based control model and evaluate its performance.

Figure 10:
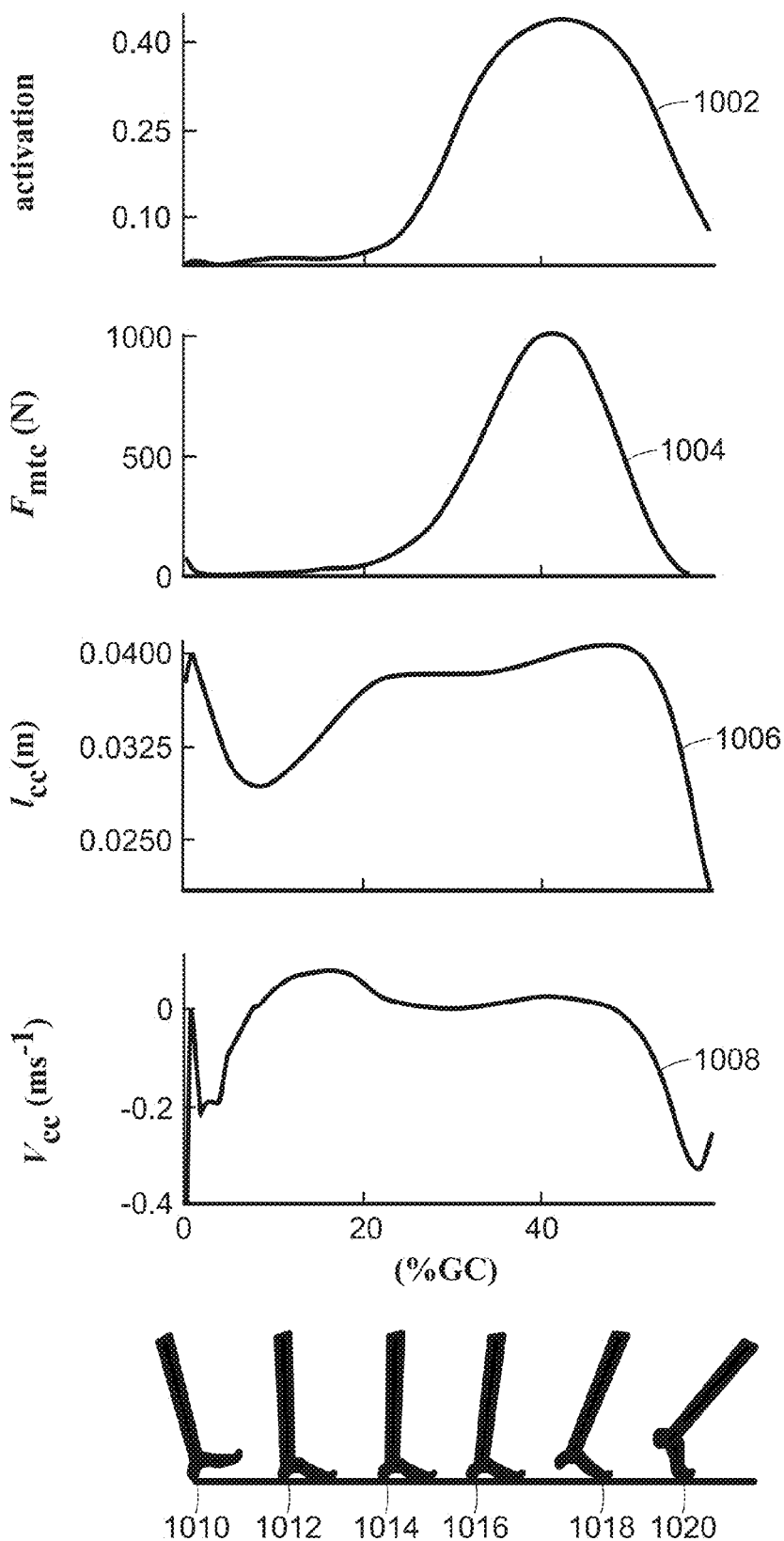
FIG. 10 depicts gastrocnemius activation, force, contractile element length and contractile element velocity estimated by the data-driven muscle-tendon model.

FIG. 10 shows vertically aligned plots of the estimated gastrocnemius muscle activation 1002, force 1004, length 1006, and velocity 1008 at a walking speed of 1.25 m s$^{-1}$. Only stance phase is shown, with 0% gait cycle (GC) representing heel strike (as is the case in subsequent FIGS. 12, 13, and 14A-D). Phases of the stance phase are illustrated at the bottom of FIG. 10, where 1010 is heel strike, 1012 is the initiation of Controlled Dorsiflexion, 1014 is mid Controlled Dorsiflexion, 1016 is the initiation of Powered Plantar Flexion, 1018 is mid Powered Plantar Flexion, and 1020 is toe off. It is apparent that there is an early stance period of muscle stretch and low activation, followed by a coincident rise in activation and near-isometric operation in mid-stance. This sequence of events points to a possible contribution from the stretch reflex amongst contributions from other reflex pathways.

The primary characteristic seen in late stance is that of muscle shortening and a coincident fall in activation. It is possible that the change from isometric operation to concentric operation (shortening) drives the fall in activation via length and velocity feedback pathways. Similar trends were observed in the soleus muscle. From here on we focus on only the soleus and gastrocnemius muscles as these provide the dominant contribution to ankle torque during stance phase in walking [22].

While the analysis above motivates our purely feedback-based control architecture, it does not quantify the mathematical form of the reflexes or the control parameters defining the feedback functions. Here we specify a simple linear feedback structure similar to that used by [9] for both plantar flexor muscles, wherein changes in muscle length, velocity and force are communicated to the spinal cord (with a delay) and are amplified by a gain to collectively generate neural stimulation to the muscle. The stimulation x(t) of an individual muscle is given by $$x(t) = G_F(F(t - \Delta t_F) - F_o)u(F - F_o) + \quad (2.3)$$
$$G_l(l(t - \Delta t_{lv}) - l_o)u(l - l_o) + G_v(v(t - \Delta t_{lv}) - v_o)u(|v| - v_o),$$

where $G_F$, $G_l$, and $G_v$ are the gains and $\Delta t_F$, $\Delta t_l$, and $\Delta t_v$ are the time delays for the force, muscle length, and muscle velocity terms respectively. The functions $u(F-F_o)$, $u(l-l_o)$, and $u(|v|-v_o)$ are unit step functions that ensure the feedback terms are only enabled when the threshold values of $F_o$, $l_o$, and $v_o$ (all positive) are exceeded. The time delays represent the path length from muscle to spinal cord and spinal cord back to the neuromuscular junction. Each delay was taken to be 20 ms [26-28]. The stimulation defined in equation (2.3) translates to muscle activation $\alpha(t)$ via the dynamics of cross-bridge formation as specified in equation (2.1).

The free parameters governing the relation between muscle force and states F (t), l(t), and v(t) and neural stimulation S(t) are the gains $G_F$, $G_l$, and $G_v$ and thresholds $F_o$, $l_o$, and $v_o$. Although a static inspection of trends in the muscle activation, force, and state profiles was used above to motivate the reflex architecture, the unknown parameters were identified with a fitting scheme that included the dynamical muscle-tendon model. This was done so as to account for effects of the Hill-type muscle dynamics and the tendon action in a self-consistent manner. The six parameters were chosen so as to minimize the mean squared error between the feedback-driven activation and the muscle activation estimated from EMG data. The fit was implemented using a genetic algorithm followed by gradient descent in an effort to avoid the numerous local minima that occurred in the mean squared error. The muscle-tendon parameters were taken to be fixed to their optimal values (determined via (2)) while fitting the reflex parameters, with each muscle being treated separately. The enforced bounds for each parameter were determined using the force, length, and velocity profiles given by the muscle-tendon model driven by biological data. Specifically, the reflex gains were allowed to range from zero to a gain that would dominate the net muscle activation, given these nominal force, length, and velocity profiles. The threshold on the length term was allowed to range from the minimum to maximum contractile element length in stance, while the velocity threshold was allowed to vary from zero to the maximum absolute value of velocity observed in stance. The boundaries on the force threshold were chosen to ensure that positive force feedback was engaged sufficiently early to make a large contribution, as expected from [9].

B. Application to Prosthesis Control

Figure 11:
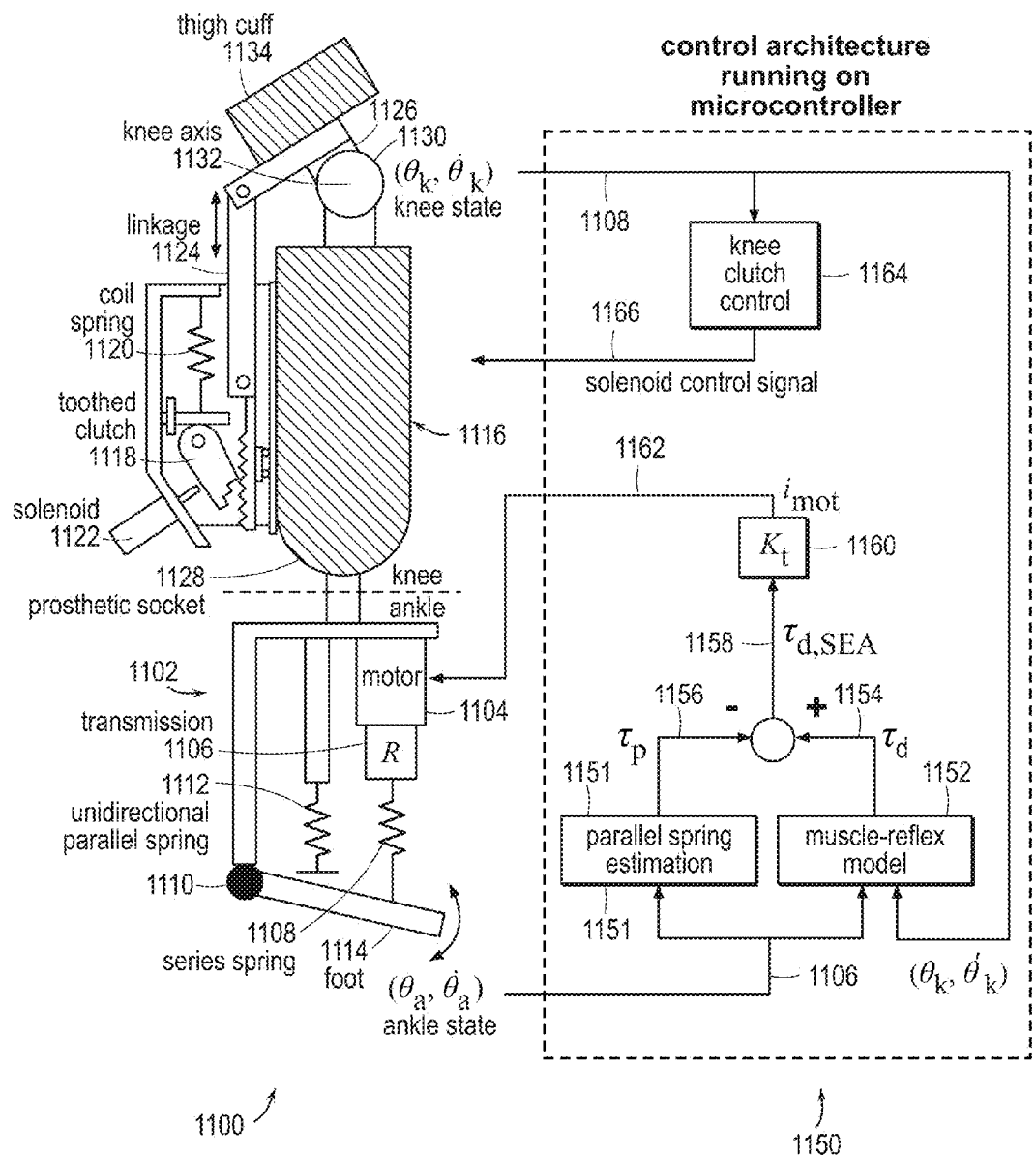
FIG. 11 shows an example schematic and control architecture of a prosthetic apparatus.

This neuromuscular model was then applied to produce an entirely feedback-based controller for a powered ankle-foot prosthesis. FIG. 11 shows a schematic diagram of an example prosthetic apparatus 1100 and control architecture 1150. The ankle controller 1150 took as input ankle angle, knee angle, and walking state (stance or swing phase) and produced plantar flexor torque based on the neuromuscular models of the soleus and gastrocnemius. The start of the gait cycle in the hardware controller was defined to be consistent with the biological data. Dorsiflexion torque was provided using a unidirectional rotary spring-damper to model the contribution of the tibialis anterior (TA) dorsiflexor. The dorsiflexor choice was made for simplicity and justified by the comparably small amount of torque produced by the dorsiflexors during stance [22], which could adequately be represented by a spring engaged in early stance [29]. Details are described below.

To evaluate the viability of the model for controlling a prosthesis across speed, the model was used to control the prosthetic apparatus 1100 comprising a powered ankle-foot prosthesis 1102 and an instrumented actuated knee brace 1104 worn by an amputee. The knee brace 1104 includes prosthetic socket 1128 and thigh cuff 1134 to fit the brace to the amputee. The ankle joint state 1106 and knee joint state 1108 of the apparatus were measured and used to provide realtime input to neuromuscular model 1152 (e.g., model 920 of FIG. 9B) simulated by an on-board microcontroller. The resulting torque command 1154 from the neuromuscular model was used to produce ankle torque 1158 while a knee controller 1160 adjusted the torque produced by the knee brace 1104. This configuration, as shown in FIG. 11, was set up to enable the prosthetic apparatus to behave as if it were a human lower-leg with reflex-controlled muscles acting at the ankle.

In FIG. 11, the rotary elements in the ankle-foot prosthesis 1102 are shown as linear equivalents in the model schematic for clarity. In the controller 1150, the parallel spring contribution to prosthesis ankle torque, $\tau_p$, (1156) was subtracted from the desired ankle torque command from the neuromuscular model, $\tau_d$, (1154) to obtain the desired SEA torque $\tau_{d,SEA}$ (1158). A motor current command $i_{mot}$ (1162) was obtained by multiplying by the motor torque-constant $K_t$ (1160) and produced using a custom motor controller (not shown). Knee clutch 1116 was engaged via solenoid 1122 depending on knee state (1108) as obtained from the knee potentiometer, which measured rotation around knee axis 1132.

C. Powered Ankle-Foot Prosthesis

As in [10], this study made use of a powered ankle-foot prosthesis (iWalk, LLC, Cambridge, Mass.) having a size and weight (1.8 kg) similar to the intact biological ankle-foot complex. The prosthesis 1102 included a brushless motor 1104, ballscrew transmission 1106, and Kevlar leaf-spring 1108 that together comprised a series-elastic actuator (SEA) [30]. The specifications of this drivetrain are listed in Table 1. The SEA was capable of producing torque about the revolute ankle joint 1110, analogous to the torque produced by the plantar flexor and dorsiflexor muscles about the human biological ankle joint. The robotic ankle's theoretical torque capability exceeded 300 Nm. A unidirectional parallel spring 112 engaged when the ankle was dorsiflexed and thereby assisted the SEA during walking [2]. A compliant carbon-fiber leaf-spring attached to the base of the prosthesis acted as a foot 114.

TABLE 1

Specifications for the ankle-foot prosthesis 1102. The ankle transmission ratio took its minimum value at maximum (178) dorsiflexion and maximum value at maximum (248) plantar flexion. The series spring stiffness is direction-dependent. The reported spring constants are nominal values. In practice, they vary with angle and applied torque as governed by the geometry of the linkage and series spring design. However, these variations were experimentally evaluated and subsequently calibrated out.

| parameter | units | value |
|---|---|---|
| series spring: plantar torque | Nm deg$^{-1}$ | 8.38 |
| series spring: dorsiflexilon torque | Nm deg$^{-1}$ | 27.23 |
| parallel spring | Nm deg$^{-1}$ | 14.66 |
| ankle transmission ratio | — | 175-205 |

D. Knee Clutch

As the gastrocnemius acts at both the ankle and knee, spring-clutch 1116 was mounted at the knee brace 1104 to provide the knee flexion action of the gastrocnemius. The mechanism included toothed clutch 1118 at the free end of coil spring 1120 (spring stiffness of 66,500 Nm$^{-1}$) which acted as a knee flexor on a polycentric knee brace 1126 via linkage 1124. The brace was integrated into a prosthetic socket 1128 connected to the ankle-foot prosthesis 1102. When the clutch 1116 was engaged via solenoid (1120) action, the free end of spring 1120 locked with respect to socket 1128 and the spring stretched as the knee straightened. The force developed by spring 1120 produced a flexion torque at the knee joint 1130. Conversely, when the clutch 1116 disengaged, no torque was applied at the knee joint 1130. The spring 1120 acted on knee joint 1130 with a moment arm that varied between 0.02 m and 0.03 m as a function of knee angle. This moment-arm function was designed so the apparent knee stiffness matched that of the biological knee during level-ground walking [31, 32].

E. Angle Measurements

The ankle angle and knee angle of the prosthetic apparatus provided the primary control inputs to the neuromuscular model 1152. To measure joint angle, an AM8192B sensor from Renishaw (Gloucestershire, UK) was used to measure the field angle of a magnet mounted at the joint. Since the foot 1114 had some inherent compliance, its deflection during walking contributed to the overall ankle angle. Therefore, the measured ankle torque and estimated forefoot spring constant of 22.72 Nm deg$^{-1}$ were used to estimate foot deflection from forefoot loading. This deflection was added to the joint angle measurement for input to the plantar flexors in the neuromuscular model 1152 and for data analysis. A potentiometer at the knee joint 1130 provided an estimate of knee joint angle.

Once measured, the ankle and knee angles were passed to lookup tables that estimated the muscle-tendon unit lengths and ankle moment arms of the modeled plantar flexors (see also FIG. 9B). These lookup tables were based off of the musculoskeletal geometry of the intact subject, as determined by SIMM. The output muscle-tendon unit lengths and moment arms were then used by the neuromuscular model 1152 to compute commanded torque.

F. Electronics

A Microchip Technology Incorporated PIC32MX575F512H, a single-chip, 32-bit, DSP oriented microcontroller running at 500 Hz was used to run the neuromuscular model 1152 in real-time using the angle and torque sensor data from the hardware as input. Sensor and internal states could be sent to a data-collection computer via an onboard IEEE 802.11g wireless radio.

G. Control

For control purposes, the gait cycle was divided into stance and swing phases. The phases of gait were determined using the state transitions described in [10]. These transitions were triggered using moment estimates from strain gauges embedded in the prosthetic pyramid on the powered ankle-foot prosthesis 1102. During stance phase, the neuromuscular model 1152 provided the primary torque command to the ankle. Since in biology the plantar flexor muscles dominate ankle torque during the stance phase of walking [22], neuromuscular models were used to represent them. However since the action of the tibialis anterior and other dorsiflexors resembles that of a linear spring early in the stance phase [29] when the torque contribution of the plantar flexors is small [22], the TA was modeled, for simplicity, as a unidirectional virtual rotary spring-damper of the form:

$$\tau_{TA} = \begin{cases} -(K_P\theta + K_V\dot{\theta}) & K_P\theta + K_V\dot{\theta} > 0 \\ 0 & K_P\theta + K_V\dot{\theta} \leq 0 \end{cases} \quad (2.4)$$

where $\tau_{TA}$ is the TA ankle torque contribution, $K_P$ is the spring constant, $K_V$ is the damping constant, $\theta$ is the ankle angle and $\dot{\theta}$ is the ankle angular velocity. $K_P$ was fit to best match the ankle torque-angle relation of the intact-limbed subject early in the stance phase (3.04 Nm deg$^{-1}$) and $K_V$ was experimentally set to 0.0524 Nm s deg$^{-1}$ to prevent prosthesis foot oscillations at foot-flat. To prevent the TA from fighting the plantar flexors during late stance, once the magnitude of $\tau_{TA}$ dropped to zero during a given stance phase, $\tau_{TA}$ was suppressed to zero for the remainder of stance (as in [10]). During the swing phase, the plantar flexors were turned off by reducing the reflex stimulations to their baseline values and the TA was made to be bidirectional to enable full-control of the ankle joint. The TA impedance was also increased during the swing phase (experimentally tuned to $K_P$=3.84 Nm/deg, $K_V$=0.122 Nm s deg$^{-1}$) for achieving early ground clearance. When well into the swing phase, the impedance of the TA was reset to the stance phase setting in preparation for heel strike. The knee clutch 1116 was engaged shortly after maximum knee flexion in stance phase, as the clutch passively locked once under load. Once the knee angle returned to the engagement angle later in stance phase, the clutch 1116 released automatically.

H. Torque Generation and Measurement

Physical torque at the ankle joint was generated by both the motorized drive train and the parallel spring 1112 (FIG. 11). The ankle angle sensor and known parallel spring stiffness were used to estimate (1151) the parallel spring torque contribution 1156 and the remaining desired torque 1158 was commanded to the motor 1104 (FIG. 11). The motor current 1162 was enforced using closed-loop current control with a custom motor controller comprising an H-bridge driven with Pulse Width Modulation.

The total ankle torque was computed by adding the SEA torque contribution to the parallel spring torque estimate. The SEA torque contribution was estimated using the series spring deflection and the calibrated stiffness of the series spring 1108. The deflection, in turn, was computed by comparing ankle angle to motor angle (measured with an optical shaft encoder). The knee torque was estimated using a linear potentiometer at the coil spring 1120 for spring force along with a moment arm function relating linear force to knee torque.

I. Clinical Experiments

Clinical experiments were approved by MIT's Committee on the Use of Humans as Experimental Subjects (COUHES). After giving informed consent, a healthy active bilateral transtibial amputee participant, height and weight matched to the intact-limbed subject, was fitted with the prosthetic apparatus. The participant donned the actuated prosthetic apparatus on his right leg and wore a conventional passive transtibial ankle-foot prosthesis on his left leg. Following initial walking trials for natural adjustment, the subject was asked to walk at three different speeds (0.75, 1.0, and 1.25 m s$^{-1}$) across a 5.3 m long path. For each walking trial, the participant began walking approximately 3 m from the beginning of the pathway and stopped walking approximately 3 m past the end of the path. The beginning and end of the 5.3 m path were labeled with markers on the ground. A stopwatch was used to verify the average walking speed for each trial by noting when the subject's center of mass passed over each of the markers. A total of 39 trials were captured.

J. Data Processing

Only steady state gait cycles within 10% of the 3 target speeds were used for analysis. All gait cycles were re-sampled to span 1000 points. The net work was calculated for each individual gait cycle by numerically integrating ankle torque over ankle angle from heel strike to toe-off. An ensemble average net work across gait cycles was then calculated for each trial.

3. Results

A. Modeling

The optimized muscle-tendon parameters and fit reflex parameters for the dominant ankle plantar flexors (soleus and gastrocnemius) are shown in Table 2. The reflex parameter fit was seen to converge within tolerance, with the objective function having a negligible slope/curvature ratio for each parameter at the minimum. The fit was conducted 10 times on each muscle starting with differing initial populations in the genetic algorithm with little effect on the final parameters.

Figure 12:
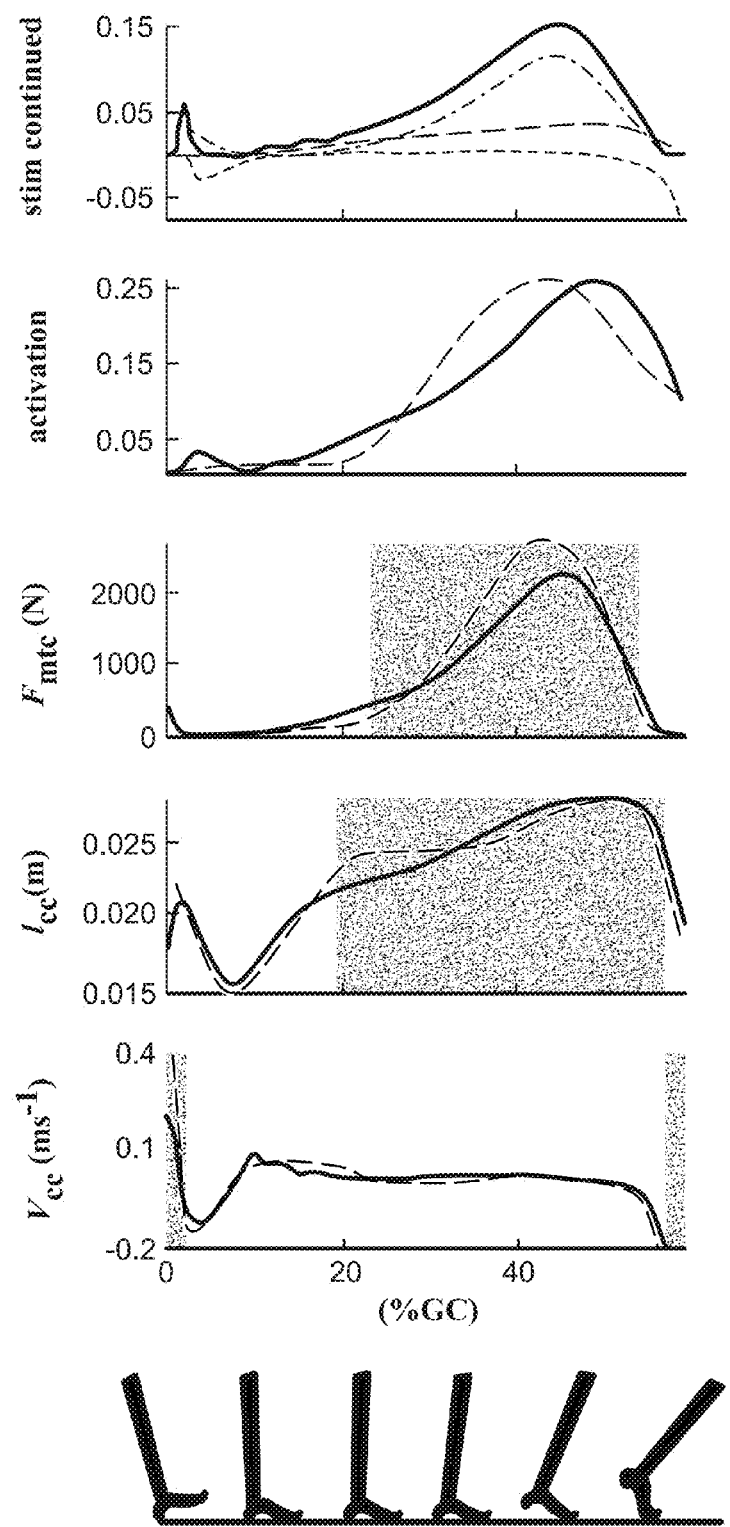
FIG. 12 depicts a comparison of the soleus muscle dynamics produced by EMG versus those produced by reflex feedback to the muscle-tendon model. The top plot shows the contributions from the force, length and velocity terms to the stimulation. Here, the stimulation is the solid line, the force term is the dashed-dot line (largest contributor), the length is the dashed line and the velocity term (which goes negative) is the dotted line. In the rest of the plots, the dashed curves are the model outputs given EMG-based activation, while the solid curves are the corresponding variables when the model activation is determined by the reflex structure in equation (2.3). The shaded regions indicate the times where the force, length and velocity feedback terms contribute at least 0.01 to the stimulation. All plots used biological angles for walking trials at 1.25 m s$^{-1}$.

FIG. 12 shows the fit to soleus activation and the resulting muscle dynamics. The r$^2$ values for the activation, force, length, and velocity fits were 0.83, 0.92, and 0.95, respectively. The r$^2$ values for these fits in the gastrocnemius were 0.90, 0.94, and 0.94 respectively. The figure also shows the contributions of the different reflexes to follow the sequence described above. It was found that the positive force feedback term dominated the fit but was reliant on the length feedback term to time and scale its buildup. These contributions were roughly maintained when the neuromuscular model was applied to biological ankle angles at different walking speeds, as evidenced by FIG. 13. Very similar profiles and relative reflex contributions were seen in both plantar flexors.

TABLE 2

Boundaries and fit values for plantar flexor muscle-tendon and reflex parameters. The muscle-tendon parameters were determined as described in Krishnaswamy et al. [13] and fixed during reflex parameter fitting. GAS, gastrocnemius; SOL, soleus.

| parameter | units | min. val | max. val. | fit val. |
|---|---|---|---|---|
| GAS $F_{max}$ | N | 1398 | 6990 | 1759 |
| GAS $l_{slack}$ | m | 0.282 | 0.460 | 0.399 |
| GAS $K_{sh}$ | — | 1 | 5 | 2.81 |
| GAS $\lambda_{ref}$ | — | 0.02 | 0.09 | 0.042 |
| GAS $G_F$ | N$^{-1}$ | 0 | 5e-4 | 1.45e-4 |
| GAS $F_o$ | N | 0 | 203 | 78.3 |
| GAS $G_l$ | m$^{-1}$ | 0 | 10 | 3.66 |
| GAS $l_o$ | m | 3.05e-2 | 4.25e-2 | 3.09e-2 |
| GAS $G_v$ | s m$^{-1}$ | 0 | 2 | 0.167 |
| GAS $v_o$ | m s$^{-1}$ | 0 | 0.278 | 2.23e-4 |
| SOL $F_{max}$ | N | 3650 | 18251 | 7142 |
| SOL $l_{slack}$ | m | 0.175 | 0.293 | 0.250 |
| SOL $K_{sh}$ | — | 1 | 5 | 2.25 |
| SOL $\lambda_{ref}$ | — | 0.02 | 0.09 | 0.083 |
| SOL $G_F$ | N$^{-1}$ | 0 | 1e-4 | 2.62e-5 |
| SOL $F_o$ | N | 0 | 543 | 10.5 |
| SOL $G_l$ | m$^{-1}$ | 0 | 10 | 2.44 |
| SOL $l_o$ | m | 0.015 | 2.87e-2 | 1.75e-2 |
| SOL $G_v$ | s m$^{-1}$ | 0 | 2 | 5.65e-2 |
| SOL $v_o$ | m s$^{-1}$ | 0 | 0.196 | 1.29e-3 |

B. Clinical Trials

The results of the clinical trials are summarized in FIGS. 14A-D, 15A-C, and 16.

FIGS. 14A-D shows the mean angle and torque profiles for the ankle-foot prosthesis and knee joint during the 1.25 m s$^{-1}$ clinical walking trials. The biological gastrocnemius component of knee torque was estimated for these figures by feeding joint kinematics and EMG from the intact-limbed subject into the model from [13]. The resulting gastrocnemius force was multiplied by the moment arm of this muscle as estimated with SIMM. There is a qualitative agreement in angle and torque profiles between the prosthesis apparatus and those of the intact-limbed subject. However, the ankle angle of the prosthetic apparatus deflected less than the intact biological ankle, resulting in smaller peak torque. The torque produced by the knee clutch was also seen to be smaller than the biological counterpart, implying that the spring in the knee clutch mechanism was too soft.

Figure 15A:
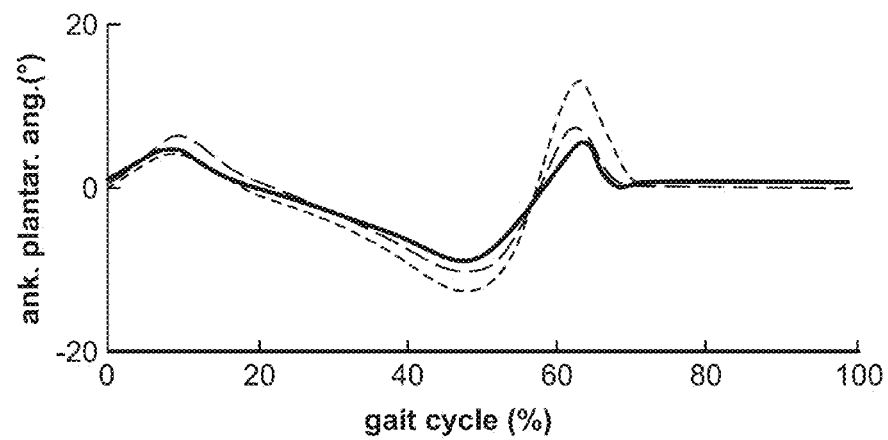
FIGS. 15A-C depict commanded ankle angles, torques and work loops for three speeds in clinical walking trials. Shown are data for three speeds: 0.75 m s$^{-1}$ (solid line), 1.0 m s$^{-1}$ (dashed line) and 1.25 m s$^{-1}$ (dotted line). In the torque versus angle plot, heel strike is indicated using a circle.
Figure 15B:
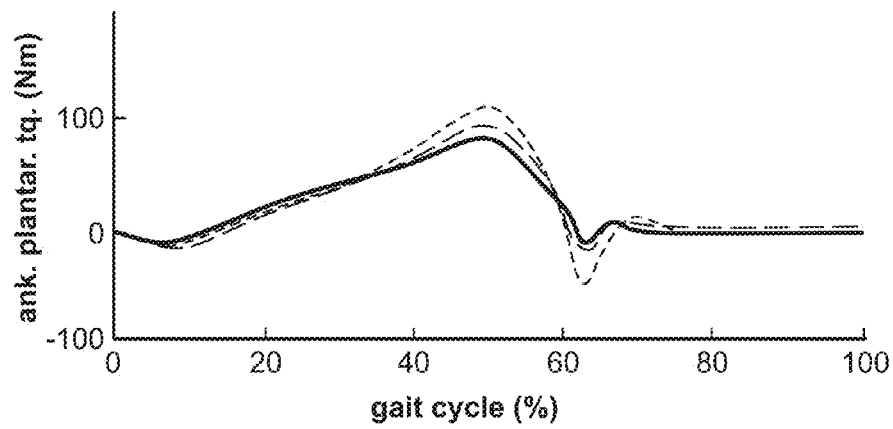
Figure 15C:
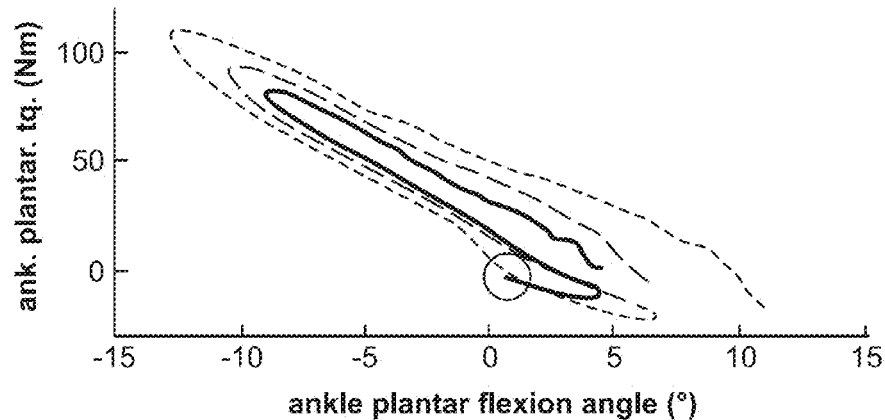
Figure 16:
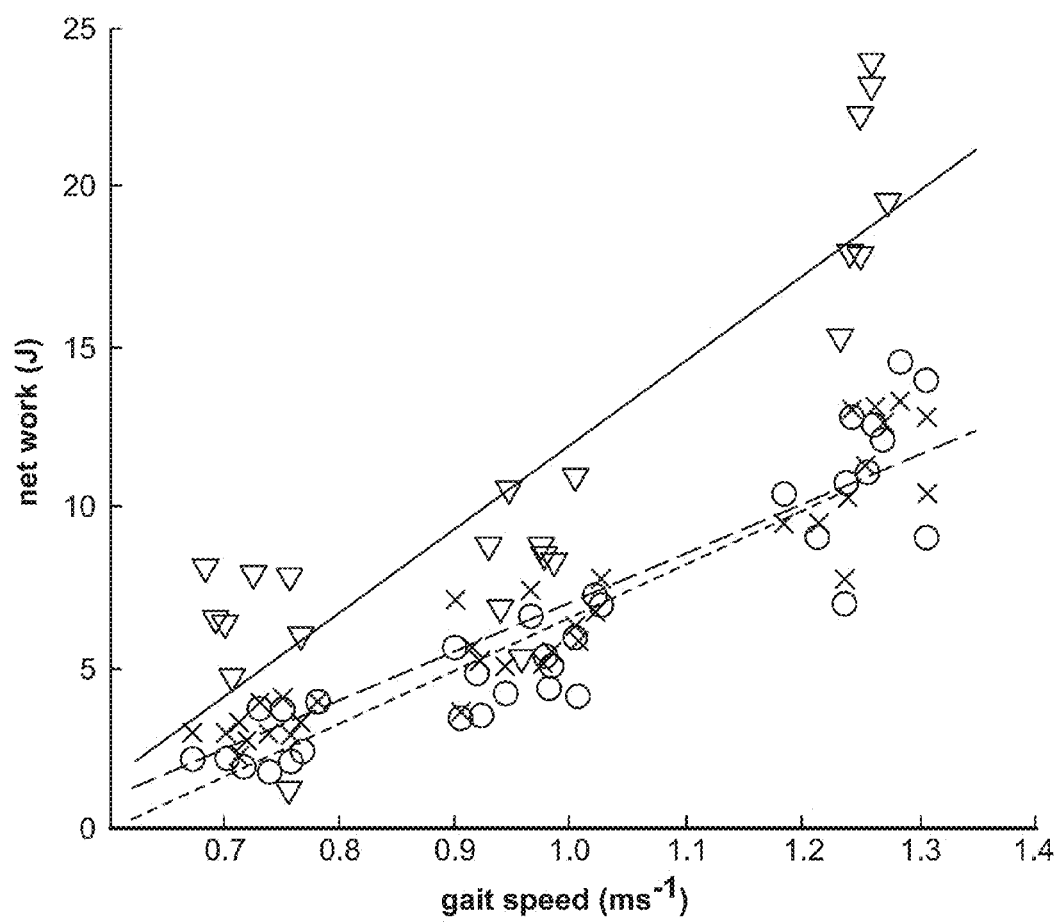
FIG. 16 depicts energy output of the ankle across gait speed. Shown are biological data, net work as commanded by the ankle-foot prosthesis during clinical trials and measured net work during the clinical trials. Inverted triangles, biological; crosses, commanded clinical trials; circles, measured clinical trials; continuous line, biological trend; dashed lines, command trend; dotted lines, measured trend.

The ankle-foot prosthesis angle and commanded torque for the three target walking speeds are plotted in FIGS. 15A-C. The magnitudes of both peak angular deflection and peak torque are seen to increase with walking speed, with both variables aligning in percent gait cycle across speed. FIG. 15C shows an increase in commanded positive ankle work across speed, a trend that is also observed in intact-limbed individuals [29]. As can be seen from FIG. 16, this trend is also reflected in the measured net ankle work.

4. Discussion

The reflex-based controller (e.g., controller 1150 of FIG. 11) developed in this study produced a trend of increasing net work with walking speed during clinical trials. Looking at the kinematics and dynamics of the prosthetic ankle joint (FIGS. 15A-C), this trend can be attributed to at least two effects. First, both the peak ankle angle and peak torque increase at faster walking speeds. The angle increase is produced by a combination of kinematic and dynamic changes associated with higher walking speeds, such as increased stride length and higher dynamic loading of the ankle joint. Although the angle and torque are interrelated through the dynamics of the amputee subject, an increase in angle tends to produce correspondingly higher torques. (This observation was verified in simulation by scaling the biological ankle angle trajectory in magnitude and observing an increased peak torque from the model.) The angle and torque remain aligned in the gait cycle across speed, so increasing both peak values results in a larger work loop and hence more positive net work. The second effect producing the trend in net work is the increased ankle plantar flexion in terminal stance at faster walking speeds.

When combined with a torque profile that increases with increasing speed, this further contributes to the trend in net work.

Although the subject is able to influence the ankle behavior by changing walking speed, tracking a desired angle trajectory at will is not possible. The subject is not an infinite impedance position source and is thus reliant on the controller to produce torques that, when interacting with the human dynamics, produce reasonable angles. The observed trend in net work therefore implies that the controller is able to effectively modulate ankle joint quasi-static impedance (slope of joint torque vs. state) across speed.

Figure 13:
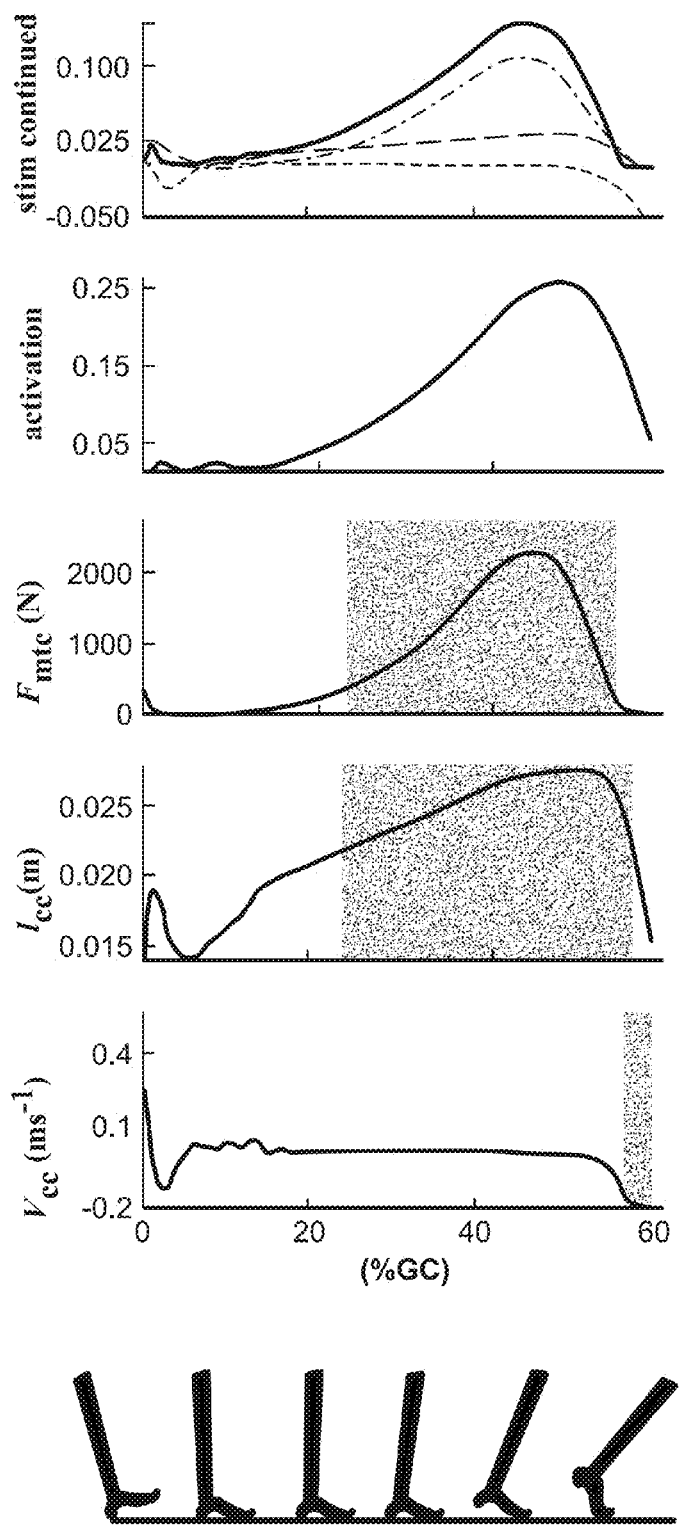
FIG. 13 depicts plot of soleus muscle dynamics produced by the reflex-based stimulation (equation (2.3)) for input ankle angles from walking trials at 0.75 m s$^{-1}$. The top plot shows the contributions to the stimulation (solid line) from the force (dashed-dot line), length (dashed line) and velocity terms (dotted line). The remaining plots (from top to bottom) show the total activation, muscle force, contractile element length and contractile element velocity. The shaded regions indicate the times where the force, length and velocity feedback terms contribute at least 0.01 to the stimulation.
Figure 14C:
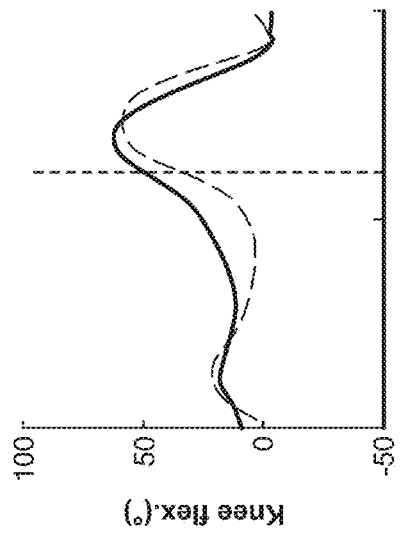
FIGS. 14A-D depict comparison of prosthesis ankle and knee angles and torques during the clinical trials (measured) with those from a height- and weight-matched subject with intact limbs (biological). Torque that plantar flexes the ankle is defined to be positive and moves the angle in the positive direction. Similarly, torque that flexes the knee is positive and increases the knee angle. The biological values are the thick solid lines (with shaded errors) in each plot while the dashed lines are the values measured on the prosthesis. In the ankle torque plot the commanded torque is shown as a thinner solid line, again with shaded error bars. The knee torque plot compares the torque provided by the clutch-spring mechanism to that provided by the natural gastrocnemius in simulation. The vertical line indicates toe off in each plot.
Figure 14D:
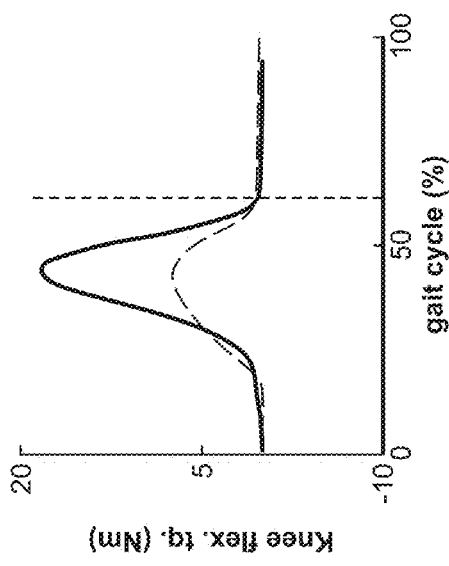
Figure 14A:
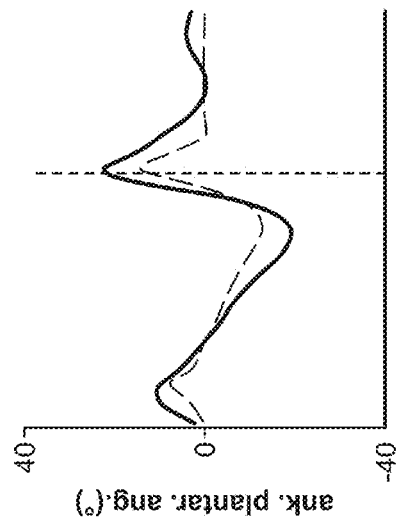
Figure 14B:
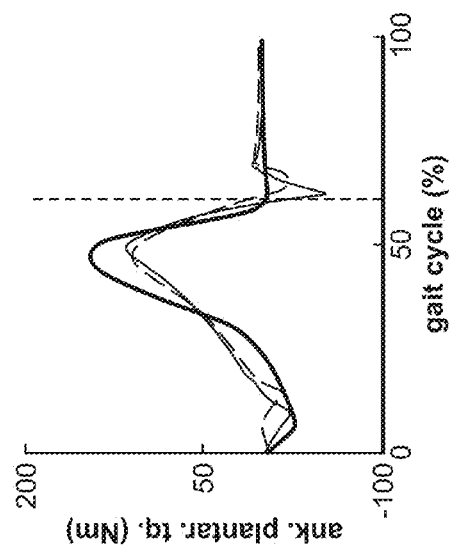

The behavior of the controller can be further understood through simulations that provide the neuromuscular model with biological ankle angles at different speeds. This is possible because the muscle states seen in the controller during clinical trials (with angle input from the prosthesis) are qualitatively similar to those obtained from simulations (with angle input from the intact-limbed subject). It was evident in both simulations and clinical tests that the stimulation profiles provided to the muscles vary little with speed when normalized to percent gait cycle (FIGS. 12 and 13). This similarity is a result of the consistent timing of the force, length and velocity reflex contributions throughout stance. The sequence is preserved across speed by the length feedback term, which governs the timing and magnitude of force buildup. The importance of timing is consistent with the findings of [8], who suggested that walking speed is governed by gains and maintains its timing as a result of afferent feedback.

One may compare the results of our study with those of previous works. The positive force feedback term that dominates force production in our model was based on the studies of [9] and [33]. The length term in equation (2.3) represents the stretch reflex, while the velocity term represents negative feedback controlling the rate of muscle contraction. If the muscle is lengthening too rapidly, the velocity term will increase the activation; if it is shortening too quickly, the velocity term will reduce activation. Several empirical studies [12, 34-38] have demonstrated the presence of afferent feedback in the plantar flexors during stance. These studies record the changes in muscle EMG signals when the gait of a subject is perturbed either by changing the inclination of the walking surface or by forcing muscle-tendon length changes using an orthosis. Notably, [12] isolated the contributions of force-based and length-based afferent feedback during different intervals of stance at self-selected walking speed. They found that force feedback was dominant in late stance but contributed little during midstance perturbations, where spindle-based feedback probably dominates. This sequence is similar to that seen in our plantar flexor reflexes, although our modelling was done without perturbations. One further study that would specifically address the role of reflexes in speed adaptation would be a direct comparison of plantar flexor EMG signals during walking at different speeds between a normal and a de-afferented subject. If reflexes are dominant in speed adaptation, as postulated in this study, one should see a sluggishness in the adaptation to different speeds of the de-afferented subject.

This study extends the work of [10] by considering the structural morphology of the ankle plantar flexors and including length and velocity feedback terms. Speed adaptation is enabled through these changes. It appears that inclusion of the stretch reflex in both plantar flexors was critical for timing and scaling force buildup, thereby enabling an increase in positive net work across speed.

Despite the speed adaptation exhibited by our approach, some limitations are evident. First, the chosen reflex structure does not necessarily reflect the true biological control scheme. The ability to reproduce this scheme would rely on knowledge of the non-reflexive neural drive provided to muscles as well as the true structure of the reflexive feedback. Despite the absence of this knowledge, our scheme provides functional results. A second limitation of our approach was the simple impedance approximation used for the ankle dorsiflexor model. This approximation reduced the quality of the ankle torque fit in early stance; the fit may be improved by including a dorsiflexor muscle model similar to those used for the plantar flexors.

Despite these limitations, this work may serve as a starting point for several natural extensions. Different reflex structures may be explored and the effect of non-reflexive neural drive examined. The interaction of the neuromuscular model with mechanical effects (human dynamics, ground contact forces, etc.) may be better understood by conducting a forward dynamic simulation similar to that in [9]. Our overall approach may be extended to include muscles further up the leg, possibly leading to speed adaptive control schemes for multiple prosthetic joints. Finally, the generality of the approach could be tested by studying the behavior of the reflex-based controller when applied to tasks other than level ground walking. In the design of adaptive prosthetic limbs, we believe the application of neuromechanical principles are of critical importance.

REFERENCES

1 Gates, D. 2004 Characterizing ankle function during stair ascent, descent, and level walking for ankle prosthesis and orthosis design. Masters Thesis, Boston University, Boston, Mass.
2 Au, S. K., Weber, J. & Herr, H. 2009 Powered ankle-foot prosthesis improves walking metabolic economy. IEEE Trans. Robot. 25, 51-66. (doi:10.1109/TRO.2008.2008747)
3 Hitt, J. K., Sugar, T. G., Holgate, M. & Bellman, R. 2010 An active foot-ankle prosthesis with biomechanical energy regeneration. J. Med. Devices 4, 011003. (doi:10. 1115/1.4001139)
4 Sup, F., Varol, H. A., Mitchell, J., Withrow, T. J. & Goldfarb, M. 2009 Self-contained powered knee and ankle prosthesis: initial evaluation on a transfemoral amputee. In IEEE Int. Conf. Rehabil. Robot., 23 Jun. 2009. pp. 638-644. IEEE. (doi:10.1109/ICORR.2009.5209625)
5 Au, S., Weber, J. & Herr, H. 2009 Powered ankle-foot prosthesis improves walking metabolic economy. IEEE Trans. Robot. 25, 51-66. (doi:10.1109/TRO.2008.2008747)
6 Holgate, M. A., Bohler, A. W. & Sugar, T. G. 2008 Control algorithms for ankle robots: a reflection on the state of the art and presentation of two novel algorithms. In Proc. of the 2nd Biennial IEEE/RAS-EMBS Int. Conf. on Biomed Robots and Biomechatronics, Scottsdale, Ariz., 19-22 Oct. 2008. pp. 97-102. IEEE. (doi:10.1109/BIOROB.2008.4762859)
7 Kandel, E. R., Schwartz, J. H. & Jessell, T. M. 2000 Principles of neural science, 4th ed. Columbus, Ohio: McGraw-Hill.
8 Winter, D. A. 1983 Biomechanical motor patterns in normal walking. J. Motor Behav. 15, 302-330.
9 Geyer, H. & Herr, H. M. 2010 A muscle-reflex model that encodes principles of legged mechanics produces human walking dynamics and muscle activities. IEEE Trans. Neural Syst. Rehabil. Eng. 18, 263-273. (doi:10. 1109/TNSRE.2010.2047592)

10 Eilenberg, M. F., Geyer, H. & Herr, H. 2010 Control of a powered ankle-foot prosthesis based on a neuromuscular model. IEEE Trans. Neural Syst. Rehabil. Eng. 18, 164-173. (doi:10.1109/TNSRE.2009.2039620)

11 Eilenberg, M. F. 2009 A neuromuscular-model based control strategy for powered ankle-foot prostheses. M.S. Thesis, Massachusetts Institute of Technology, Cambridge, Mass.

12 Klint, R., Nielsen, J. B., Sinkjaer, T. & Grey, M. 2009 Sudden drop in ground support produces force related unload response in human over-ground walking. J. Neurophysiol. 101, 1705-1712. (doi:10.1152/jn. 91175.2008)

13 Krishnaswamy, P., Brown, E. & Herr, H. M. 2011 Human leg model predicts ankle muscle-tendon morphology, state, roles and energetics in walking. PLOS Comput. Biol. 7, e1001107. (doi:10.1371/journal.pcbi.1001107)

14 Clancy, E. A., Morin, E. L. & Merletti, R. 2002 Sampling, noise-reduction and amplitude estimation issues in surface electromyography. J. Electromyogr. Kinesiol. 12, 1-16. (doi:10.1016/S1050-6411(01)00033-5)

15 Sanger, T. D. 2007 Bayesian filtering of myoelectric signals. J. Neurophysiol. 97, 1839-1845. (doi:10.1152/jn. 00936.2006)

16 Zajac, F. E. 1989 Muscle and tendon: properties, models, scaling, and application to biomechanics and motor control. Crit. Rev. Biomed. Eng. 17, 359-411.

17 Winters, J. M. & Woo, S. L. Y. (eds) 1990 Multiple muscle systems: biomechanics and movement organization. New York, N.Y.: Springer.

18 Delp, S. L. & Loan, J. P. 1995 A graphics-based software system to develop and analyze models of musculoskeletal structures. Comput. Biol. Med. 25, 21-34. (doi:10.1016/0010-4825(95)98882-E)

19 McMahon, T. A. 1984 Muscles, reflexes, and locomotion. Princeton, N.J.: Princeton University Press.

20 Hill, A. V. 1938 The heat of shortening and the dynamic constants of muscle. Proc. R. Soc. Lond. B 126, 136-195. (doi:10.1098/rspb.1938.0050)

21 Ma, S. P. & Zahalak, G. I. 1991 A distribution-moment model for energetics in skeletal muscle. J. Biomech. 24, 21-35. (doi:10.1016/0021-9290(91)90323-F)

22 Perry, J. 1992 Gait analysis. Thorofare, N.J.: SLACK Incorporated.

23 Brown, T. G. 1914 On the nature of the fundamental activity of the nervous centres; together with an analysis of the conditioning of rhythmic activity in progression, and a theory of the evolution of function in the nervous system. J. Physiol. 48, 18-46.

24 Orlovsky, G., Deliagina, T. & Grillner, S. 1999 Neuronal control of locomotion: from mollusc to man. New York, N.Y.: Oxford University Press.

25 Daley, M. A., Felix, G. & Biewener, A. A. 2007 Running stability is enhanced by a proximo-distal gradient in joint neuromechanical control. J. Exp. Biol. 210, 383-394. (doi: 10.1242/jeb.02668)

26 Geyer, H., Seyfarth, A. & Blickhan, R. 2003 Positive force feedback in bouncing gaits? Proc. R. Soc. Lond. B 270, 2173-2183. (doi:10.1098/rspb.2003.2454)

27 Stein, R. B. & Capaday, C. 1988 The modulation of human reflexes during functional motor tasks. Trends Neurosci. 11, 328-332. (doi:10.1016/0166-2236(88) 90097-5)

28 Knikou, M. & Rymer, W. Z. 2002 Effects of changes in hip joint angle on H-reflex excitability in humans. Exp. Brain Res. 143, 149-159. (doi:10.1007/s00221-0010978-4)

29 Palmer, M. L. 2002 Sagittal plane characterization of normal human ankle function across a range of walking gait speeds. M.S. Thesis, Massachusetts Institute of Technology, Cambridge, Mass.

30 Pratt, J., Krupp, B. & Morse, C. 2002 Series elastic actuators for high fidelity force control. Indust. Robot: An Int. J. 29, 234-241.

31 Endo, K., Swart, E. & Herr, H. 2009 An artificial gastrocnemius for a transtibial prosthesis. In Eng. Med. Biol. Soc. (EMBC) 2009. Annu Int. Conf. IEEE, Minneapolis Minn., 3-6 Sep. 2009. pp. 5034-5037. IEEE. (doi:10.1109/IEMBS.2009.5333697)

32 Endo, K., Paluska, D. & Herr, H.2006 A quasi-passive model of human leg function in level-ground walking. In 2006 IEEE/RSJ Int. Conf. Intelligent Robots and Systems, Beijing, China, 9-15 Oct. 2006. pp. 4935-4939. (doi:10.1109/IROS.2006.282454)

33 Prochazka, A., Gillard, D. & Bennett, D. J. 1997 Positive force feedback control of muscles. J. Neurophsiol. 77, 3226-3236.

34 Sinkjaer, T., Andersen, J. B., Ladouceur, M., Christensen, L. O. D. & Nielsen, J. B. 2000 Major role for sensory feedback in soleus EMG activity in the stance phase of walking in man J. Physiol. 523, 817-827. (doi:10.1111/j.14697793.2000.00817.x)

35 Grey, M. J., Ladouceur, M., Andersen, J. B., Nielsen, J. B. & Sinkjaer, T. 2001 Group II muscle afferents probably contribute to the medium latency soleus stretch reflex during walking in humans J. Physiol. 534, 925-933. (doi: 10.1111/j.1469-7793.2001.00925.x)

36 Grey, M. J., Nielsen, J. B., Mazzaro, N. & Sinkjaer, T. 2007 Positive force feedback in human walking. J. Physiol. 581, 99-105. (doi:10.1113/jphysiol.2007. 130088)

37 Klint, R., Nielsen, J. B., Cole, J., Sinkjaer, T. & Grey, M. J. 2008 Within-step modulation of leg muscle activity by afferent feedback in human walking. J. Physiol. 586, 4643-4648. (doi:10.1113/jphysiol.2008.155002)

38 Cronin, N., Ishikawa, M., Grey, M. J., Klint, R., Komi, P. V., Avela, J., Sinkjaer, T. & Voigt, M. 2009 Mechanical and neural stretch responses of the human soleus muscle at different walking speeds. J. Physiol. 587, 3375-3382. (doi: 10.1113/jphysiol. 2008.162610)

Example III

Extrinsic Neural Sensing for the Modulation of Reflexive Parameters

As mentioned earlier, it may be beneficial to incorporate neural input into model-based control schemes of artificial joints. While there are many ways to obtain such input, one particularly attractive method is the collection of surface EMG data from the residual limb muscles. In this section, we describe the use of EMG signals to directly modulate the parameters of a reflexive control scheme. In this example, the EMG signal is measured using surface EMG signals from electrodes sewn into a socket liner used by a transtibial amputee. These EMG signals were filtered and used to modify feedback gains, producing adaptive behavior with walking speed and stair ascent/descent. We expect that additional advances in neural sensing technology will allow even more meaningful data to be input to robotic prostheses, orthoses and exoskeletons, enabling further adaptive behavior.

EMG Control of Prosthetic Ankle Plantar Flexion

Similar to biological human ankle, today's commercially available powered ankle-foot prostheses can vary impedance and deliver net positive ankle work. These commercially available prostheses are intrinsically controlled. Users cannot intuitively change ankle controller's behavior to perform movements that are not part of the repetitive walking gait cycle. For example, when transition from level ground walking to descending stairs, user cannot intuitively initiate or control the amount of ankle angle deflexion for a more normative stair descent gait pattern.

This example presents a hybrid controller that adds myoelectric control functionality to an existing intrinsic controller. The system employs input from both mechanical sensors on the ankle as well as myoelectric signals from gastrocnemius muscle of the user. This control scheme lets the user modulate the gain of commanded ankle torque upon push off during level ground walking and stair ascent. It also allows the user to interrupt level ground walking control cycle and initiate ankle plantar flexion during stair descent.

Ankle characteristics such as ankle angle and torque were measured and compared to biological ankle characteristics. Results show that the disclosed hybrid controller can maintain the existing (intrinsic) controller's biomimetic characteristics. In addition, the hybrid controller can also recognize, to a qualitative extent, the intended command torque for ankle push off and a user's desire to switch between control modalities for different terrains. This example demonstrates that it is possible and desirable to use neural signals as control signals for prosthetic leg controllers.

Methods 3.1 Control Statemachine

The myoelectric controller can work in concert with the intrinsic controller to control the powered ankle. The intrinsic controller used in this example is similar to the controller of Au et al., 2009 [2]. A suitable intrinsic controller was provided by iWalk, Inc. (Bedford, Mass.). The intrinsic controller controls ankle behavior for all times unless it is interrupted by the myoelectric controller. The purpose for the myoelectric controller, as set for this investigation, is the following:

1) for level ground walking and stair ascent, it modulates the gain parameter of a positive torque feedback reflex commanded during the stance phase to power plantar flex the ankle;

2) for stair descent, it initiates or triggers a plantar flexion movement of the ankle during terminal swing phase to optimally position the ankle and foot for the next foot strike.

Since the myoelectric controller is used to interrupt the intrinsic controller and take over control of the ankle controller when it is appropriate, the myoelectric controller includes a statemachine that is configured to monitor and shadow the six important states of the intrinsic controller.

Figure 17:
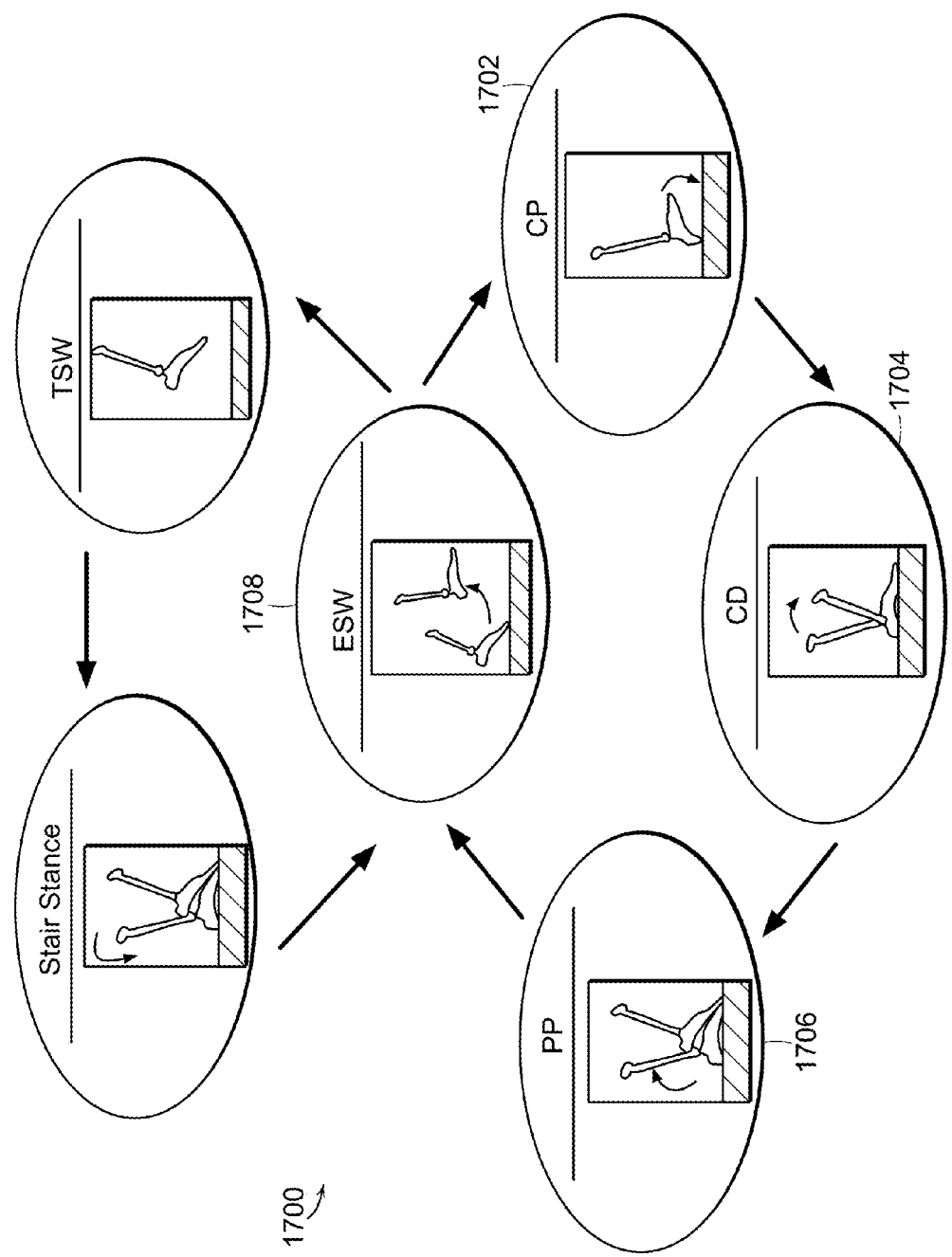
FIG. 17 depicts an example statemachine that can be used with a myoelectric controller.

FIG. 17 illustrates a statemachine 1700 that can be used on the myoelectric controller. Note that the intrinsic controller can have more than six states, but, in this example, only the six states depicted in FIG. 17 were monitored. For level ground walking, the bottom four states (CP, CD, PP, and (E)SW) are used. The diagram shown in FIG. 17 of statemachine 1700 can be understood as starting with controlled plantar flexion (CP) 1702, which is defined as the state from heel strike until foot flat is achieved. The myoelectric controller is idle during CP. Upon arriving at controlled dorsiflexion 1704 (CD), the myoelectric controller starts to measure EMG (myoelectric signal) from a residual limb muscle (e.g., Lateral Gastrocnemius) of a transtibial amputee. Processed EMG is then linearly mapped to the gain parameter on the intrinsic controller. This gain parameter scales the sensitivity of a positive force feedback reflex loop which then determines the amount of torque to command from the powered ankle motor. The intrinsic controller uses a feedforward control scheme to control the ankle torque. The torque command determined from the reflex loop is proportional to measured ankle torque cubed. This positive torque feedback control scheme simulates the afferent reflex in the sense that as more torque is sensed, more torque will be commanded. Thus the commanded torque is calculated as follows:

$$T_{command} = \text{gain}(EMG) \times T^3_{measured} \quad (1)$$

After Powered Plantar Flexion (PP) 1706, the ankle enters swing state (E)SW 1708, which includes both Early Swing (ESW) and Terminal Swing (TSW) for level ground walking loop, shown as the bottom four states of the statemachine in FIG. 17. The cycle repeats as ankle enters CP 1702.

Stair ascent uses the same four states as level ground walking. In level ground walking, a myoelectric signal is measured and used to modulate the gain of the positive torque feedback reflex on the ankle (Equation 1). As the ankle plantar flexes during stance, the myoelectric controller enters PP and provides a positive torque feedback where the gain is modulated as described for the level ground example. The myoelectric controller remains idle during swing state same as for level ground walking.

Stair descent uses a different loop than that shown in FIG. 17. This is because for stair descent, it is more important for the user to have control over ankle angle during terminal swing than to modulate the amount of power during stance push off. Starting at (E)SW, the myoelectric controller starts to measure myoelectric signal from the gastrocnemius muscle as used for level ground walking. A threshold detection algorithm is used to identify user intended motion for the next step. That is, if measured EMG is greater than a set threshold, then the myoelectric controller enters the loop for stair descent and takes over control from the intrinsic controller. Otherwise, the myoelectric controller assumes it is level ground or stair ascent, i.e. the bottom loop, and the intrinsic controller remains in main control over the ankle.

During TSW of stair descent loop, the ankle plantar flexes at a fixed rate. The initiation of the constant-rate plantar flexion is triggered by the EMG signal. The amount of time the ankle is in the air determines the amount of plantar flexion angle before toe strike. Upon toe strike of the ankle, the myoelectric controller shorts the leads of the ankle motor, causing it to behave as a nonlinear damper during stair descent stance phase. The cycle repeats as the ankle pushes off and enters (E)SW.

3.2 Myoelectric Signal Processing

This section summarizes EMG signal characteristics and describes the signal processing method used.

3.2.1 Signal Characteristics

An EMG signal contains valuable information about muscle activation. With proper processing, EMG signal can be used to robustly indicate if the muscle is activated or resting, and to some extent the level of muscle activation based on the normalized amplitude. The reason EMG signal cannot be used in real time to indicate level of muscle activation robustly is because like many other physiological signals, EMG is known to be non-stationary and prone to interference.

Clancy et al. had summarized potential sources of EMG signal interference [4], which are listed below:

1) Skin conductance and tissue characteristics are subject to change daily. This is mostly due to physiological changes and body temperature variations.

2) Cross talk between neighboring muscles' EMG superposes on EMG generated by muscle of interest, but this is more of an issue for clinical studies.

3) Changes in relative position between muscle belly and electrode site on the skin surface. This is likely to occur due to movement or external pressure, which likely results in baseline shift or spikes of very short duration and large amplitude in the measured signal.

4) Power hum and other electrical signals in the environment can interfere with EMG measurement due to improper grounding.

5) Noisy signals from electronics that are used to measure EMG. Electronic devices have internal noise. In addition, improper board design can result in poor signal readings. Hence, the quality of electrodes, pre-amplifiers and the rest of EMG measurement unit can affect the quality of the EMG signal.

3.2.2 EMG Signal Processing

In this example, a standard method to process the EMG signal was used. The EMG signal was high-pass filtered, clipped, rectified, and then smoothed by calculating its moving average with a 200 ms time window.

The above method was selected for the following reasons. For the given EMG measurement system, motion artifacts as well as the electronics used were causing baseline drift in the measured signal. Motion artifact is known to concentrate most of its signal power in frequencies lower than 10 Hz. Electronics caused DC offset concentrates most of its signal power around 0 Hz. The EMG signal can be high-pass filtered by a $2^{nd}$ order Butterworth digital filter to reduce or remove DC drift and motion artifacts. The cutoff frequency is set at 15 Hz due to slow roll off of the second order filter.

Motion artifact generated signals are also observed to be of large amplitude, typically 2 or 3 times greater than the amplitude of the signal generated due to maximum muscle contraction. Thus after high pass filtering, the signal is clipped to zero if it is 3 times greater than the MVC signal.

Following clipping, EMG signal is rectified by taking the absolute value of the input signal. Another common method of rectifying the signal is to square the input. Hogan et al. had investigated the differences between the two methods and decided that the difference is trivial [10]. Here, the absolute value approach is used because it is easy to implement and faster to calculate.

Figure 18:
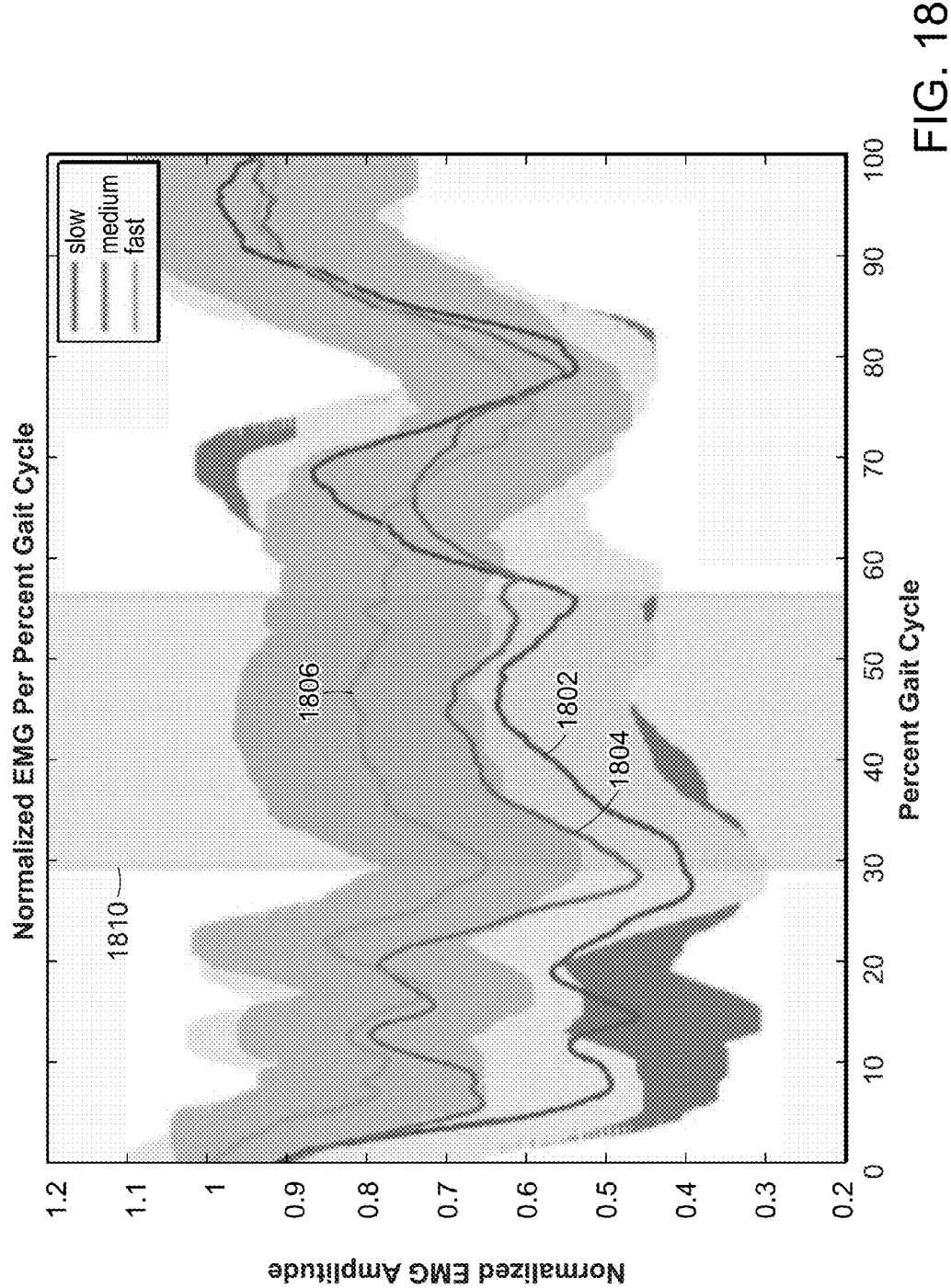
FIG. 18 depicts an EMG profile (normalized EMG amplitude as a function of percent gait cycle) measured from an amputee's gastrocnemius muscle across three walking speeds.

After calculating the moving average, the maximum within the specified time window of controlled dorsiflexion phase of the gait cycle is selected. The maximum is then compared to a set threshold to further eliminate background electrical noise. If it is above the threshold, then the signal is used to scale the gain of command torque, otherwise the gain is set to a small number such that little torque is generated at toe off. This control scheme is similar to what Ferris et al. implemented in the orthosis [5]. Processed EMG signal across three speeds is shown in FIG. 18.

Even though an EMG signal is non-stationary across a gait cycle, a qualitative trend is observed across three speeds within the time window of interest. The extrinsic EMG signal can be used to proportionally modulate the gain parameter of the positive torque feedback reflex of Equation 1. The mapping between EMG signal amplitude and the gain parameter is linear with walking speed, where slow walking speeds have a low sensitivity and relatively faster speeds a higher sensitivity of the positive torque feedback. The ensemble average of EMG profiles across speeds (slow 1802, medium 1804, fast 1806) is plotted in FIG. 18. The plot shows normalized EMG amplitude as a function of percent gait cycle. One standard deviation of the EMG amplitude is indicated by the shaded area, where the mean is the solid line. Rectangular region 1810 is the percent-cycle region of interest for positive torque feedback control where reflex loop gain is modulated by an extrinsic sensor, namely gastrocnemius EMG signal.

3.3 Hardware Setup 3.3.1 Ankle

Figure 19:
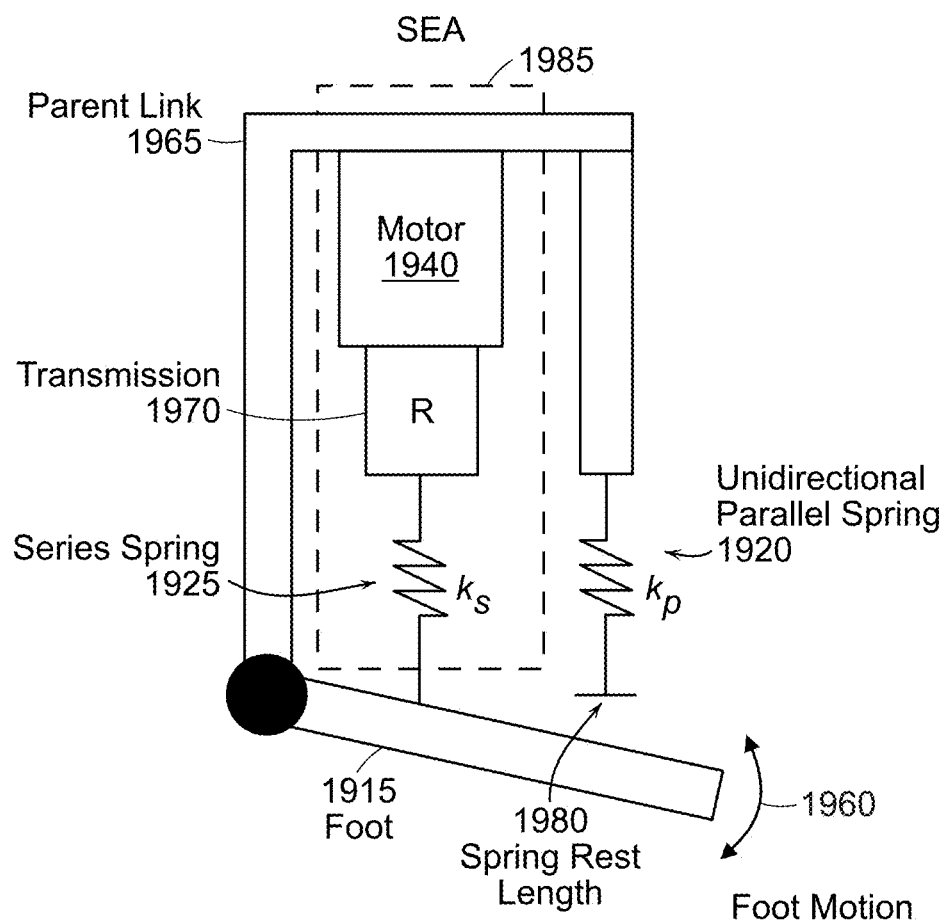
FIG. 19 depicts a mechanical model for an exemplary embodiment of an ankle-foot prosthesis, according to one aspect of the present invention.

FIG. 19 depicts a mechanical model for an exemplary embodiment of an ankle-foot prosthesis used in a preferred embodiment. This prosthesis is a successor to the series of prototypes developed in the Biomechatronics Group of the MIT Media Laboratory, which are described in U.S. patent application Ser. No. 12/157,727, filed Jun. 12, 2008, the entire disclosure of which is incorporated by reference herein in its entirety. The prosthesis is a completely self-contained device having the weight (1.8 kg) and size of the intact biological ankle-foot complex. Depicted in the mechanical model of FIG. 19 are parent link 1965, motor 1940, transmission 1970, series spring 1925, unidirectional parallel spring 1920, foot 1915, foot motion indicator 1960, spring rest length 1980, and series-elastic actuator (SEA) 1985. The rotary elements in the physical system are shown as linear equivalents in the model schematic for clarity. The drive train (e.g., motor and transmission) and the series spring together comprise a series-elastic actuator (SEA) [G. A. Pratt and M. M. Williamson, "Series elastic actuators," Proceedings on IEEE/RSJ International Conference on Intelligent Robots and Systems, Pittsburgh, pp. 399-406, 1995].

This example approach used the powered ankle-foot prosthesis described above, which was designed at Biomechatronics Group, Media Lab, MIT and is now commercialized by iWalk, Inc (Bedford, Mass.). The basic architecture of the electromechanical design is depicted in FIG. 19. The prosthesis includes a unidirectional spring in parallel with an actuator with a series spring similar to the design described by Au et al. [3]. The prosthesis can generate positive net work at the prosthetic ankle joint during the stance phase of walking. Ankle stiffness and power delivery is set by the built-in microcontroller inside the bionic ankle. The magnitude and timing of power delivery is measured directly from sensors within the prosthesis and then adjusted to match the performance of a biological ankle.

The sensors include motor shaft and ankle joint output encoders, and a six degree of freedom inertial measurement unit comprised of three accelerometers and three rate gyroscopes. Similar to biological muscle reflex responses that utilize afferent feedback to modulate muscle force, the bionic prosthesis uses positive force feedback; an increase in the sensed prosthetic ankle joint torque triggers an increase in the torque generated by the actuator, resulting in an increase in net positive ankle work production as walking velocity increases.

3.3.2 EMG Module

An EMG measurement module was designed and implemented to work with the commercialized powered ankle described in reference to FIG. 19. At the input stage, the module uses a commercially available pre-amplifier designed by Motion Lab Systems, Inc. (Baton Rouge, La.) with a gain of 20 to pick up EMG. Due to lack of physical space between the residual limb and the socket, the pre-amplifier cannot be directly connected to the gastrocnemius muscle. Instead, fabric electrodes were used. This method was developed at Northwestern University. Fabric electrodes in the liner are used to pick up myoelectric signals and the signals redirected to the upper thigh where there is room for the pre-amplifier to be attached.

Output of pre-amplifier is connected to another amplifier with fixed gain of 10. The amplified signal is low pass filtered by a $2^{nd}$ order low pass filter with cut off at 800 Hz to avoid aliasing. The signal is then passed to a 32 bit ADC and processed digitally by a microcontroller. The EMG signal was sampled at 1.5 kHz and then downsampled to 500 Hz.

The EMG measurement module is mounted externally onto the ankle. Data is transmitted from an onboard IEEE 802.11g wireless radio to a nearby computer via local WIFI network.

3.4 Data Collection Procedures

Experiments were conducted to evaluate the performance of the myoelectric-driven, finite state controller in comparison to existing intrinsic controller and data measured from biological ankles. For an initial pilot investigation, the device was tested on a healthy male, bilateral transtibial amputee. The subject wore the powered prosthesis on his right leg and a conventional passive prosthesis on his left leg. Initial walking experiments were conducted in the Biomechatronics Group within the MIT Media Lab. The experiments were approved by MITs Committee on the Use of Humans as Experimental Subjects (COUHES). The participant volunteered for the study and was permitted to withdraw from the study at any time and for any reason. Before taking part in the study, the participant read and signed a statement acknowledging informed consent.

Mechanical factors including ankle angle, torque and myoelectric signal were measured for all trials. Three gait patterns were observed: level ground walking, stair ascent and stair descent walking. A detailed description of the experimental procedures is provided below.

3.4.1 Preparation

Preparation involves two main steps: 1) helping a subject don the system and 2) calibrating the system by measuring MVC signal and threshold determination.

Don the System

As described in the hardware section, the system has two main parts: the ankle prosthesis and an EMG measurement unit. Proper caution need to be taken when putting on the EMG measurement unit to ensure good signal quality. This includes proper skin preparation and careful positioning of the electrodes. Skin preparation for EMG measurement includes hair removal and proper cleaning at the measurement site to ensure maximal contact between the electrodes and skin. For better quality, one can clean the skin with special abrasive and conductive cleaning paste or sand paper to remove dead skin cells, dirt and sweat. Since a novel fabric electrode approach is used here, simple alcohol cleaning is sufficient for its purpose.

As noted in the signal processing section, a myoelectric signal is typically non-stationary and prone to motion artifact interference. Signal quality and level is especially sensitive to changes in measurement site position and also varies from day to day because human skin conductance is also non-stationary. Care was taken to ensure that the subject, when putting on the liner, positions the electrodes directly over the muscle belly and that the electrodes maintain stable, position fixed contact with the skin. A reference electrode can be placed at an electrically unaffected but nearby area, such as joints or bony areas. In this case, the subject was instructed to place the reference electrode over the knee cap MVC Measurement Maximum voluntary contraction (MVC) is measured in order to normalize EMG. It should be performed against static resistance. Clinical studies require measurement of true maximum innervation, because this value is less subject to change from day to day. However, for the purpose of this example, such accuracy was deemed not necessary. An acceptable MVC can be defined as maximum effort of muscle contraction exerted by the subject.

According to a conventional method of measuring MVC from gastrocnemius muscle type measurement is performed when the subject is sitting with legs parallel to the floor. The subject is asked to plantar flex at 90 degrees ankle position. However, difference of signal strength between sitting and standing is observed when the conventional method was at first used. Stronger signal can observed when the subject is standing. This is likely result of better electrode-skin contact due to weight-bearing. Thus for this example, MVC of gastrocnemius is measured when the subject is standing and the subject is asked to imagine to plantar flex the gastrocnemius muscle as hard as he can. The subject is instructed to maintain MVC contraction for 5 seconds. The average EMG of the whole 5 seconds is used.

Threshold Detection

The control scheme uses two threshold values. For proportional torque control, a threshold value is used to distinguish EMG signal measured due to contraction and the baseline noise due to motion artifact. The intrinsic controller is used during the threshold determination process. The subject is first instructed to walk without flexing the muscle for 10 gait cycles. Then, the subject is instructed to walk while flexing the muscle during dorsiflexion for 10 gait cycles. A threshold value is determined based on collected EMG profile. The first threshold value is the lowest EMG amplitude that best separates the two scenarios.

The second threshold value is used to switch between level ground and stair descent modes. A similar method is used. The stair descent mode is used for the threshold detection process. The subject is asked to walk down the stairs without flexing the muscle during swing for 10 stair steps. Then, the subject is instructed to walk down the stairs and flex the muscle during swing for 10 stair steps. A threshold value is determined to be the smallest EMG amplitude that best separates the two scenarios.

3.4.2 Data Collection

Level Ground Walking

For level ground walking, the subject was instructed to walk at three different speeds using one of the two controllers. Measurements were taken on two separate days. First the hybrid controller was used. The subject was instructed to consciously flex his residual limb muscle during controlled dorsiflexion phase of the gait cycle to modulate the amount of torque obtained at push off. On a different day, the same experiments were performed using the intrinsic controller. The subject was not instructed to flex residual limb muscle during controlled dorsiflexion. For both conditions, the subject was instructed to walk at the following speeds: 1.0 m/s, 1.25 m/s and 1.5 m/s. Only data with walking speed within 5% of error is accepted. For each speed, 7 walking trials with a total of 35 gait cycles were collected.

Stair Ascent

For stair ascent, two conditions were tested to show that threshold detection method works. The subject was asked to walk up the stairs without consciously flexing the muscle. Then the subject was asked to walk up the stairs and consciously flexes the muscle during dorsiflexion to obtain desired torque. No speed variation or amplitude variation was tested at this point. The purpose of the testing is just to show that threshold detection method works to distinguish motion artifact noise and actual torque control command signal. Due to time constraint, only 10 gait cycles of each condition were collected.

Stair Descent

For stair descent, similar two conditions were tested to show that threshold detection method works to switch between level ground walking and stair descent mode. The subject was asked to walk down the stairs without consciously flexing the muscle. Then the subject was asked to walk down the stairs and consciously flexing the muscle during swing to switch to stair descent mode. Due to time constraint, only 6 gait cycles of stair descent with no muscle firing and 10 gait cycles with muscle firing were collected.

3.5 Data Processing

Ankle angle, torque and statemachine states were recorded on the powered ankle. Parameters (e.g., torque and ankle) were sampled at 500 Hz. All the data were parsed into gait cycles starting at heel strike. Heel strike is first roughly estimated using the built-in statemachine. All data within the gait cycle were interpolated and downsampled to 1000 data points per gait cycle. The plotted ankle torque showed negative ankle torque during terminal swing, which should not be the case if the gait is parsed properly. The ankle is programmed to be passive throughout the swing phase. This suggests that the statemachine threshold set for detecting heel strike may not be accurate. Negative ankle torque is normally observed upon heel strike, thus it is believed that part of the next step's heel strike is mistakenly included in the previous step's terminal swing. Since walking pattern is repetitive, adjustment is made to circularly shift ankle and ankle torque of the same gait cycle by the same amount. The amount of shift is decided as the number of data points from the time ankle torque changes from zero to negative to the end of the gait cycle.

Thus, per each gait cycle measured, the above method is used to ensure the gait cycle is aligned properly in terms of having the ankle torque being non-negative during swing and turn negative at heel strike. Per each parsed gait cycle, ankle net work is calculated by integrating ankle torque (in Nm) with respect to ankle angle (in radians). Ankle power is calculated by taking the time derivative of the calculated ankle work. Toeoff ankle angle, net ankle work, peak ankle power, and percent time at which peak power occurs are also recorded for each gait cycle. The ensemble average and standard deviation is then calculated for all gait cycles for each speed during level ground walking.

Data from the biological ankle is obtained from lab collaborators collected for a separate study. The dataset includes 7 subjects. For each subject, three gait cycles of ankle angle and torque data were recorded for five speeds, three of which are used in this example, namely 1.0 m/s, 1.25 m/s and 1.50 m/s. The dataset is already parsed into gait cycles with heel strike at 0%. The ensemble average of the three sets of ankle angle and torque per each subject is first calculated. Then ensemble average and standard deviation across 7 subjects is calculated for ankle work, power, peak ankle power, toe off angle and percent time at which peak power occurs.

Results and Discussion

This section presents results obtained from the three sets of experiments conducted to test how well the hybrid controller worked compare to the intrinsic controller. The three sets of experiments were: level ground walking across three speeds, stair ascent and stair descent. Biological ankle data were also included for level ground walking as reference.

4.1 Level Ground Walking

Ankle Angle

Figure 20:
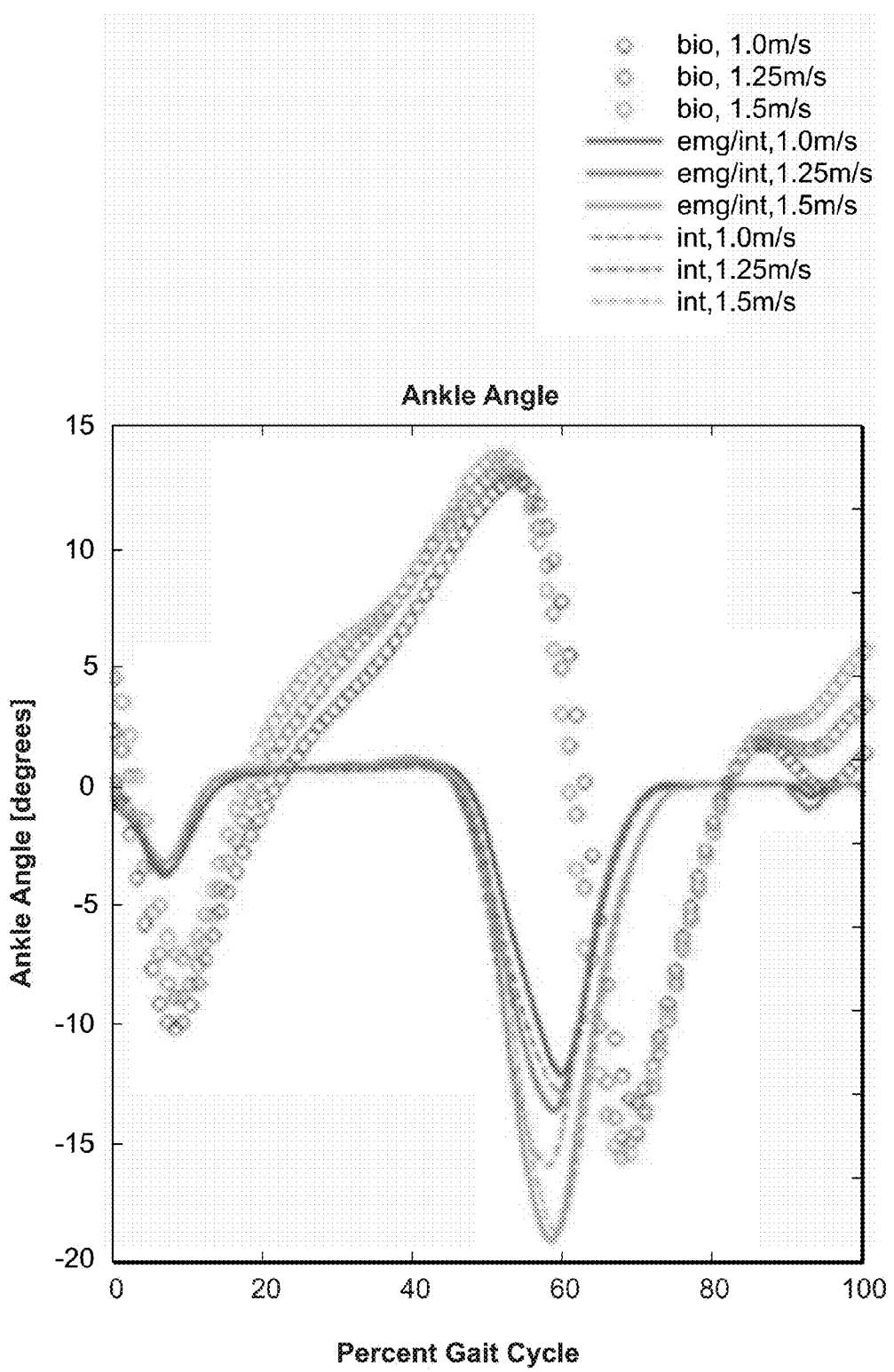
FIG. 20 depicts ankle angle as a function of percent gait cycle for level ground walking across three walking speeds.

Ankle angle measured from the biological ankle ("bio"), the prosthetic ankle using the intrinsic controller ("int") and the hybrid controller ("emg/int") is shown in FIG. 20. For each case, ankle angle is shown as function of percent gait cycle at three walking speeds. The prosthetic ankle angle profiles using both controllers are consistent with each other. The prosthetic ankle has a mechanical hard stop preventing the ankle to dorsiflex. Thus, no dorsiflexion is observed between 20% to 60% and 80% to 100% of the gait cycle on prosthetic ankle measurements. Aside from lack of dorsiflexion, the prosthetic ankle angle profile resembles the biological ankle profile qualitatively. Particularly, at push off, plantar flexion angle observed on both prosthetic ankle measurements are between 10 and 20 degrees, which is within the normal biological ankle angle range.

It is worth noting that less plantar flexion angle is observed on the prosthetic ankle than the biological ankle during the first 20% of the gait cycle. This suggests that either the prosthetic ankle impedance is too high or that the prosthetic ankle quickly achieves a foot-flat position where controlled dorsiflexion is initiated, causing only a small angle of plantar flexion to occur.

FIG. 20 also shows that as speed increases, the overall ankle angle profile for both the biological and the prosthetic ankle stays the same. Winter noted in his paper that as speed increases, there is an increase in ankle angle at push off [15]. Although this trend is not observed in the biological data in FIG. 20, it is observed in the prosthetic ankle using both controllers.

It is also noted that the biological ankle is non-zero at 0% of the gait cycle, which suggests that the method used to identify heel strikes on biological ankle measurements may not be accurate. Data from Winter [15] shows that biological ankles have maximum plantar flexion angle centered at around 60% of the gait cycle. Thus, it is believed that the biological ankle data can be shifted to an earlier percentage of the gait cycle by about 5% to be consistent with similar studies done in the field. Nonetheless, the overall biological ankle angle profile is consistent with what is been published in literature.

Ankle Torque

Figure 21:
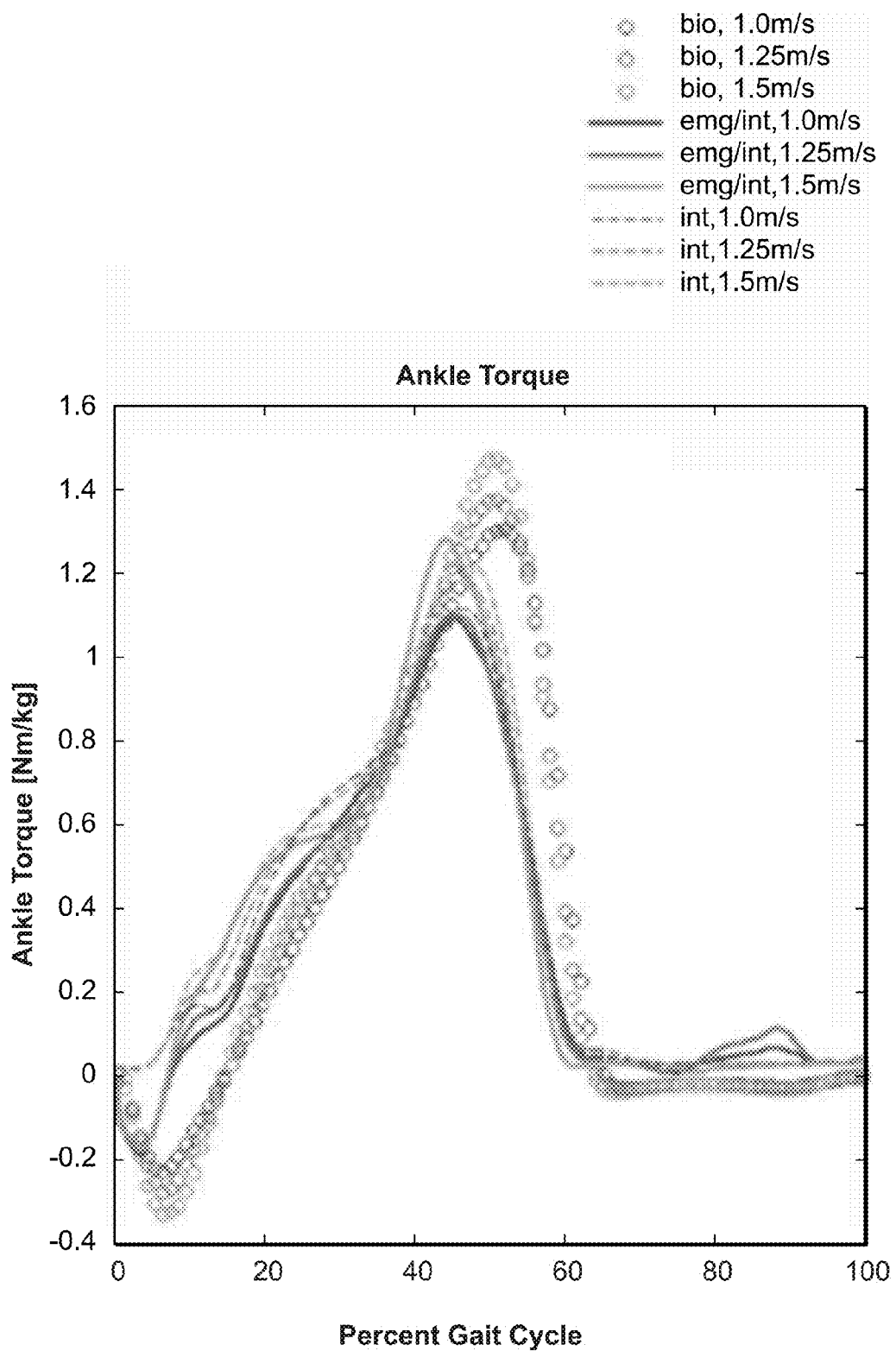
FIG. 21 depicts ankle torque as a function of percent gait cycle for level ground walking across three walking speeds.

Ankle torque measured across three walking speeds from the biological ankle, the prosthetic ankle using the intrinsic controller ("int") and the hybrid controller ("emg/int") is shown in FIG. 21. There is qualitative resemblance between all three measurements. The prosthetic ankle torque peaks earlier in the gait cycle than the biological ankle. This may be because the battery cannot provide enough power to drive the motor or because the motor simply cannot exert as much torque as the biological ankle. This suggests that using a more powerful motor may allow for the prosthetic ankle to match up with the biological ankle performance.

There is no significant torque profile difference between the two prosthetic ankle controllers. This is because even though the myoelectric signal is modulating the gain parameter of the command torque, the dominant term in the command torque is still the positive feedback $T^3_{measured}$ term. The intrinsic controller uses measured pitch velocity to predict walking velocity and sets the gain parameter accordingly. The hybrid controller uses myoelectric signal amplitude to modulate the same gain parameter. For the particular dataset collected, the hybrid controller commands larger torque at fast speed, but there is no difference between slow and medium speeds. This shows that the myoelectric signal can be seen to achieve fine tuned gain control. Improving myoelectric signal quality and conducting more training can result in more precise gain modulation.

Ankle Power

Figure 22:
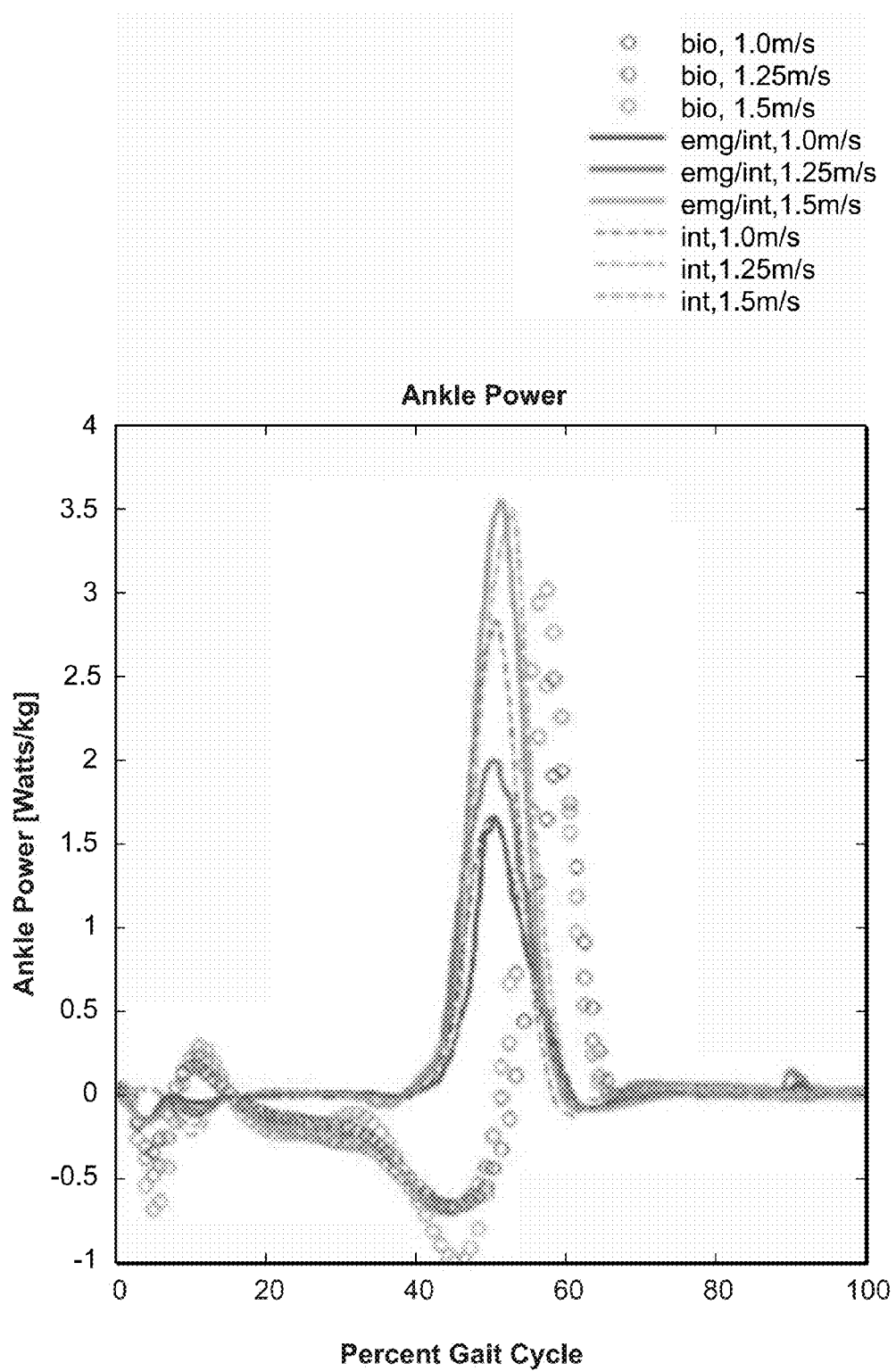
FIG. 22 depicts ankle power as a function of percent gait cycle for level ground walking across three walking speeds.

Ankle power is calculated by taking the time derivative of the integral of ankle torque with respect to ankle angle. Ankle power profile is calculated for each individual trial. FIG. 22 shows the ensemble average of individual trials for ankle power across three walking speeds for the biological ankle ("bio") and the two controllers ("int" and "emg/int"). There is no negative power observed in the prosthetic ankle because it cannot dorsiflex. Otherwise, the qualitative profile of the prosthetic ankle power curve resembles what is observed in the biological ankle. The prosthetic ankle exerts larger peak power at higher speed than biological ankles. This is because the command torque gain is set higher than biological values.

Peak power of the prosthetic ankle occurs earlier than what is observed in the biological data due to two reasons: 1) the biological data heel strike was not detected correctly, typical biological ankle peak power occurs at around 50% of the gait cycle [15]; 2) prosthetic ankle cannot provide sufficient torque.

Between the two controllers used in the prosthetic ankle, the hybrid controller is able to match up with the intrinsic controller's command power for both slow and fast speed. For medium speed, FIG. 22 shows the hybrid controller controlled ankle provides less peak power than the intrinsic one. This is consistent with what is observed in the ankle torque profile. Also, referring back to FIG. 18, the difference between slow and medium speed myoelectric signals during controlled dorsiflexion is small, thus less peak power differences is observed between slow and medium speeds. This suggests that the mapping between EMG and command torque gain can be non-linear. The exact mapping between EMG and command torque gain parameter can be obtained empirically. The mapping depends on myoelectric signal quality. With standard myoelectric signal processing methods, the data shows large variances between trials and across speed. Signal quality can be improved by using a different method to obtain EMG signals and use other signal processing methods to improve signal quality.

Ankle Net Work

Figure 23:
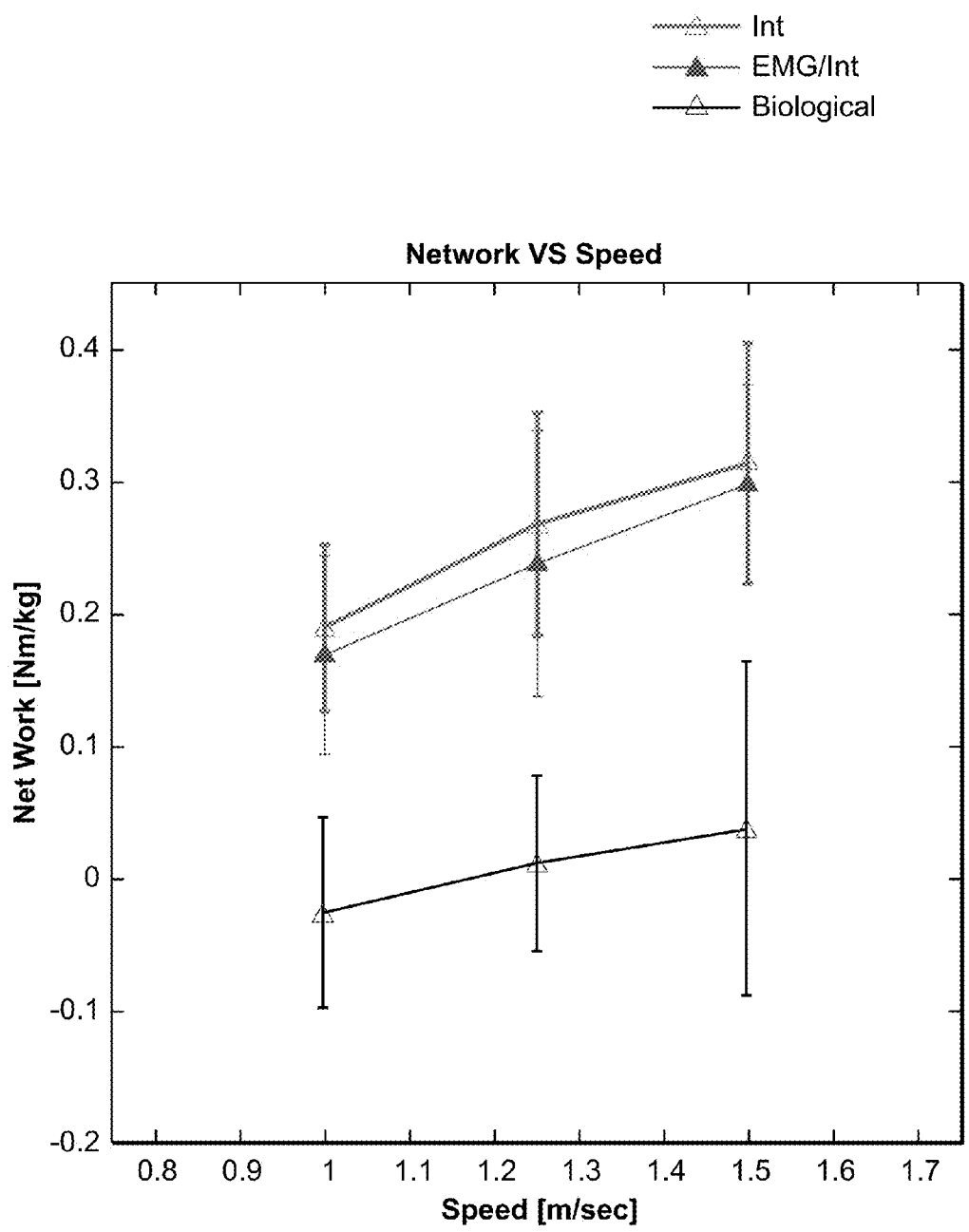
FIG. 23 depicts ensemble average of net work calculated for three walking speeds.

Average net work per gait cycle per speed is plotted in FIG. 23. All three data sets show that the ankle does more work at faster speeds than slower ones. The biological data set ("Biological") shows near zero net work for all speeds because ankle angle and torque collected has been misaligned with respect to each other. Typical values for biological ankle net work are between 0.1 and 0.3 Nm/kg. Comparing between the intrinsic ("Int") and hybrid ("EMG/Int") controllers, FIG. 23 shows that the hybrid controller and the intrinsic controller exert similar amount of net work for the three speeds observed.

Significance testing using one-way ANOVA followed by a Tukey HSD follow up procedure was performed to test if there are statistical significant differences between the datasets. The null hypothesis is that all three means are the same. Statistical results show that with 95% confidence interval for the true difference of the mean value between the intrinsic and the hybrid controller is [−3.86 and 2.6]. Since the difference interval includes zero, it shows that there is no statistical difference between the intrinsic and the hybrid controller. Table 4.1 lists all the difference intervals calculated for 95% confidence interval.

TABLE 4.1

Tukey HSD testing result showing 95% confidence difference interval for net work for all three speeds.

| Speed | Bio VS Int | Bio VS EMG-Int | Int VS EMG-Int |
|---|---|---|---|
| 1.0 m/s | −14.8184, −8.3485 | −15.4388, −8.9689 | −3.8554, 2.6146 |
| 1.25 m/s | −24.0108, −17.8797 | −21.0711, −14.9400 | −0.1259, 6.0053 |
| 1.50 m/s | −30.0529, −22.6769 | −24.8724, −17.4964 | 1.4925, 8.8685 |

Peak Ankle Power

Figure 24:
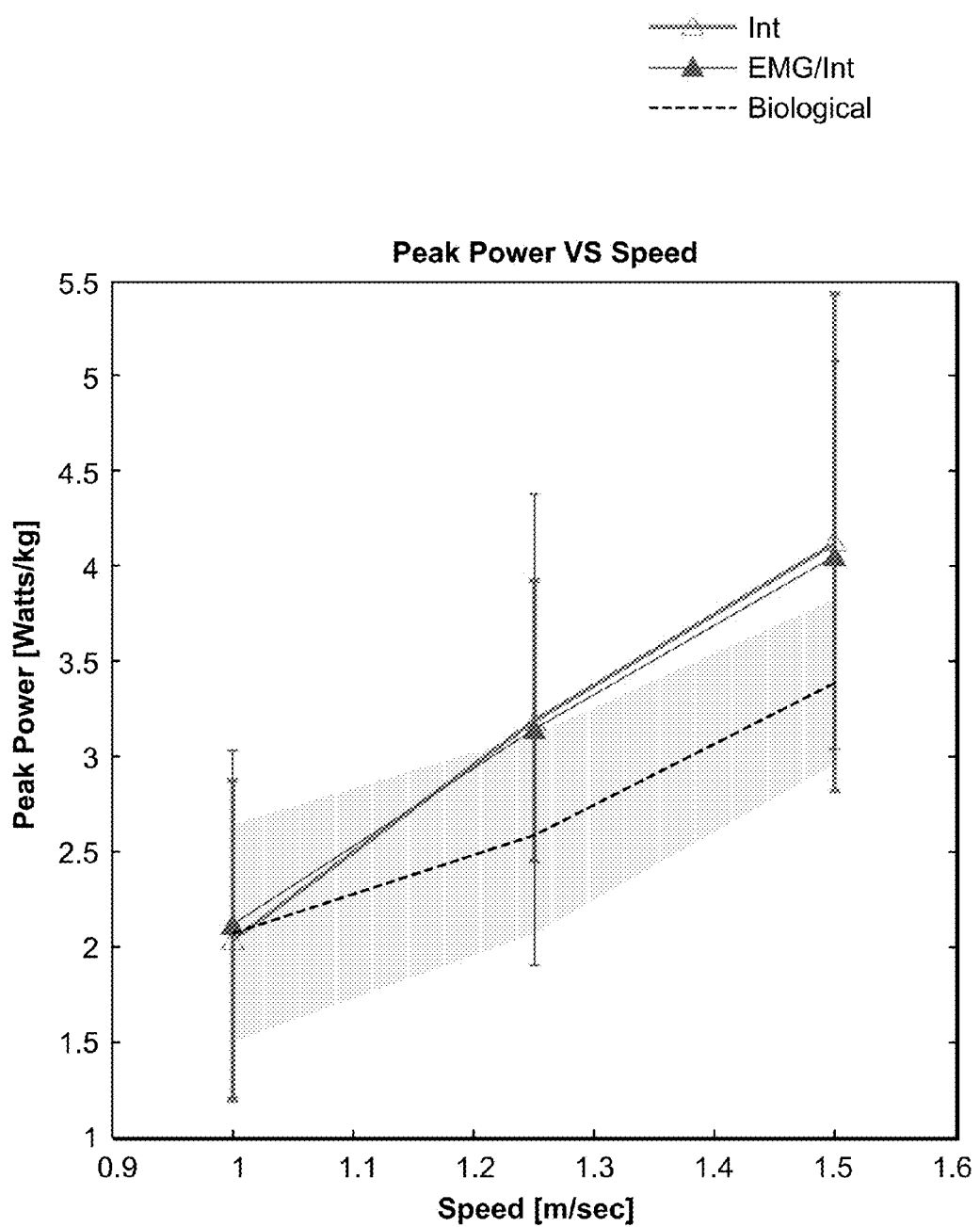
FIG. 24 depicts ensemble average of peak power calculated for three walking speeds.

Average peak power for three speeds is plotted in FIG. 24. The figure shows the general trend that as speed increases, the peak power exerted by the ankle increases. The figure also shows that the hybrid controller ("ENG/int") and the intrinsic controller ("Int") exert similar amount of peak power per each speed. Normally, less peak power is observed at higher speed in prosthetic ankles than biological ankles. This dataset does not reflect the same trend because the gain parameter may be set too high. In order to achieve a more biomimetic behavior, the prosthetic ankle gain can be tuned down.

The peak power values plotted in FIG. 24 are the ensemble averages of the peak power per trial per speed. In contrast, the power values shown in FIG. 22 are the average power values calculated per gait cycle per trial. Therefore the peak power values in the two figures are not the same.

Statistical testing result is shown in Table 4.2. With 95% confidence interval, there is no statistical difference for a walking speed of 1.0 m/s between the three data sets. There is no statistically significant difference between the two prosthetic controllers for speeds of 1.25 m/s and 1.5 m/s either. The difference between the prosthetic ankle and the biological ankle is non-zero but small for those two speeds.

TABLE 4.2

Tukey HSD testing result showing 95% confidence difference interval for peak power for all three speeds.

| Speed | Bio VS Int | Bio VS EMG-Int | Int VS EMG-Int |
|---|---|---|---|
| 1.0 m/s | −0.0469, 1.2984 | −0.7348, 0.6105 | −1.3606, −0.0153 |
| 1.25 m/s | −1.4029, −0.0109 | −1.4330, −0.0410 | −0.7261, 0.6659 |
| 1.50 m/s | −2.2133, −0.6224 | −1.7716, −0.1806 | −0.3537, 1.2372 |

Toeoff Ankle Angle

Figure 25:
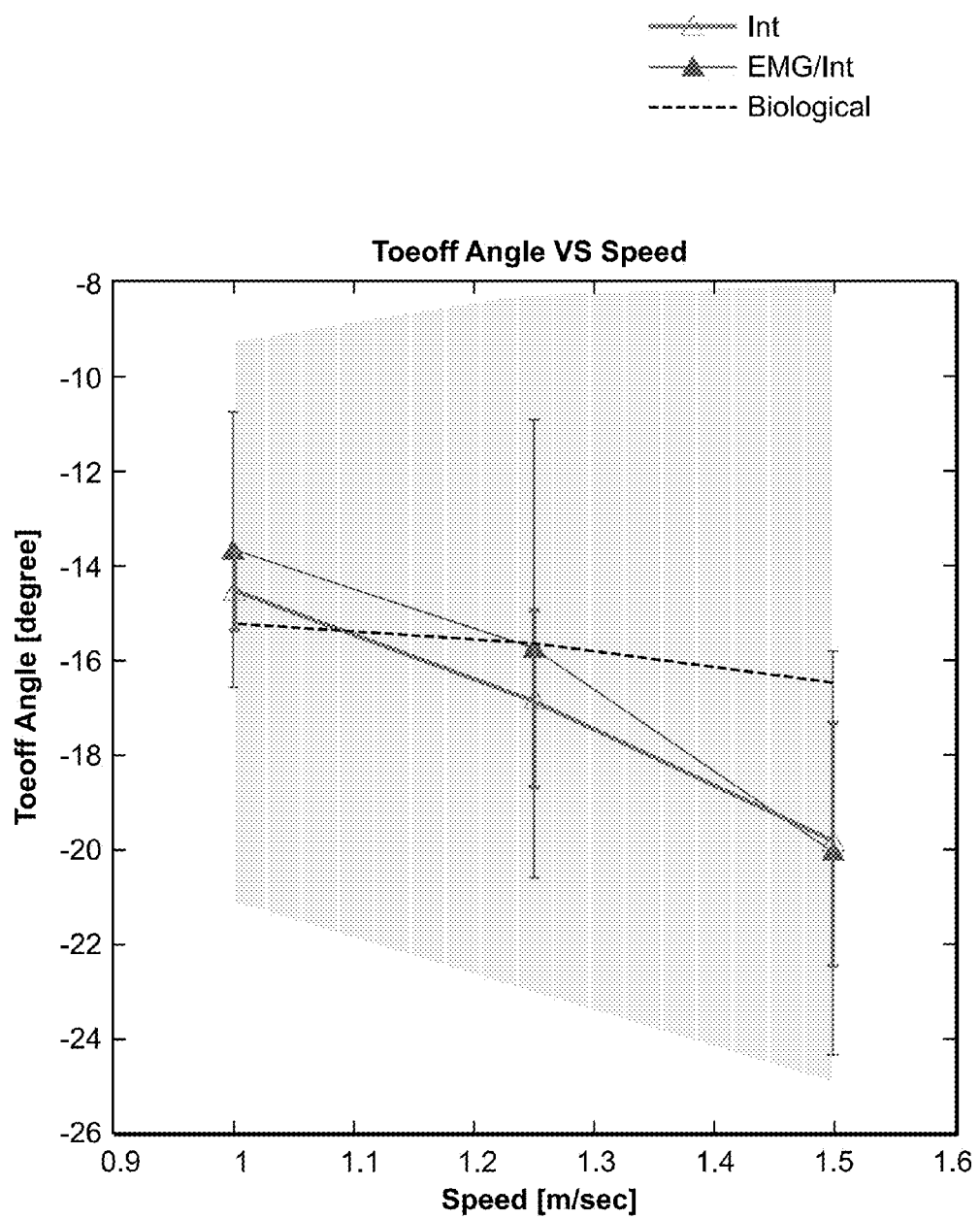
FIG. 25 depicts measured average toe off angle for three walking speeds from three data sets.

Toeoff angle is defined as the ankle angle at which maximum plantar flexion occurs at push off. FIG. 25 depicts measured average toeoff angle for three walking speeds from the three datasets. For the prosthetic ankle using two different controllers ("Int" and "EMG/Int"), the figure shows a linear relation between ankle angle and speed. At faster speeds, more plantar flexion is observed. The biological ankle ("Biological") for this specific dataset does not show such trend. However, Winter did report similar trend in his biological dataset as what is observed in the intrinsic controller [15].

Statistical significance testing is listed in Table 4.3. The result shows that, for a confidence interval of 95%, there is no statistical difference between the intrinsic controller and the hybrid controller. Furthermore, the result of the statistical test also shows that for this particular dataset, there is no statistically significant difference between the prosthetic ankle and the biological one.

TABLE 4.3

Tukey HSD testing result showing 95% confidence difference interval for toeoff angle for all three speeds.

| Speed | Bio VS Int | Bio VS EMG-Int | Int VS EMG-Int |
|---|---|---|---|
| 1.0 m/s | −5.1370, 3.5200 | −5.0622, 3.5947 | −4.2538, 4.4032 |
| 1.25 m/s | −4.3664, 7.1758 | −4.3170, 7.2252 | −5.7217, 5.8206 |
| 1.50 m/s | −3.4484, 11.2914 | −2.6259, 12.1139 | −6.5475, 8.1924 |

Percent Time at which Peak Power Occurs

Figure 26:
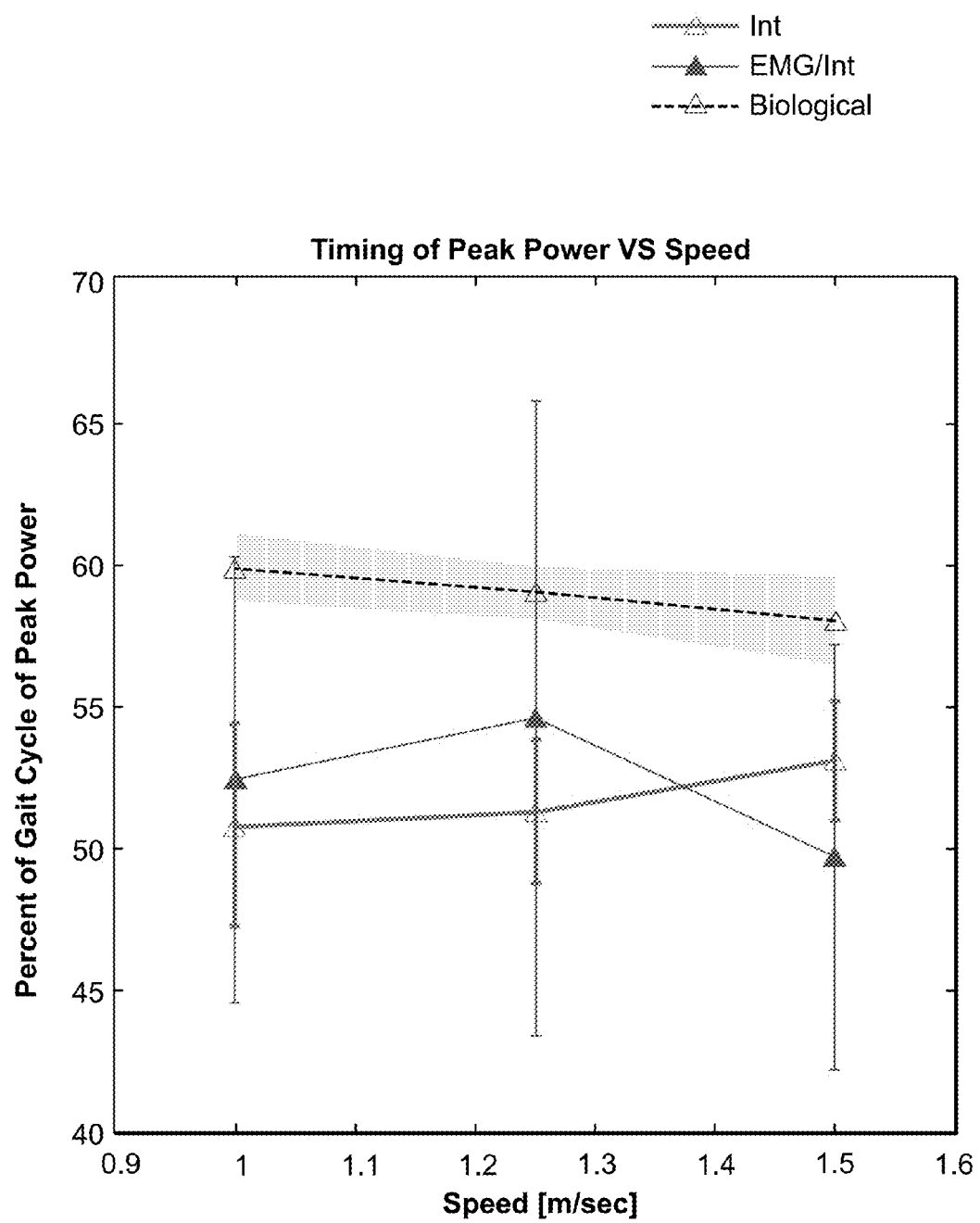
FIG. 26 depicts average timing at which peak power occurs (percent of gait cycle of peak power) for three walking speeds.

Percent of gait cycle at which peak power occurs for each speed is shown in FIG. 26. Since the biological data set is misaligned, comparison between the biological and the prosthetic ankle for this parameter cannot be made. Table 4.4 shows the result from a Tukey HSD test for a 95% confidence interval. There is no statistical difference between the intrinsic and the hybrid controller for all three speeds.

However, it is worth comparing the relative differences within the ankle type itself. It was observed by Winter [15] that timing at which peak power occurs does not vary with speed. This trend is observed in the biological data set. Although the biological dataset is misaligned per percent gait cycle, the relative timing between different speeds can still be compared assuming the error is consistent through all trials. Table 4.5 shows the significance testing result for each ankle. With 95% confidence, it is shown that there is no statistical significance in peak power timing across speeds for the biological ankle dataset ("Bio"). In addition, the error margin for the biological ankle dataset is relatively small. A similar trend is observed in the prosthetic ankle but with larger variances, especially in the hybrid controller case ("EMG-Int") as compared to the intrinsic controller case ("Int"). This large error range is expected because a myoelectric signal is non-stationary and non-repeatable, as shown in FIG. 18. However, as demonstrated by this example, it is possible to use the myoelectric signal as a command signal to produce repeatable results. The myoelectric signal is repeatable in the qualitative sense.

TABLE 4.4

Tukey HSD testing result showing 95% confidence difference interval for percent time of peak power for all three speeds.

| Speed | Int VS EMG-Int |
|---|---|
| 1.0 m/s | −13.70, 80.76 |
| 1.25 m/s | −1.96, 1.88 |
| 1.50 m/s | −.24, 2.47 |

TABLE 4.5

Tukey HSD testing result showing 95% confidence difference interval for percent time of peak power for each of the three datasets.

| Speed | 1.0 m/s VS 1.25 m/s | 1.0 m/s VS 1.50 m/s | 1.25 m/s VS 1.50 m/s |
|---|---|---|---|
| Bio | −1.07, 2.73 | −0.23, 3.57 | −1.07, 2.73 |
| Int | −12.66, 18.19 | −35.82, −4.97 | −38.59, −7.73 |
| EMG-Int | −91.05, 48.32 | −36.78, 102.60 | −15.42, 23.96 |

ANOVA Significance Testing

One-way ANOVA was used to compare statistical significance between the three data sets for the above four parameters. The differences were then further analyzed with a Tukey HSD follow-up procedure. Tukey HSD follow-up results have already been presented in earlier sections. Table 4.6 lists all the p-values obtained from ANOVA. The p-value represents the probability that the mean values from all three datasets are the same. Aside from toe-off angle, all the other parameters show that there is a significant difference between the datasets. For net work and peak power, this is expected due to the fact that the biological ankle dataset is misaligned. Both ankle net work and peak ankle power are highly dependent on the alignment of datasets. For peak power, the prosthetic ankle can be better tuned to match the biological data result.

TABLE 4.6

Anova testing p-value results.

| | p-value | | | |
|---|---|---|---|---|
| Speed | net work | peak power | toe off angle | percent per peak power |
| 1.0 m/s: | 3.0897e−09 | 0.0322 | 0.8741 | 9.2416e−11 |
| 1.25 m/s: | 8.5662e−14 | 0.0226 | 0.7734 | 2.0019e−25 |
| 1.50 m/s: | 1.9398e−11 | 0.0010 | 0.2352 | 3.8249e−22 |

Summary for Level Ground Walking

Results show that prosthetic ankle controlled by the hybrid controller and the intrinsic controller both exhibit biomimetic characteristics. Measured ankle angle, ankle torque and calculated ankle power all qualitatively resemble what is seen in biological ankles. Due to misalignment in the biological ankle, it cannot be determined if the prosthetic ankle is similar to the biological ankle in terms of net work, peak power and percent time at which peak power occurs. However, the dataset does show that the prosthetic ankle toe off angle is similar to the biological ankle dataset.

The data also show the hybrid controller can achieve similar mean values as the intrinsic controller in terms of net ankle work, peak power, toe off angle and percent time at which peak power occurs. The myoelectric controller shows large variances for all the parameters examined. This is expected because myoelectric signals are non-stationary and subject to change. One reason the hybrid controller can achieve similar mean values to the intrinsic controller is because the $T^3_{measured}$ term for positive feedback dominates the control loop. In order to improve the hybrid controller, the myoelectric signal may be improved. For example, the mapping between EMG signal amplitude and command torque gain can be binned into levels rather than a simple linear mapping.

4.2 Stair Ascent and Descent

The present example also used a myoelectric signal to switch between different modalities in the intrinsic controller, which is similar with what has been done in previous studies [1, 7]. One difference between this hybrid controller and study done by Au et al. is that for stair descent, the user can control the amount ankle angle deflexion by modulating the amount of time the ankle stays in swing phase. The Au et al. design deflects the ankle to a fixed plantar flexion angle. Thus, for stairs of shallow or deep rises, the Au et al. design cannot adjust accordingly. In addition, the hybrid controller can assist a user to walk up stairs by letting the user to command push off torque. This functionality is absent in both the particular intrinsic controller used in this example and in Au et al.'s design.

The following results show how well the ankle behaves during stair ascent and descent in terms of ankle angle, torque and power.

4.2.1 Stair Descent

Subjects can switch between 'level ground/stair ascent' mode and 'stair descent' mode in the intrinsic controller by flexing gastrocnemius muscle during swing phase of the gait cycle. In order to test the robustness of threshold detection algorithm, a subject was instructed to walk down a set of stairs and flex the muscle to trigger stair descent mode at every step. The same task was repeated but this time the subject was instructed to not flex the muscle. Ensemble average of ankle angle, torque and power is calculated for 10 gait cycles of the subject walking down the stairs flexing the muscle ("emg") and 6 gait cycles down stairs without flexing the muscle ("int") and shown in FIG. 27. Of the 10 gait cycles the subject was instructed to switch the controller to stair descent mode, the subject was able to make the switch all 10 times successfully. Similarly, of the 6 gait cycles the subject was instructed not to switch the controller to stair descent mode, no false switches were made.

Figure 27:
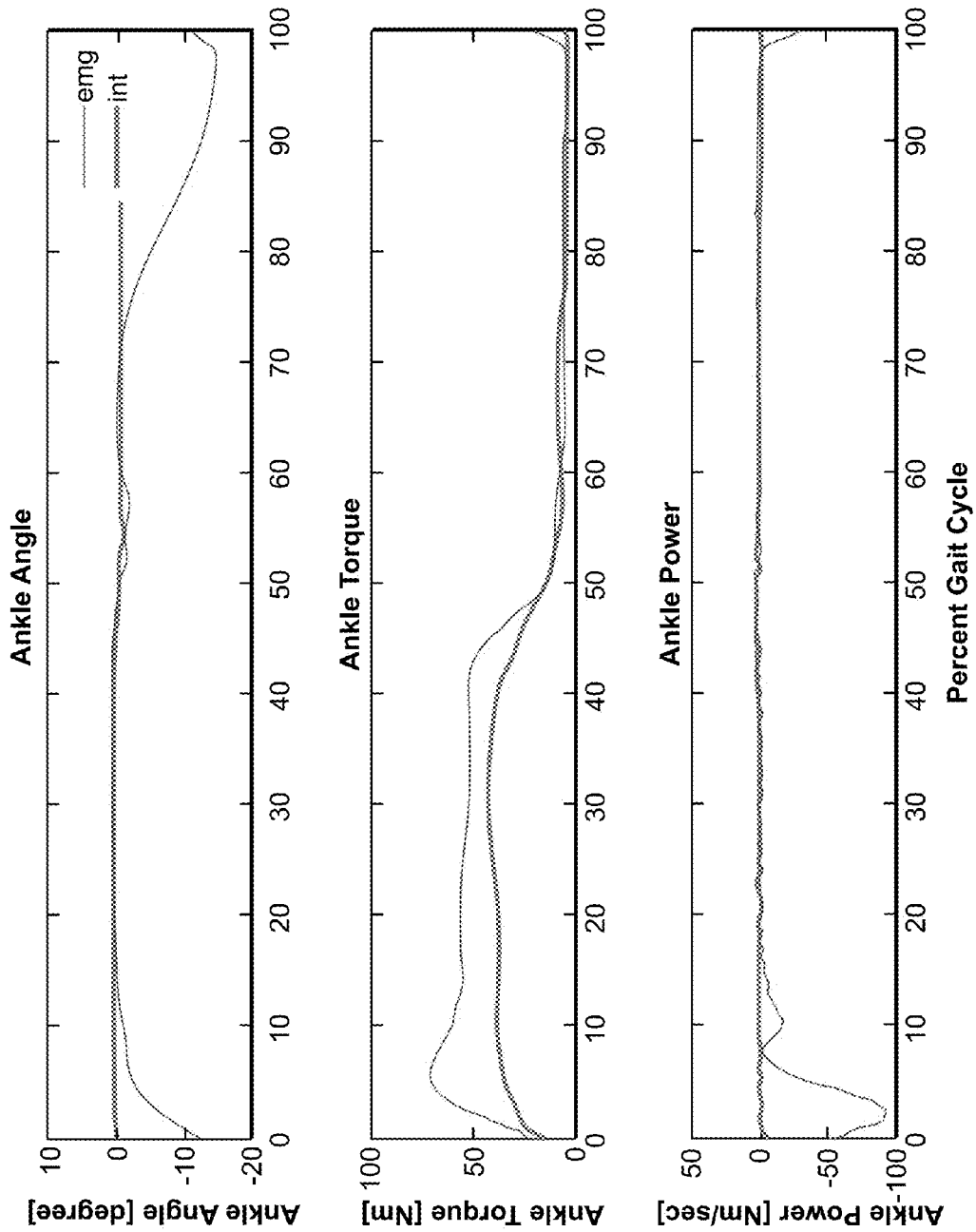
FIG. 27 depicts ankle angle, torque and power measured using a hybrid controller and an intrinsic controller during stair descent.

As shown by the ankle angle plot of FIG. 27, with the hybrid controller ("emg"), the subject can command the ankle to plantar flex during swing phase of the gait cycle, restoring a more normative gait. Thus the hybrid controller is an improvement of the particular intrinsic controller ("int") a used in this example.

4.2.2 Stair Ascent

Figure 28:
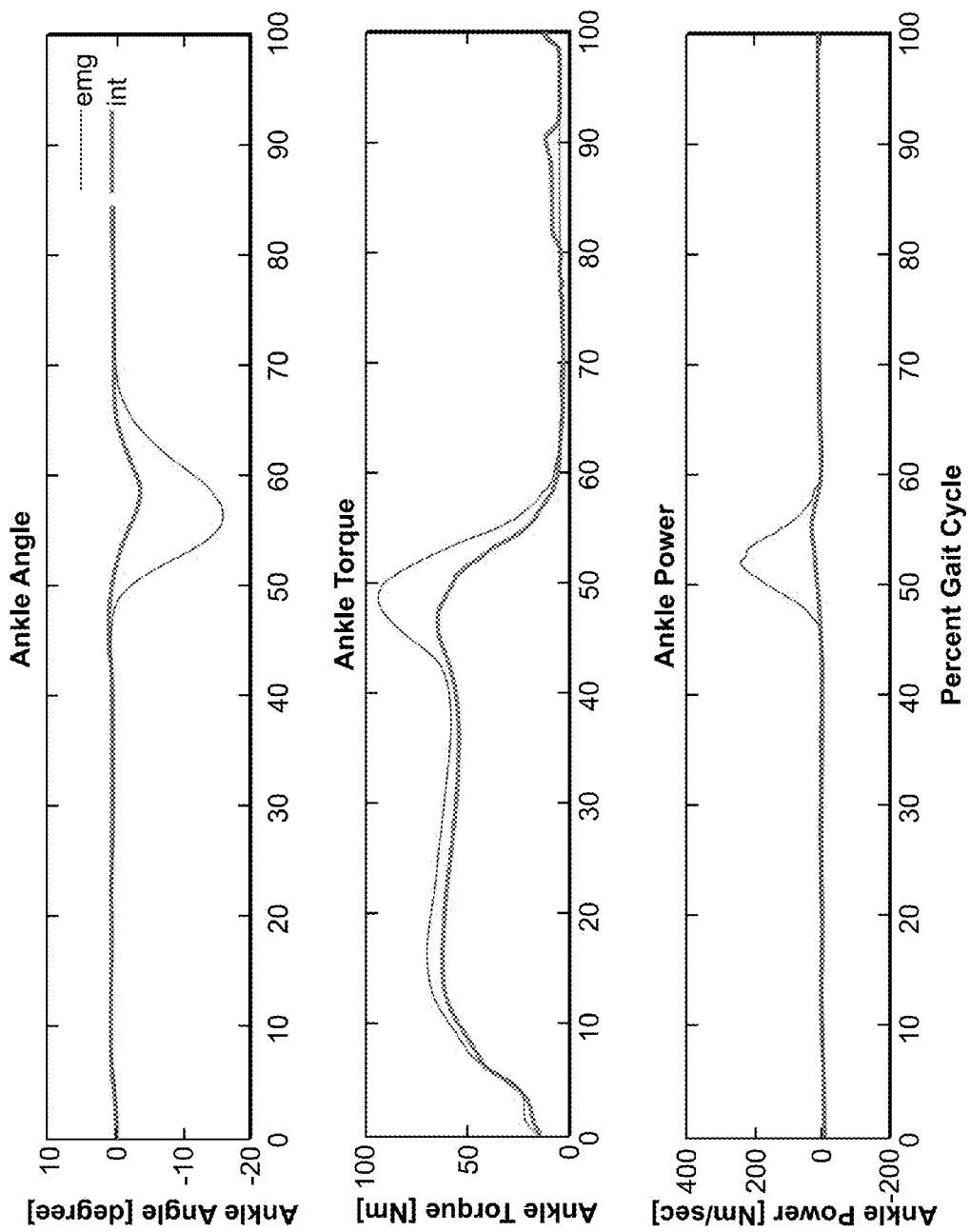
FIG. 28 depicts ankle angle, torque and power measured using the hybrid controller and the intrinsic controller during stair ascent.

Of the particular intrinsic controller used in this example, during stair ascent, no plantar flexion torque is exerted by the ankle to assist the user at push off. With the hybrid controller, the user can command ankle torque by flexing the muscle. To test how well the hybrid controller works, 10 gait cycles of subject walking up the stairs flexing the muscle to command torque and 10 gait cycles without flexing the muscle is measured. The ensemble average of ankle angle, torque and power for the two scenarios is shown in FIG. 28. As shown, the prosthetic ankle using the myoelectric driven controller ("emg") can plantar flex and provide push off power to assist user ascend stairs.

5.1 Conclusion

A hybrid controller is disclosed that can maintain similar biomimetic characteristics of an existing intrinsic controller but at the same time give a user more control over ankle behavior. Specifically, this example describes the feasibility of using a myoelectric signal 1) to modulate the gain of command torque during push off of the gait cycle; and 2) to switch between level ground walking and stair descent mode in the intrinsic controller. Using the six measurements, i.e., ankle angle, torque, net work, peak power, toe off angle and percent time at which peak power occurs, results show that the hybrid controller can maintain the biomimetic characteristics as the original intrinsic controller.

The hybrid controller provides the following benefits:

1) The hybrid controller gives the user some control of ankle behavior. The user can command the amount of torque exerted during push off by controlling how hard to flex the muscle. As an improvement to the intrinsic controller used here, the ankle exhibits a more biomimetic gait pattern during stair ascent.

2) The user can switch between level ground walking and stair descent mode. The ankle plantar flexes at a fix rate. By controlling the time the ankle is in the air, the user can control the amount of plantar flexion in the ankle.

5.2 Improvements

Improvements: As shown in the result, the user may not have fine tuned control over ankle torque exerted at push off. The following improvements can be made:

1) The myoelectric signal quality may be improved. Myoelectric signal quality can be poor because during walking, the contact between the fabric electrode and the skin is constantly changing. As a result, motion artifact is observed. One way to improve the signal quality could be to use implantable EMG sensors instead of measuring surface EMG. The technique used to process the myoelectric signal may be improved. The method used here, as described above, is the standard method. Alternative methods reported in literature may be used, such as whitening the signal, use adaptive Wiener filtering, PCA, ICA, various pattern recognition techniques using a combination of time and frequency domain features, and other suitable methods 2) The mapping between command torque gain and EMG signal amplitude can be non-linear. Since EMG signal amplitude is non-stationary with large variances, the EMG signal amplitude, for example, can be binned into different levels and mapped to torque gain based on level(s) of contraction.

Alternative approach: One biomimetic approach of using myoelectric signal to modulate ankle push-off torque is to process EMG using Sanger-Zajac model as described by Krishnaswami et al. [12] to obtain muscle activation level. Upon calculating muscle activation, the result can be used in Hill's muscle model to estimate force and joint torque assuming the residual limb muscle functions similar to muscles in non-amputated bodies. In this case, Krishnaswami et al.'s neuromuscular leg model could be used to estimate joint torque using real time EMG. In this case, close loop torque control may be used to control the ankle instead of positive feedback.

Clinical Values: Ferris et al. found clinical values in studying EMG morphology changes before and after using EMG proportional torque control with patients wearing orthosis [5]. In addition, they found that amplifying the relation between muscle activation and proprioceptive feedback can improve muscle coordination and balance. The prosthetic ankle described in this example uses positive feedback and larger than normal gain parameters to command ankle torque. Similar studies to what Ferris et al. had done can be conducted with ankle-foot prosthesis users once fine tuned mapping between EMG and torque can be achieved. Proportional myoelectric torque control may help prosthetic users to improve muscle coordination and have more intuitive interaction with prosthetic ankle because such control provides a direct link between the user's nervous system and the prosthesis, and it also augments the movement errors related to inappropriate muscle activation patterns.

REFERENCES

[1] S. K Au, P. Bonato, and H. Herr. An EMG-position controlled system for an active ankle-foot prosthesis: an initial experimental study. pages 375-379, July 2005.

[2] S. K Au, J. Weber, and H. Herr. Powered Ankle-Foot prosthesis improves walking metabolic economy. *Robotics, IEEE Transactions on,* 25(1):51-66, February 2009.

[3] Samuel Au, Max Berniker, and Hugh Herr. Powered ankle-foot prosthesis to assist level-ground and stair-descent gaits. *Neural Networks,* 21(4):654-666, May 2008.

[4] E A Clancy, E L Morin, and R Merletti. Sampling, noise-reduction and amplitude estimation issues in surface electromyography. *Journal of Electromyography and Kinesiology:* 12(1):1-16, February 2002. PMID: 11804807.

[5] D. P Ferris and C. L Lewis. Robotic lower limb exoskeletons using proportional myoelectric control. pages 2119-2124, September 2009.

[6] D H Gates, J Lelas, U Della Croce, H Herr, and P Bonato. Characterization of ankle function during stair ambulation. *Conference Proceedings: Annual International Conference of the IEEE Engineering in Medicine and Biology Society. IEEE Engineering in Medicine and Biology Society. Conference,* 6:42484251, 2004. PMID: 17271242.

[7] L J Hargrove, H Huang, A E Schultz, B A Lock, R Lipschutz, and T A Kuiken. Toward the development of a neural interface for lower limb prosthesis control. *Conference Proceedings Annual International Conference of the IEEE Engineering in Medicine and Biology Society. IEEE Engineering in Medicine and Biology Society. Conference,* 2009:2111-2114, 2009. PMID: 19964782.

[8] Levi J. Hargrove, Ann M. Simon, Robert D. Lipschutz, Suzanne B. Finucane, and Todd A. Kuiken. Real-Time myoelectric control of knee and ankle motions for transfemoral amputees. *JAMA: The Journal of the American Medical Association,* 305(15):1542-1544, April 2011.

[9] A V. Hill. The heat of shortening and the dynamic constants of muscle. *Proc. R. Soc. Lond. B,* 126:136-195, 1938.

[10] Necille Hogan and Robert W Mann. Myoelectric signal processing: Optimal estimation applied to electromyography—part i: Derivation of the optimal myoprocessor. *Biomedical Engineering, IEEE Transactions on,* BME-27(7):382-395, July 1980.

[11] Eric R. Kandel, James H. Schwartz, and Thomas M. Jessell. *Principles of Neural Science*. The McGraw-Hill Companies, Inc.

[12] Pavitra Krishnaswamy, Emery N. Brown, and Hugh M. Herr. Human leg model predicts ankle Muscle-Tendon morphology, state, roles and energetics in walking. 7(3), March 2011. PMID: 21445231 PMCID: 3060164.

[13] Todd A. Kuiken, Guanglin Li, Blair A. Lock, Robert D. Lipschutz, Laura A. Miller, Kathy A. Stubblefield, and Kevin B. Englehart. Targeted muscle reinnervation for real-time myoelectric control of multifunction artificial arms. *JAMA: The Journal of the American Medical Association*, 301(6):619-628, February 2009.

[14] Terence D. Sanger. Bayesian filtering of myoelectric signals. *Journal of Neurophysiology*, 97(2):1839-1845, February 2007.

[15] David A. Winter. Biomechanical motor patterns in normal walking. 15(4):302330, December 1983.

[16] FE. Zajac. Muscle and tendon: properties, models, scaling, and application to biomechanics and motor control. *Critical Reviews in Biomedical Engineering*, 17(4):359-411, 1989.

EQUIVALENTS

While a preferred embodiment is disclosed, many other implementations will occur to one of ordinary skill in the art and are all within the scope of the invention. Each of the various embodiments described above may be combined with other described embodiments in order to provide multiple features. Furthermore, the foregoing describes a number of separate embodiments of the apparatus and method of the present invention, what has been described herein is merely illustrative of the application of the principles of the present invention. Other arrangements, methods, modifications, and substitutions by one of ordinary skill in the art are therefore also considered to be within the scope of the present invention, which is not to be limited except by the claims that follow.

The relevant teachings of all cited references are incorporated herein by reference in their entirety.

What is claimed is:

1. A neuromuscular model-based controller for controlling at least one robotic limb joint of a robotic limb, the controller comprising:
   a) a neuromuscular model including a muscle model, muscle geometry and a reflex feedback loop, wherein the reflex feedback loop conveys feedback data of at least one of muscle force, muscle length and muscle contractile velocity of the muscle model, to thereby adjust activation of the muscle model, and wherein one or more parameters that determine the relation between the feedback data and activation of the muscle model are adjusted consequent to sensory data from at least one of an intrinsic sensor and an extrinsic sensor, the neuromuscular model employing the muscle model and the muscle geometry to determine at least one of a torque command and an impedance command; and
   b) a control system in communication with the neuromuscular model, whereby the control system receives at least one of the torque command and the impedance command from the neuromuscular model and controls at least one of position, torque and impedance of the robotic limb joint.

2. The neuromuscular model-based controller of claim 1, wherein the at least one sensor detects at least one of a velocity of the robotic limb and a terrain underlying the robotic limb.

3. The neuromuscular model-based controller of claim 1, wherein the sensor is an extrinsic sensor.

4. The neuromuscular model-based controller of claim 3, wherein the extrinsic sensor detects brain signals.

5. The neuromuscular model-based controller of claim 3, wherein the extrinsic sensor detects electromyographic signals.

6. The neuromuscular model-based controller of claim 5, wherein the extrinsic sensor detects surface electromyographic signals.

7. The neuromuscular model-based controller of claim 6, wherein the extrinsic sensor detects surface electromyographic signals from a residual limb.

8. The neuromuscular model-based controller of claim 1, wherein the sensor is an intrinsic sensor.

9. The neuromuscular model-based controller of claim 8, wherein the intrinsic sensor includes at least one member of the group consisting of a digital encoder, a hall-effect sensor, a torque sensor, and an inertial measurement unit.

10. The neuromuscular model-based controller of claim 1, wherein the feedback data includes muscle force.

11. The neuromuscular model-based controller of claim 1, wherein the feedback data includes muscle length.

12. The neuromuscular model-based controller of claim 1, wherein the feedback data includes muscle contractile velocity.

13. The neuromuscular model-based controller of claim 1, wherein the relation between the feedback data and activation of the muscle model is linear.

14. The neuromuscular model-based controller of claim 1, wherein the relation between the feedback data and activation of the muscle model is non-linear.

15. The neuromuscular model-based controller of claim 1, wherein the parameters include a pre-stim parameter, force and state thresholds, gains, delays, and exponential factors.

16. The neuromuscular model-based controller of claim 1, wherein the control system includes a feed forward gain, a lead compensator and a friction compensator to control at least one of position, torque and impedance of the robotic limb joint.

17. The neuromuscular model-based controller of claim 1, wherein the control system further includes a motor controller for driving an actuator of the robotic limb joint with a current command.

18. The neuromuscular model-based controller of claim 1, further including at least one sensor at the robotic limb, wherein the sensor includes at least one member of the group consisting of an angular joint displacement sensor, a velocity sensor, and an inertial measurement unit, to thereby generate joint state data.

19. The neuromuscular model-based controller of claim 18, wherein the joint state data includes a measured robotic limb joint angle and joint angular velocity measured by the at least one sensor.

20. The neuromuscular model-based controller of claim 19, wherein the control system further includes a parallel spring model that employs the measured robotic limb joint angle to thereby estimate at least one of the torque command and the impedance command.

21. The neuromuscular model-based controller of claim 1, wherein the muscle model includes a contractile element and wherein the muscle model determines muscle force using contractile element length, a contractile element velocity and an activation input from the reflex feedback loop.

22. The neuromuscular model-based controller of claim 21, wherein the muscle model includes at least one of a bilinear muscle model, a Hill-type muscle model and a clutch-spring model.

23. The neuromuscular model-based controller of claim 22, further including a switch in the reflex feedback loop that is controlled by at least one of the intrinsic sensor and the extrinsic sensor.

24. The neuromuscular model-based controller of claim 23, wherein the reflex feedback loop comprises a positive force feedback.

25. The neuromuscular model-based controller of claim 23, wherein the reflex feedback loop is configured to mimic a stretch reflex of an intact human muscle.

26. The neuromuscular model-based controller of claim 1, wherein the neuromuscular model and the control system are configured to control the robotic limb, wherein the robotic limb is a leg or part of a leg, and wherein the neuromechanical controller further includes a finite state machine synchronized to the leg gait cycle, the finite state machine being configured to receive data from at least one of the sensors and to determine a gait phase of the robotic leg using the data received.

27. The neuromuscular model-based controller of claim 16, wherein the neuromuscular model and the control system are configured to control a robotic leg comprising a knee joint.

28. The neuromuscular model-based controller of claim 26, wherein the neuromuscular model and the control system are configured to control a robotic leg comprising an ankle joint.

29. The neuromuscular model-based controller of claim 28, the robotic leg further comprising a knee joint.

30. The neuromuscular model-based controller of claim 29, the robotic leg further comprising a hip joint.

31. The neuromuscular model-based controller of claim 1, further including an intrinsic sensor at the robotic limb that adjusts control by the control system of at least one of position, torque and impedance of the robotic limb joint.

32. A method for controlling a robotic limb that includes at least one robotic limb joint, the method comprising the steps of:
   a) transmitting a measured joint state of the robotic limb to a neuromuscular model, the neuromuscular model including a muscle model, muscle geometry and a reflex feedback loop, whereby at least one of a muscle force, muscle length and muscle contractile velocity is conveyed by the reflex feedback loop as feedback data to thereby adjust activation of the muscle model, and wherein one or more parameters that determine the relation between the feedback data and activation of the muscle model are further adjusted consequent to at least one of velocity of the robotic limb and a terrain underlying the limb, whereby the muscle length, muscle contractile velocity, and the muscle activation generate a muscle force, which, together with the muscle geometry, determines at least one of a torque command and an impedance command; and
   b) transmitting at least one of the torque command and the impedance command to a control system, whereby the control system receives at least one of the torque command and the impedance command from the neuromuscular model and controls at least one of position, torque and impedance of the robotic limb joint.

33. The method of claim 32, wherein the reflex feedback loop applies a delay and a gain to at least one of the muscle force, muscle length and muscle contractile velocity, which is added to an offset pre-stimulation to thereby obtain a neural stimulation signal that is employed to adjust activation of the muscle model.

34. The method of claim 33, wherein at least one of the delay and gain is adjusted consequent to at least one of the velocity of the robotic limb and the underlying terrain.

35. The method of claim 34, wherein the robotic limb includes a robotic ankle, and further including the steps of:
   i) switching the reflex feedback loop between an on position and an off position, so that the reflex feedback loop is operating when an individual wearing the robotic limb is in a stance phase; and
   ii) applying a shaping filter to the neural stimulation signal.

36. The method of claim 32, further including the step of communicating data from at least one sensor to the reflex feedback loop.

37. The method of claim 36, wherein the sensor measures velocity of the robotic limb.

38. The method of claim 36, wherein the sensor is extrinsic.

39. The method of claim 38, wherein the sensor detects brain signals.

40. The method of claim 38, wherein the sensor detects electromyographic signals.

41. The method of claim 40, wherein the sensor detects surface electromyographic signals.

42. The method of claim 41, wherein the sensor detects surface electromyographic data from a residual limb.

43. The method of claim 36, wherein the sensor is intrinsic.

44. The method of claim 43, wherein the sensor includes at least one member of the group consisting of a digital encoder, a force sensor, a hall-effect sensor, and an inertial measurement unit.

45. The method of claim 32, wherein the feedback data includes muscle force.

46. The method of claim 32, wherein the feedback data includes muscle length.

47. The method of claim 32, wherein the feedback data includes muscle contractile velocity.

48. The method of claim 32, wherein the relation between the feedback data and activation of the muscle model is linear.

49. The method of claim 32, wherein the relation between the feedback data and activation of the muscle model is non-linear.

50. The method of claim 32, wherein the parameters include a pre-stim parameter, force and state thresholds, gains, delays, and exponential factors.

51. The method of claim 32, wherein the control system includes a feed forward gain, a lead compensator and a friction compensator to control at least one of position, torque and impedance of the robotic limb joint.

52. The method of claim 32, wherein the control system includes a motor controller for driving an actuator of the robotic limb joint with a current command.

53. The method of claim 32, further including the step of employing at least one sensor at the robotic limb, wherein the sensor includes at least one member of the group consisting of an angular joint displacement sensor, a velocity sensor, a torque sensor, an impedance sensor and an inertial measurement unit, to thereby generate intrinsic data.

54. The method of claim 53, wherein the joint state data includes a measured robotic limb joint angle and joint angular velocity measured by the at least one sensor.

55. The method of claim 54, wherein the muscle geometry is configured to determine a muscle moment arm and a muscle tendon length using the measured joint angle.

56. The method of claim 55, wherein the muscle model includes at least one muscle-tendon unit having a contractile element and a series elastic element, and wherein the muscle model includes a contractile element, and wherein the muscle model determines muscle force using contractile element length, contractile element velocity and an activation input from the reflex feedback loop.

57. The method of claim 56, wherein the muscle model includes at least one of a bilinear muscle model, a Hill-type muscle model and a clutch-spring model.

58. The method of claim 57, wherein a switch in the reflex feedback loop is controlled by at least one of the intrinsic sensor and the extrinsic sensor.

59. The method of claim 58, wherein the reflex feedback loop includes muscle feedback from the muscle model, and wherein the muscle feedback is a positive force feedback.

60. The method of claim 58, wherein the reflex feedback loop is configured to mimic a stretch reflex of an intact human muscle.

61. The method of claim 53, wherein the at least one sensor is mounted to the robotic limb, and wherein the neuromuscular model and the control system are configured to control the robotic limb, wherein the robotic limb is a leg or a part of a leg, and wherein the neuromechanical controller further includes a finite state machine synchronized to the leg gait cycle, the finite state machine being configured to receive the feedback data from the at least one sensor and to determine a gait phase of the robotic leg using the feedback data received.

62. The method of claim 32, wherein the neuromuscular model and the control system are configured to control a robotic leg comprising a knee joint.

63. The method of claim 32, wherein the neuromuscular model and the control system are configured to control a robotic leg comprising an ankle joint.

64. The method of claim 63, the robotic leg further comprising a knee joint.

65. The method of claim 64, the robotic leg further comprising a hip joint.

66. The method of claim 32, further including the step of employing an intrinsic sensor at the robotic limb to adjust control by the control system of at least one of position, torque and impedance of the robotic limb joint.

67. A neuromuscular model-based controller for controlling at least one robotic limb joint of a robotic limb, the controller comprising:
   a) at least one extrinsic sensor that detects at least one extrinsic signal of a subject wearing the robotic limb;
   b) a neuromuscular model in communication with the at least one extrinsic sensor, the neuromuscular model including a reflex feedback loop that acts upon intrinsic sensory data based upon parameters that are adjusted in response to the at least one extrinsic signal from the extrinsic sensor, the neuromuscular model thereby determining at least one of a torque command and an impedance command; and
   c) a control system in communication with the neuromuscular model, whereby the control system receives at least one of the torque command and the impedance command from the neuromuscular model and controls at least one of position, torque and impedance of the robotic limb joint.

68. The neuromuscular model-based controller of claim 67, wherein the neuromuscular model includes a muscle model, whereby parameters that determine the relation between muscle feedback data, including at least one of muscle length, muscle contractile velocity and muscle force, and activation of the muscle model are adjusted consequent to the at least one extrinsic signal of the extrinsic sensor.

69. The neuromuscular model-based controller of claim 67, wherein the at least one extrinsic signal is an electromyographic signal.

70. The neuromuscular model-based controller of claim 67, further including a switch in the reflex feedback loop that is controlled by the extrinsic sensor, so that the feedback loop is operating when an individual wearing the robotic limb is in a stance phase.

71. The neuromuscular model-based controller of claim 67, further including an intrinsic sensor at the robotic limb that adjusts control by the control system of at least one of position, torque and impedance of the robotic limb joint.

* * * * *